US012723464B2

(12) United States Patent
Buccola, Jr. et al.

(10) Patent No.: US 12,723,464 B2
(45) **Date of Patent: *Sep. 1, 2026**

(54) COVERING FOR AN ARCHITECTURAL OPENING HAVING NESTED ROLLERS

(71) Applicant: Hunter Douglas Inc., New York, NY (US)

(72) Inventors: Nickolas C. Buccola, Jr., Brighton, CO (US); Terrence M. Drew, Superior, CO (US); Kenneth M. Faller, Thomton, CO (US); Kent A. Smith, Broomfield, CO (US)

(73) Assignee: Hunter Douglas Inc., New York, NY (US)

( * ) Notice: Subject to any disclaimer, the term of this patent is extended or adjusted under 35 U.S.C. 154(b) by 489 days.

This patent is subject to a terminal disclaimer.

(21) Appl. No.: 18/129,953

(22) Filed: Apr. 3, 2023

(65) Prior Publication Data

US 2023/0235624 A1 Jul. 27, 2023

Related U.S. Application Data

(63) Continuation of application No. 16/994,765, filed on Aug. 17, 2020, now Pat. No. 11,643,870, which is a (Continued)

(51) Int. Cl.
*E06B 9/40* (2006.01)
*E06B 9/262* (2006.01)
(Continued)

(52) U.S. Cl.
CPC .............. *E06B 9/264* (2013.01); *E06B 9/262* (2013.01); *E06B 9/34* (2013.01); *E06B 9/50* (2013.01);
(Continued)

(58) Field of Classification Search
CPC ............. E06B 9/264; E06B 2009/2452; E06B 2009/405; E06B 9/50; E06B 9/34;
(Continued)

(56) References Cited

U.S. PATENT DOCUMENTS 824,930 A 7/1906 Hopkins
2,280,358 A 4/1942 Tietiq
(Continued)

FOREIGN PATENT DOCUMENTS

CA 2178167 A1 12/1996
CA 2777454 A1 11/2012
(Continued)

OTHER PUBLICATIONS

International Search Report and Written Opinion of PCT international patent No. PCT/US14/42131, dated Dec. 19, 2014. 10 Pages.

*Primary Examiner* — Johnnie A. Shablack
*Assistant Examiner* — Jeremy C Ramsey
(74) *Attorney, Agent, or Firm* — Dority & Manning, P.A.

(57) ABSTRACT

A covering for an architectural covering is provided. The covering may include a rotatable outer roller, a rotatable inner roller, a first shade secured to the outer roller, and a second shade secured to the inner roller. The outer roller may define an elongated slot extending along a length of the outer roller and opening to an interior of the outer roller. The inner roller may be received within the outer roller and may define a central longitudinal axis. The first shade may be retractable onto and extendable from the outer roller. The second shade may extend through the elongated slot and may be retractable onto and extendable from the inner roller. The elongated slot may be substantially horizontally aligned with the central longitudinal axis of the inner roller when the first shade is in a fully extended position.

28 Claims, 31 Drawing Sheets

Related U.S. Application Data continuation of application No. 15/895,061, filed on Feb. 13, 2018, now Pat. No. 10,781,630, which is a continuation of application No. 15/412,366, filed on Jan. 23, 2017, now Pat. No. 9,909,361, which is a continuation of application No. 14/212,387, filed on Mar. 14, 2014, now Pat. No. 9,567,802.

(60) Provisional application No. 61/834,080, filed on Jun. 12, 2013, provisional application No. 61/801,811, filed on Mar. 15, 2013.

(51) Int. Cl.
*E06B 9/264* (2006.01)
*E06B 9/34* (2006.01)
*E06B 9/50* (2006.01)
*E06B 9/24* (2006.01)

(52) U.S. Cl.
CPC ................ *E06B 2009/2435* (2013.01); *E06B 2009/2452* (2013.01); *E06B 2009/405* (2013.01)

(58) Field of Classification Search
CPC .... E06B 9/262; E06B 2009/2435; E06B 9/40; E06B 9/322; E06B 9/56
See application file for complete search history.

(56) References Cited

U.S. PATENT DOCUMENTS

| | | | |
|---|---|---|---|
| 2,503,101 | A | 4/1950 | Drury |
| 3,007,342 | A | 11/1961 | Wardlaw |
| 3,063,495 | A | 11/1962 | Petrick |
| 3,285,325 | A | 11/1966 | Easton |
| 4,020,889 | A | 5/1977 | Karoll |
| 4,214,621 | A | 7/1980 | Wessels et al. |
| 4,237,956 | A | 12/1980 | Sivin et al. |
| 4,372,432 | A | 2/1983 | Waine et al. |
| 4,433,765 | A | 2/1984 | Rude et al. |
| 4,610,293 | A | 9/1986 | Weiblen |
| 4,813,468 | A | 3/1989 | Fraser |
| 5,205,334 | A | 4/1993 | Judkins |
| 5,228,936 | A | 7/1993 | Goodhue |
| 5,313,999 | A | 5/1994 | Colson et al. |
| D348,371 | S | 7/1994 | Judkins |
| 5,394,922 | A | 3/1995 | Colson et al. |
| 5,419,385 | A | 5/1995 | Vogel et al. |
| 5,647,421 | A | 7/1997 | Hoffmann et al. |
| 5,787,951 | A | 8/1998 | Tonomura et al. |
| 5,791,390 | A | 8/1998 | Watanabe |
| 5,897,731 | A | 4/1999 | Colson et al. |
| 6,024,819 | A | 2/2000 | Corey |
| 6,164,362 | A | 12/2000 | Yanq |
| D446,070 | S | 8/2001 | Judkins |
| 6,289,964 | B1 | 9/2001 | Colson et al. |
| 6,435,252 | B2 | 8/2002 | Colson et al. |
| 6,460,593 | B1 | 10/2002 | Floyd |
| 6,516,856 | B2 | 2/2003 | Lai |
| 6,530,413 | B2 | 3/2003 | Hwang |
| 6,651,720 | B1 | 11/2003 | DiSilvestro et al. |
| 6,712,115 | B2 | 3/2004 | Judkins |
| 6,792,994 | B2 | 9/2004 | Lin |
| 6,834,701 | B2 | 12/2004 | Colson et al. |
| 6,876,493 | B1 | 4/2005 | Lin |
| 7,059,377 | B2 | 6/2006 | Nien et al. |
| 7,063,122 | B2 | 6/2006 | Colson et al. |
| 7,093,643 | B2 | 8/2006 | Ikle |
| 7,128,126 | B2 | 10/2006 | Smith et al. |
| 7,143,802 | B2 | 12/2006 | Strand et al. |
| 7,159,635 | B2 | 1/2007 | Holt et al. |
| 7,380,582 | B1 | 6/2008 | Anderson et al. |
| 7,500,505 | B2 | 3/2009 | Smith et al. |
| 7,549,455 | B2 | 6/2009 | Harper et al. |
| 7,571,756 | B2 | 8/2009 | Smith et al. |
| 7,617,858 | B2 | 11/2009 | Hoffmann et al. |
| 7,617,859 | B2 | 11/2009 | Auger |
| 7,686,060 | B2 | 3/2010 | Anthony |
| 7,740,044 | B2 | 6/2010 | Gutierrez |
| 7,849,907 | B2 | 12/2010 | Jang |
| 7,857,033 | B2 | 12/2010 | Malausa |
| D659,455 | S | 5/2012 | Marocco |
| D659,456 | S | 5/2012 | Marocco |
| 8,171,640 | B2 | 5/2012 | Colson et al. |
| 8,186,412 | B2 | 5/2012 | Lin |
| D711,156 | S | 8/2014 | Judkins |
| 8,820,386 | B2 | 9/2014 | Mullet et al. |
| 9,062,493 | B2 | 6/2015 | Marocco |
| 9,259,833 | B2 | 2/2016 | Bonini et al. |
| D764,835 | S | 8/2016 | Buccola, Jr. et al. |
| 9,567,802 | B2 | 2/2017 | Buccola, Jr. et al. |
| 9,702,187 | B2 * | 7/2017 | Holt .......................... E06B 9/56 |
| 9,945,177 | B2 * | 4/2018 | Drew ........................ E06B 9/44 |
| 10,641,040 | B2 * | 5/2020 | Holt .......................... E06B 9/44 |
| 11,643,870 | B2 * | 5/2023 | Buccola, Jr. ............ E06B 9/262 160/120 |
| 11,821,212 | B2 * | 11/2023 | Heimbuck .......... E04F 10/0685 |
| 2001/0001414 | A1 | 5/2001 | Colson et al. |
| 2002/0189771 | A1 | 12/2002 | Colson et al. |
| 2003/0000652 | A1 | 1/2003 | Hwana |
| 2004/0074611 | A1 | 4/2004 | Colson et al. |
| 2004/0079492 | A1 | 4/2004 | Lin |
| 2005/0051281 | A1 | 3/2005 | Lai |
| 2005/0087309 | A1 | 4/2005 | Nien et al. |
| 2005/0139329 | A1 | 6/2005 | Hoffman |
| 2006/0027339 | A1 | 2/2006 | Hsu |
| 2006/0137833 | A1 | 6/2006 | Nichols, Jr. et al. |
| 2007/0144686 | A1 | 6/2007 | Drew |
| 2008/0053626 | A1 | 3/2008 | Jarosinski et al. |
| 2008/0093030 | A1 | 4/2008 | Gutierrez |
| 2008/0149280 | A1 | 6/2008 | Smith et al. |
| 2008/0223532 | A1 | 9/2008 | Auger |
| 2011/0061821 | A1 | 3/2011 | Kim |
| 2011/0067820 | A1 | 3/2011 | Hsu |
| 2012/0031572 | A1 * | 2/2012 | Ng ............................ E06B 9/50 160/321 |
| 2012/0118514 | A1 | 5/2012 | Hughes |
| 2012/0222824 | A1 | 9/2012 | Lin |
| 2012/0291964 | A1 | 11/2012 | Marocco |
| 2012/0291965 | A1 | 11/2012 | Marocco |
| 2013/0098564 | A1 | 4/2013 | Jang |
| 2013/0306250 | A1 | 11/2013 | Mullet et al. |
| 2014/0053989 | A1 | 2/2014 | Colson et al. |
| 2014/0166218 | A1 | 6/2014 | Nq |
| 2014/0216666 | A1 | 8/2014 | Smith et al. |
| 2014/0262066 | A1 | 9/2014 | Certain et al. |
| 2014/0262068 | A1 | 9/2014 | Buccola et al. |
| 2014/0262069 | A1 | 9/2014 | Drew et al. |
| 2014/0367053 | A1 | 12/2014 | Cha |
| 2014/0367054 | A1 | 12/2014 | Cha |
| 2015/0047792 | A1 | 2/2015 | Lukosiunas et al. |
| 2015/0226001 | A1 | 8/2015 | Adams et al. |
| 2015/0292261 | A1 | 10/2015 | Chou |
| 2015/0376941 | A1 | 12/2015 | Fujita et al. |
| 2016/0237743 | A1 * | 8/2016 | Holt .......................... E06B 9/34 |
| 2017/0130526 | A1 * | 5/2017 | Gasparrini ................ E06B 9/40 |

FOREIGN PATENT DOCUMENTS

| | | | |
|---|---|---|---|
| CA | 2779772 | A1 | 3/2013 |
| CA | 2656981 | C | 10/2013 |
| CA | 2915204 | A1 | 12/2014 |
| DE | 1093527 | B | 11/1960 |
| EP | 1455048 | A2 | 9/2004 |
| EP | 1895070 | A2 | 3/2008 |
| FR | 1557062 | A | 2/1969 |
| GB | 2182738 | A | 5/1987 |
| TW | 481709 | | 4/2002 |
| WO | 2006/023751 | A2 | 3/2006 |
| WO | 2007/038447 | A2 | 4/2007 |
| WO | 2014/201253 | A2 | 12/2014 |

* cited by examiner

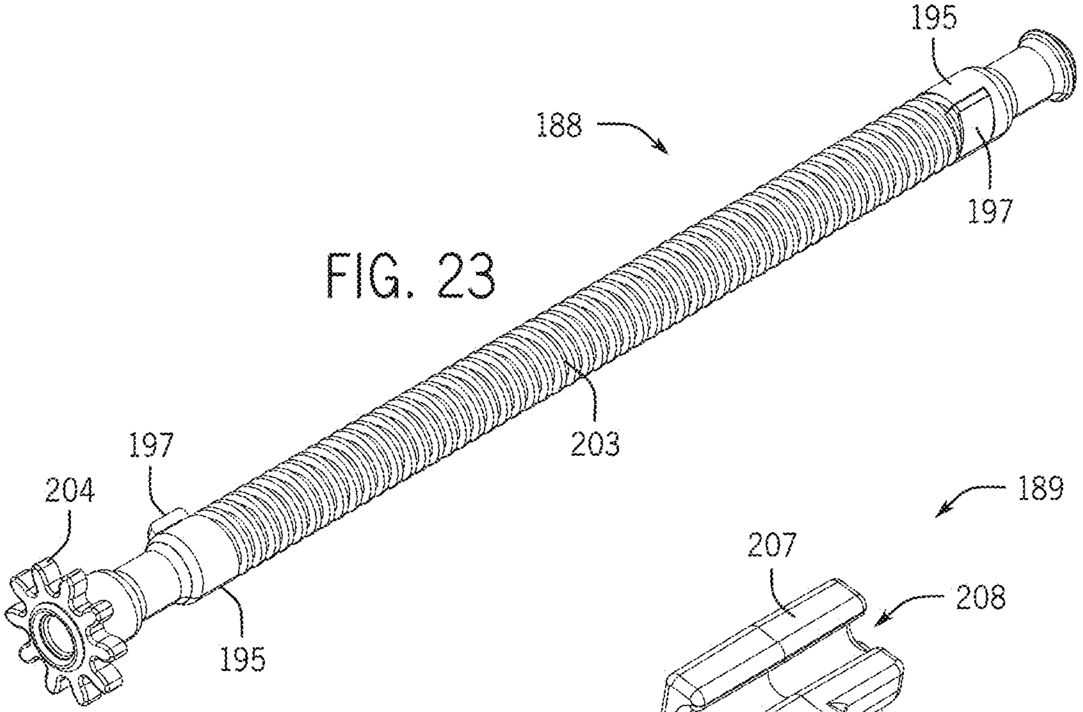
FIG. 23
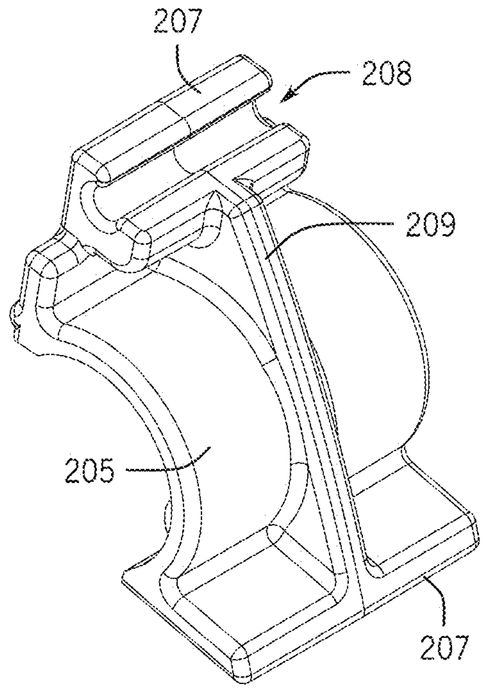
FIG. 25
FIG. 24
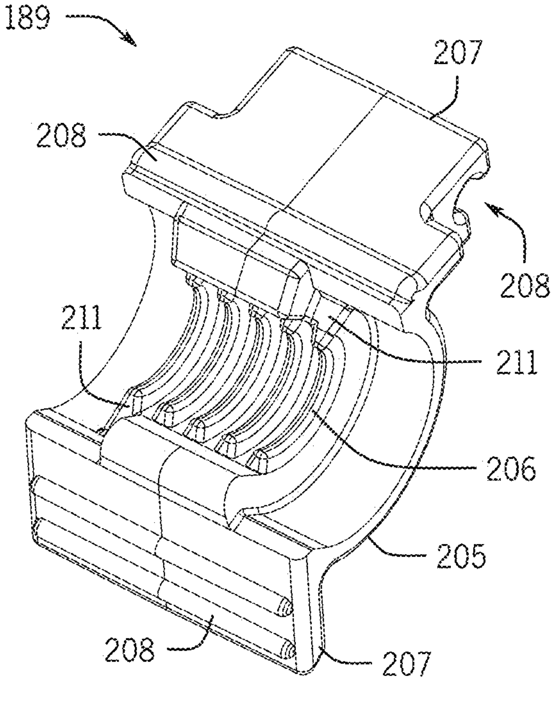

COVERING FOR AN ARCHITECTURAL OPENING HAVING NESTED ROLLERS

CROSS-REFERENCE TO RELATED APPLICATIONS

This application is a continuation of pending U.S. patent application Ser. No. 16/994,765, filed Aug. 17, 2020, and entitled "Covering for an Architectural Opening Having Nested Rollers", which is a continuation of U.S. patent application Ser. No. 15/895,061, now U.S. Pat. No. 10,781,630, filed Feb. 13, 2018, and entitled "Covering for an Architectural Opening Having Nested Rollers", which is a continuation of U.S. patent application Ser. No. 15/412,366, now U.S. Pat. No. 9,909,361, filed Jan. 23, 2017, and entitled "Covering for an Architectural Opening Having Nested Rollers", which is a continuation of U.S. patent application Ser. No. 14/212,387, now U.S. Pat. No. 9,567,802, filed Mar. 14, 2014, and entitled "Covering for an Architectural Opening Having Nested Rollers", which claims the benefit under 35 U.S.C. 119(e) of the earlier filing dates of U.S. Provisional Application No. 61/801,811, filed Mar. 15, 2013, and entitled "Covering for an Architectural Opening having Nested Rollers", and U.S. Provisional Application No. 61/834,080, filed Jun. 12, 2013, and entitled "Covering for an Architectural Opening Having Nested Rollers", which are all hereby incorporated by reference into the patent application in their entireties.

FIELD OF THE DISCLOSURE

The present disclosure relates generally to coverings for architectural openings, and more particularly to apparatus and methods for operating a covering for an architectural opening having nested rollers.

BACKGROUND

Coverings for architectural openings, such as windows, doors, archways, and the like, have taken numerous forms for many years. Some coverings include a retractable shade that is movable between an extended position and a retracted position. In the extended position, the shade of the covering may be positioned across the opening. In the retracted position, the shade of the covering may be positioned adjacent one or more sides of the opening.

Some coverings, when in the fully extended position, transmit light through the material from which the covering is constructed. In some instances, even when the covering has operable vanes that open and close to control the amount of light passing through the covering, a greater amount of darkening is desired. Additionally, or alternatively, in some instances a user may desire a different pattern or appearance of the covering when in the fully extended position. Typically, these goals are accomplished by having a separate roller positioned behind the primary roller for separate actuation by the user. These separate rollers for the supplemental function or appearance increase the size of the head rail, and may require the use of a second set of control cords and operating mechanisms, thus increasing size and weight of the covering structure.

SUMMARY

Examples of the disclosure may include a covering for an architectural opening having nested rollers. In some examples, the covering may include a rotatable outer roller defining an elongated slot extending along a length of the outer roller and opening to an interior of the outer roller, a rotatable inner roller received within the outer roller and defining a central longitudinal axis, a first shade secured to the outer roller, the first shade retractable onto and extendable from the outer roller, and a second shade secured to the inner roller, with the second shade extending through the elongated slot and retractable onto and extendable from the inner roller. The elongated slot may be substantially horizontally aligned with the central longitudinal axis of the inner roller when the first shade is in a fully extended position.

In some examples, the inner and outer rollers are concentric about the central longitudinal axis of the inner roller. In some examples, the first and second shades have the same width. In some examples, the width of the first shade extends along the entire length of the outer roller, and the width of the second shade extends along the entire length of the inner roller. In some examples, the slot is oriented orthogonally to a direction of extension of the first shade.

In some examples, the covering includes a bottom rail secured to the second shade and engaging the outer roller when the second shade is in a fully retracted position. In some examples, the outer roller defines a longitudinal seat formed along the slot, and the bottom rail is received in the seat when the second shade is in the fully retracted position. In some examples, the covering includes a mounting system supporting the inner and outer rollers for rotative movement about the central longitudinal axis of the inner roller. In some examples, the covering includes an operating mechanism for selectively rotating the inner roller.

In some examples, the outer roller includes a first shell and a second shell each having a longitudinally-extending terminal edge, and the edges of the first and second shells are peripherally spaced apart from one another to define the elongated slot. In some examples, the covering includes a first bushing locked into one end of the first and second shells, and a second bushing locked into an opposing end of the first and second shells; wherein the first and second bushings maintain a constant width of the slot.

In some examples, the covering includes a lock mechanism movable between a first position restricting the rotation of the outer roller and a second position permitting rotation of the outer roller. In some examples, the lock mechanism moves from the first position to the second position upon engagement of the bottom rail with the lock mechanism. In some examples, the outer roller defines an elongated groove formed in the sidewall, the lock mechanism includes a bearing, and in the first position of the lock mechanism, the bearing is received in the groove. In some examples, the lock mechanism includes a pin, and the lock mechanism is actuated upon engagement of the pin by the bottom rail to remove the bearing from the groove. In some examples, the bearing movably engages the outer surface of the outer roller in the second position.

In some examples, the lock mechanism includes a locking member that pivots between the first and second positions. In some examples, the lock mechanism includes a locking member that axially translates between the first and second positions. In some examples, the lock mechanism includes a rotatable shaft positioned external to the outer roller and oriented substantially parallel to the central longitudinal axis of the inner roller. In some examples, the covering includes an end cap, the inner and outer rollers are rotatably coupled to the end cap, the lock mechanism includes a housing cantilevered from the end cap, and the rotatable shaft is journaled to the housing. In some examples, the lock mechanism includes a gear mechanism that couples rotation of the rotatable shaft and the outer roller.

In some examples, the covering may include a rotatable outer roller defining an elongated slot, a first shade secured to and wrappable around the outer roller, a lock mechanism positioned external to the outer roller and at least partially defining a bottom stop for the first shade, a rotatable inner roller received within the outer roller, a second shade secured to and wrappable around the inner roller, the second shade extendable and retractable through the elongated slot, and a non-rotatable shaft extending within the inner roller and at least partially defining a bottom stop for the second shade.

In some examples, the lock mechanism includes a rotatable shaft positioned external to the outer roller, and a locking member that axially translates along the rotatable shaft. In some examples, the lock mechanism includes a pivotable locking member positioned external to the outer roller.

Examples of the disclosure may include a method of operating a covering for an architectural opening. In some examples, the method includes unwrapping a first shade from a periphery of an outer roller, upon the first shade reaching a fully extended position, unwrapping a second shade from a periphery of an inner roller positioned within the outer roller, wherein unwrapping the second shade comprises extending the second shade through an elongated slot formed in the outer roller and positioned in substantial horizontal alignment with a central longitudinal axis of the inner roller.

In some examples, the method includes pivoting a locking member into locking engagement with the outer roller to lock rotation of the outer roller, rotating the inner roller relative to the outer roller to retract the second shade onto the inner roller through the elongated slot formed in the outer roller, pivoting the locking member out of locking engagement with the outer roller at a fully retracted position of the inner roller to allow the outer roller to rotate, and rotating the outer roller by driving the inner roller to retract the first shade onto the outer roller.

In some examples, the method includes during extension of the first shade, axially traversing a locking member external to the periphery of the outer roller, restricting rotation of the outer roller with the locking member upon the first shade reaching the fully extended position, during extension of the second shade, axially traversing a nut positioned within the inner roller, and restricting rotation of the inner roller with the nut upon the second shade reaching a fully extended position.

The disclosure is given to aid understanding, and one of skill in the art will understand that each of the various aspects and features of the disclosure may advantageously be used separately in some instances, or in combination with other aspects and features of the disclosure in other instances. Accordingly, while the disclosure is presented in terms of examples, it should be appreciated that individual aspects of any example can be claimed separately or in combination with aspects and features of that example or any other example.

The present disclosure is set forth in various levels of detail in this application and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. It should be understood that the claimed subject matter is not necessarily limited to the particular examples or arrangements illustrated herein.

BRIEF DESCRIPTION OF THE DRAWINGS

The accompanying drawings, which are incorporated into and constitute a part of the specification, illustrate examples of the disclosure and, together with the general description given above and the detailed description given below, serve to explain the principles of these examples.

FIG. 23 is a shaft of the lock mechanism of FIG. 16 in accordance with some examples of the present disclosure.

FIG. 24 is an isometric view of a nut of the lock mechanism of FIG. 16 in accordance with some examples of the present disclosure.

FIG. 25 is another isometric view of the nut of FIG. 24 in accordance with some examples of the present disclosure.

DETAILED DESCRIPTION

Figures 1, 2:
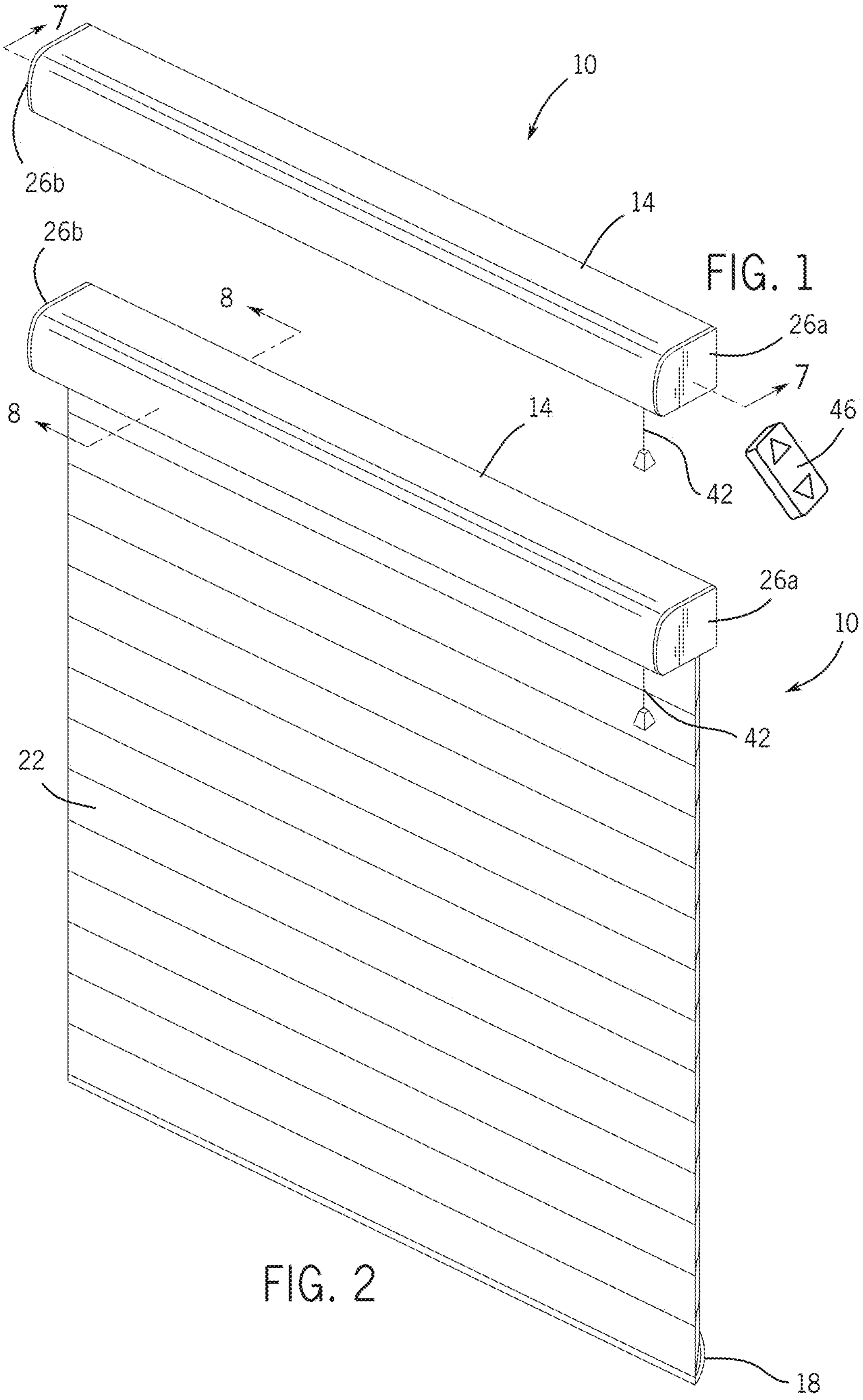
FIG. 1 is an isometric view of a covering with first and second shades in fully-retracted positions in accordance with some examples of the present disclosure.
FIG. 2 is an isometric view of the covering of FIG. 1 with a first shade in a partially-extended position and a second shade in a fully-retracted position in accordance with some examples of the present disclosure.

The present disclosure provides a covering for an architectural opening. In general, the covering may include a first shade and a second shade both suspended from the same head rail by a pair of nested rollers forming a dual roller unit. The first shade (front shade in this configuration) is engaged with an outer roller for retraction onto and extension therefrom by wrapping around and unwrapping from the outer roller as actuated by a user. The second shade (rear shade in this configuration) is engaged with an inner roller, which is positioned inside the outer roller, for retraction onto and extension therefrom by wrapping around and unwrapping from the inner roller as actuated by the user. The inner roller may be positioned inside the outer roller and collectively the inner and outer rollers may form a roller unit, as further described below. The second shade may be extended and retracted as directed by the user when the first shade is in the fully extended position. The operating unit that causes the rollers to rotate as directed by the user may be operated by, for example, a motor or a single control cord. The operating unit may engage and control the rotation of the inner roller, which in turn may control the rotation of the outer tube.

Referring to FIGS. 1-5, a retractable covering 10 for an architectural opening is provided. The retractable covering 10 may include a head rail 14, a first bottom rail 18, a second bottom rail 20, a first shade 22, and a second shade 24. The first shade 22 may extend between the head rail 14 and the first bottom rail 18. The second shade 24 may extend between the head rail 14 and the second bottom rail 20. The head rail 14 may include two opposing end caps 26*a*, 26*b*, which may enclose the ends of the head rail 14 to provide a finished appearance. The first bottom rail 18 may extend horizontally along a lower edge of the first shade 22 and may function as a ballast to maintain the first shade 22 in a taut condition. The second bottom rail 20 may extend horizontally along a lower edge of the second shade 24 and may function as a ballast to maintain the second shade 24 in a taut condition.

The first shade 22 may include vertically suspended front 30 and rear 34 sheets of flexible material (such as sheer fabric) and a plurality of horizontally-extending, vertically-spaced flexible vanes 38. Each of the vanes 38 may be secured along horizontal lines of attachment with a front edge attached to the front sheet 30 and a rear edge attached to the rear sheet 34. The sheets 30, 34 and vanes 38 may form a plurality of elongated, vertically-aligned, longitudinally-extending cells, which collectively may be referred to as a cellular panel. The sheets 30, 34 and/or the vanes 38 may be constructed of continuous lengths of material or may be constructed of strips of material attached or joined together in an edge-to-edge, overlapping, or other suitable relationship. The second shade 24 may be a single panel and may be constructed of strips of material attached or joined together in an edge-to-edge, overlapping, or other suitable relationship.

The first and second shades 22, 24 may be constructed of substantially any type of material. For example, the shades 22, 24 may be constructed from natural and/or synthetic materials, including fabrics, polymers, and/or other suitable materials. Fabric materials may include woven, non-woven, knits, or other suitable fabric types. The shades 22, 24 may have any suitable level of light transmissivity. For example, the first and second shades 22, 24 may be constructed of transparent, translucent, and/or opaque materials to provide a desired ambience or decor in an associated room. In some examples, the first shade 22 includes sheets 30, 34 that are transparent and/or translucent, and vanes 38 that are translucent and/or opaque. In some examples, the second shade 24 is made of a single sheet of material with zero light transmissivity, often referred to as a black-out shade. The second shade 24 may include patterns or designs so that when the second shade 24 is extended behind the first shade 22, the second shade 24 creates a different aesthetic appearance than the first shade 22 by itself.

Referring to FIGS. 1-6, the covering 10 may include a drive or operating mechanism 40 configured to raise or retract the first shade 22, the second shade 24, or both. The operating mechanism 40 may be controlled mechanically and/or electrically. The operating mechanism 40 may include a speed governing device to control or regulate the extension or lowering speed of the shades 22, 24.

In some examples, the operating mechanism 40 may include an operating element 42 (such as a ball chain, a cord, or a wand) to allow the user to extend or retract the first and/or second shades 22, 24. To move the shades 22, 24, an operator may manipulate the operating element 42. For example, to raise or retract the shades 22, 24 from an extended position, the operator may pull the operating element 40 in a downward direction. To extend or lower the shades 22, 24 from a retracted position, the operator may manipulate the operating element 42 to release a brake, which may allow the shades 22, 24 to automatically lower under the influence of gravity.

Additionally, or alternatively, the operating mechanism 40 may include an electric motor 44 configured to extend or retract the shades 22, 24 upon receiving an extension or retraction command. The motor 44 may be hard-wired to a switch and/or operably coupled to a receiver that is operable to communicate with a transmitter, such as a remote control unit 46, to permit a user to control the motor 44 and thus the extension and retraction of the shades 22, 24. The motor 44 may include a gravity lower state to permit the shades 22, 24 to lower via gravity without motor intervention, thereby reducing power consumption.

Figure 6:
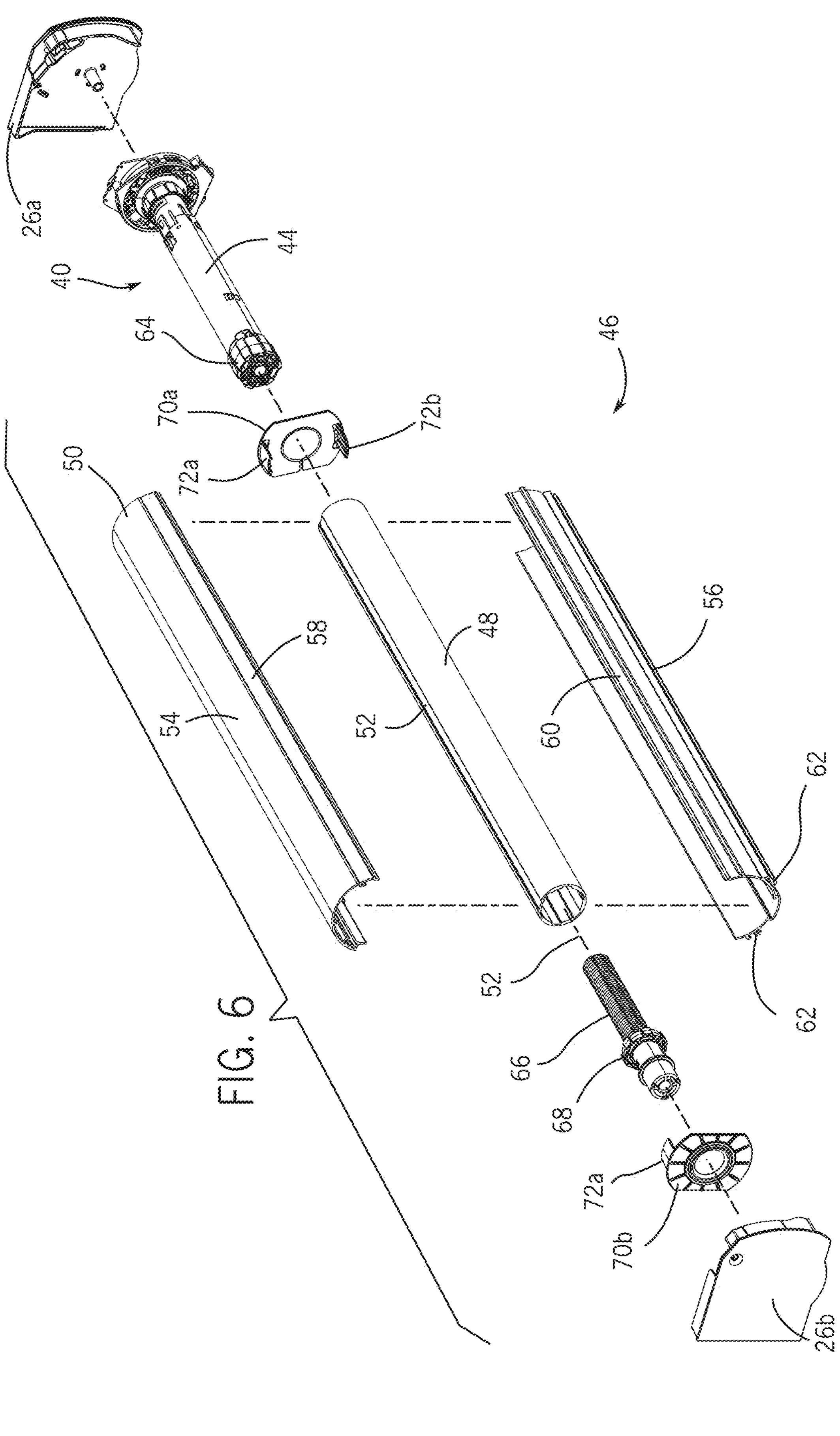
FIG. 6 is an isometric, partially-exploded view of head rail components of a covering in accordance with some examples of the present disclosure. The head rail cover and the first and second shades are not shown for clarity.

Referring to FIG. 6, the covering 10 may include a dual roller unit 46, which may be disposed within the head rail 14. The dual roller unit 46 may include an inner roller 48 and an outer roller 50. The inner roller 48 may be positioned inside the outer roller 50, and the rollers 48, 50 may be coaxially aligned about the same rotational axis 52. The rollers 48, 50 may be concentric about a central axis of the inner roller 48.

Figure 7:
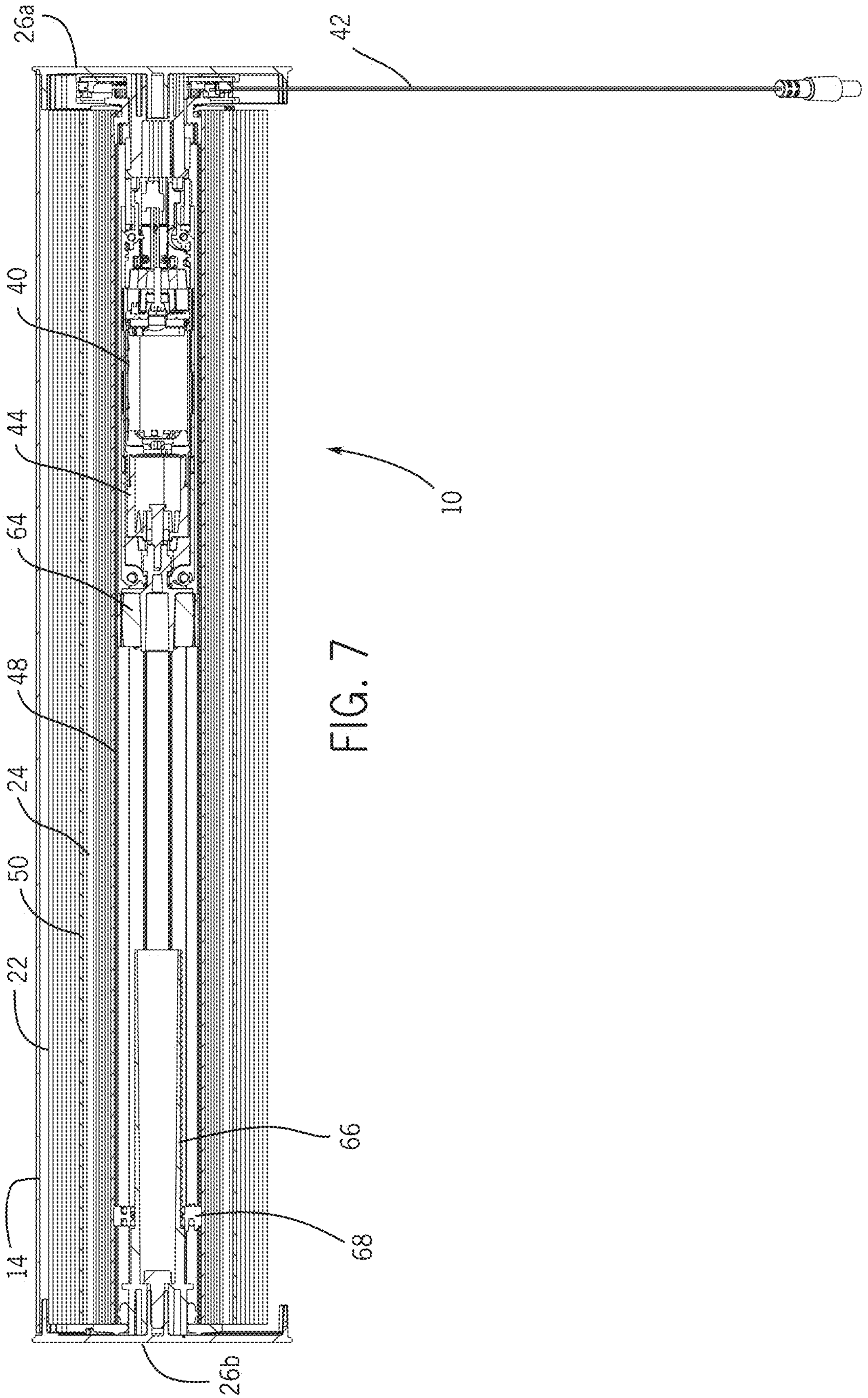
FIG. 7 is a lengthwise cross-sectional view of a covering taken along line 7-7 of FIG. 1 with the head rail components of FIG. 6 in accordance with some examples of the present disclosure.

Referring to FIGS. 6 and 7, the inner roller 48 may be generally cylindrical in shape and may be formed as a tube. The second shade 24 may be attached at a top edge to the inner roller 48 by adhesive, corresponding retention features, or other suitable attachment means. In some examples, a longitudinally-extending recess 52 is formed in the circumferential wall of the inner roller 48 and may receive an adhesive bead configured to adhere the top edge of the second shade 24 to the inner roller 48.

The outer roller 50 may be generally cylindrical in shape and may surround the inner roller 48. The outer roller 50 may be formed of two pieces that interlock with one another. Referring to FIG. 6, the outer roller 50 may include a first shell 54 and a second shell 56 that nest together. Referring to FIGS. 6 and 8-11, longitudinally-extending edge portions 58, 60 of the first and second shells 54, 56, respectively, may overlap and interlock with one another. The first shade 22 may be attached at a top edge to the outer roller 50 by adhesive, corresponding retention features, or other suitable attachment means. In some examples, a pair of channels 62 is formed in the circumferential wall of the outer roller 50 and configured to receive and secure the top edges of the first shade 22. Referring to FIGS. 8-11, inserts 64 may be positioned in a hem formed on each of the top edges and may act to retain the top edges in the respective channels 62.

Referring to FIG. 7, the inner and outer rollers 48, 50 may extend substantially the entire distance between the right and left end caps 26*a*, 26*b*. The inner and outer rollers 48, 50 may have the same or substantially the same length. The first and second shades 22, 24 may have the same or substantially the same width, which may be equivalent to the length of the rollers 48, 50. In some examples, the first and second shades 22, 24 have equivalent widths that match the length of the inner and outer rollers 48, 50, which may eliminate the existence of a light gap between the edges of the shades 22, 24 and the sides of the architectural opening.

Referring to FIGS. 6 and 7, the dual roller unit 50 may be rotatably supported by the opposing end caps 26*a*, 26*b*. The operating mechanism 40 may be anchored to the right end cap 26*a* and may be actuated, for example, by the operating element 42 or the remote control unit 46. The operating mechanism 40 may be operably associated with the inner roller 48 to cause it to rotate. The operating mechanism 40 may include an internal fitting 64, which may be received within the inner roller 48 and may tightly engage the wall of the inner roller 48. The internal fitting 64 may be driven in rotation by the operating mechanism 40, such as the motor 44, and thus may drive the inner roller 48 in rotation. The operating mechanism 40 may include a planetary gear drive often utilized in window covering applications.

Continuing with FIGS. 6 and 7, a limit screw 66 may be positioned inside the inner roller 48 and may be fixed to the left end cap 26*b* such that the limit screw 66 does not rotate. A limit nut 68 may be threadedly engaged with the limit screw 66 and may be rotationally keyed to the wall of the inner roller 48. The key structure may allow movement of the limit nut 68 along the length of the inner roller 48. As the inner roller 48 rotates, the limit nut 68 may move along the threaded limit screw 66, and may engage a limit stop formed on the limit screw 66 to define the lowermost extended position of the second shade 24 (see FIG. 5). Additionally, or alternatively, a top limit stop may be employed on the limit screw 66 if desired.

Referring to FIG. 6, right and left bushings 70*a*, 70*b* may be axially aligned with the inner roller 48 and may be disposed adjacent opposing ends of the inner roller 48. The right bushing 70*a* may be rotatably mounted onto the operating mechanism 40, and the left bushing 70*b* may be rotatably mounted onto the limit screw 66. The bushings 70*a*, 70*b* may lock into the ends of the outer roller 50 to maintain a desired spatial relationship between the shells 54, 56. The bushings 70*a*, 70*b* each may include a pair of axial projections 72*a*, 72*b*. One of the projections 72*a* may engage the first shell 54, and the other projection 72*b* may engage the second shell 56. When the bushings 70*a*, 70*b* are engaged with the opposing ends of the outer roller 50, the bushings 70*a*, 70*b* and the outer roller 50 may rotate in unison about the rotation axis 52 of the inner and outer rollers 48, 50.

Referring to FIGS. 8-11, the first and second shells 54, 56 of the outer roller 50 each may define a retention feature that snugly receives the axial projections 72*a*, 72*b* of the bushings 70*a*, 70*b*. The retention feature may be formed as circumjacently-spaced shelves 74 that extend inwardly from the outer roller 50 into an interior space defined by the outer roller 50. When the bushings 70*a*, 70*b* are engaged with the ends of the outer roller 50, the axial projections 72*a*, 72*b* may be snugly received between the shelves 74 and the circumferential wall of the outer roller 50 to prevent relative movement between the first and second shells 54, 56.

Continuing with FIGS. 8-11, the first and second shells 54, 56 may define a slot 76 extending along a length of the outer roller 50 and in communication with the interior of the outer roller 50. The slot 76 permits passage of the second shade 24 during extension and retraction of the second shade 24. When the first end portions 58, 60 of the first and second shells 54, 56, respectively, are interlocked together, second longitudinally-extending edge portions 78, 80 of the first and second shells 54, 56 may be peripherally spaced apart from one another to define the slot 76. The confronting second edge portions 78, 80 of the first and second shells 54, 56 may be spaced a sufficient distance from one another to permit passage of the second shade 24 yet prevent passage of the bottom rail 20 of the second shade 24. The axial projections 72*a*, 72*b* of the bushings 70*a*, 70*b* may maintain the width of the slot 76 during operation of the covering 10. The slot 76 may be positioned on the outer roller 50 so as to be located above and adjacent to the rearward most of the pair of channels 62 when the first shade 22 is in its extended, vane-open configuration.

With continued reference to FIGS. 8-11, the outer roller 50 may define a recessed seat 81 in the circumferential wall on both sides of the slot 76. The seat 81 may be formed as a recess extending along the length of the slot 76. The seat 81 may include a generally vertically-oriented base wall 84 spanning the slot 76 and formed by the opposing edge portions 78, 80 of the outer roller 50. The seat 81 may be configured to receive the second bottom rail 20 when the second shade 24 is in the fully retracted position (see FIG. 8). The base wall 84 may allow a relatively vertical-tangential engagement and disengagement between the second bottom rail 20 and the outer roller 50. The slot 76 and the seat 81 may be positioned on the circumference of the outer roller 50 above the attachment point 62 of the rear sheet 34 of the first shade 22, and the position of the slot 76 and the seat 81 may be referred to in FIGS. 9-11 as 3 o'clock. The location of the seat 81 and the slot 76 near the furthest rearward position on the circumference of the outer roller 50, along with the shape of the seat 81, may allow for secure receipt of the second bottom rail 20 as it is pulled vertically up and into the seat 81 during retraction (see FIGS. 8-10).

The shape of the seat 81 and its orientation on the outer roller 50 may encourage smooth and predictable disengagement of the second bottom rail 20 from the seat 81 to begin the extension of the second shade 24. The shape and orientation of the seat 81 may allow the bottom rail 20 to drop vertically out of the seat 81, which takes advantage of the force of gravity on the relatively heavy bottom rail 20. The generally tangential orientation of the seat 81 on the outer roller 50 may assist in this regard. The lower free edge of the slot 76 (defined by the edge portion 80 of the second shell 56 of the outer roller 50) may be curved or rounded to allow for smooth travel of the second shade 24 over the edge portion 80 as the second shade 24 is extended and retracted through the slot 76.

The second bottom rail 20 may be an elongated member, having relatively high mass, and defining a groove running along its length to receive and retain a lower edge of the second shade 24. The lower edge of the second shade 24 may be held in the groove of the bottom rail 20 by an insert 82 positioned in a hem formed in the lower edge of the second shade 24. A portion of the profile of the second bottom rail 20 may generally match the shape of the seat 81 formed in the outer roller 50 to conform thereto when the second shade 24 is in the retracted position.

Referring to FIGS. 7-11, the first shade 22 may be coupled to and wrappable about the outer roller 50. An upper edge of each of the front and rear sheets 30, 34 may be attached to the outer roller 50 at circumferentially-spaced locations. The first shade 22 may be wrapped about or unwrapped from a rear side of the outer roller 50, with the rear side of the roller 50 positioned between a front side of the roller 50 and a street side of an associated architectural opening (in FIGS. 8-11, the rear side of the roller 50 is to the right). Generally, rotation of the outer roller 50 in a first direction (counterclockwise in FIGS. 8-11) retracts the first shade 22 by winding it about the outer roller 50 to a position adjacent one or more sides (such as the top side) of an associated architectural opening, and rotation of the outer roller 50 in a second, opposite direction extends the first shade 22 across the opening (such as to the bottom side).

Referring still to FIGS. 7-11, the second shade 24 may be coupled to and wrappable about the inner roller 48. An upper edge of second shade 24 may be attached to the inner roller 48, as discussed previously. The second shade 24 may be wrapped about or unwrapped from a rear side of the roller unit 46, with the rear side of the roller unit 46 positioned between a front side of the roller unit 46 and a street side of an associated architectural opening (in FIGS. 8-11, the rear side of the roller unit 46 is to the right). Generally, rotation of the inner roller 48 in a first direction (counterclockwise in FIGS. 8-11) retracts the second shade 24 by winding it about the inner roller 48 to a position adjacent one or more sides (such as the top side) of an associated architectural opening, and rotation of the inner roller 48 in a second, opposite direction extends the second shade 24 across the opening (such as to the bottom side).

The operation of the covering is described below with reference to FIGS. 1-5 and 7-11. As shown in FIGS. 1 and 7, the first and second shades 22, 24 are in fully-retracted positions and concealed within the head rail 14. In this configuration (see FIG. 7), the second shade 24 is fully wrapped about the inner roller 48 and the first shade 22 is fully wrapped about the outer roller 50. In some examples, the first bottom rail 18 engages a portion of the head rail 14 to define a top limit stop.

To extend the first shade 22 from the head rail 14, the user may actuate the operating mechanism 40 to cause the inner roller 48 to rotate in an extension direction (clockwise in FIGS. 8-11), which in turn causes the outer roller 50 to rotate in an extension direction (clockwise in FIGS. 8-11) due at least in part to the weight of the first bottom rail 18 applying a downward force to the first shade 22. As the first shade 22 extends off of the rear of the outer roller 50, the outer roller 50 generally rotates in unison with the inner roller 48. The dual roller unit 46 generally rotates in the direction the user controls the inner roller 48 to rotate.

Figure 3:
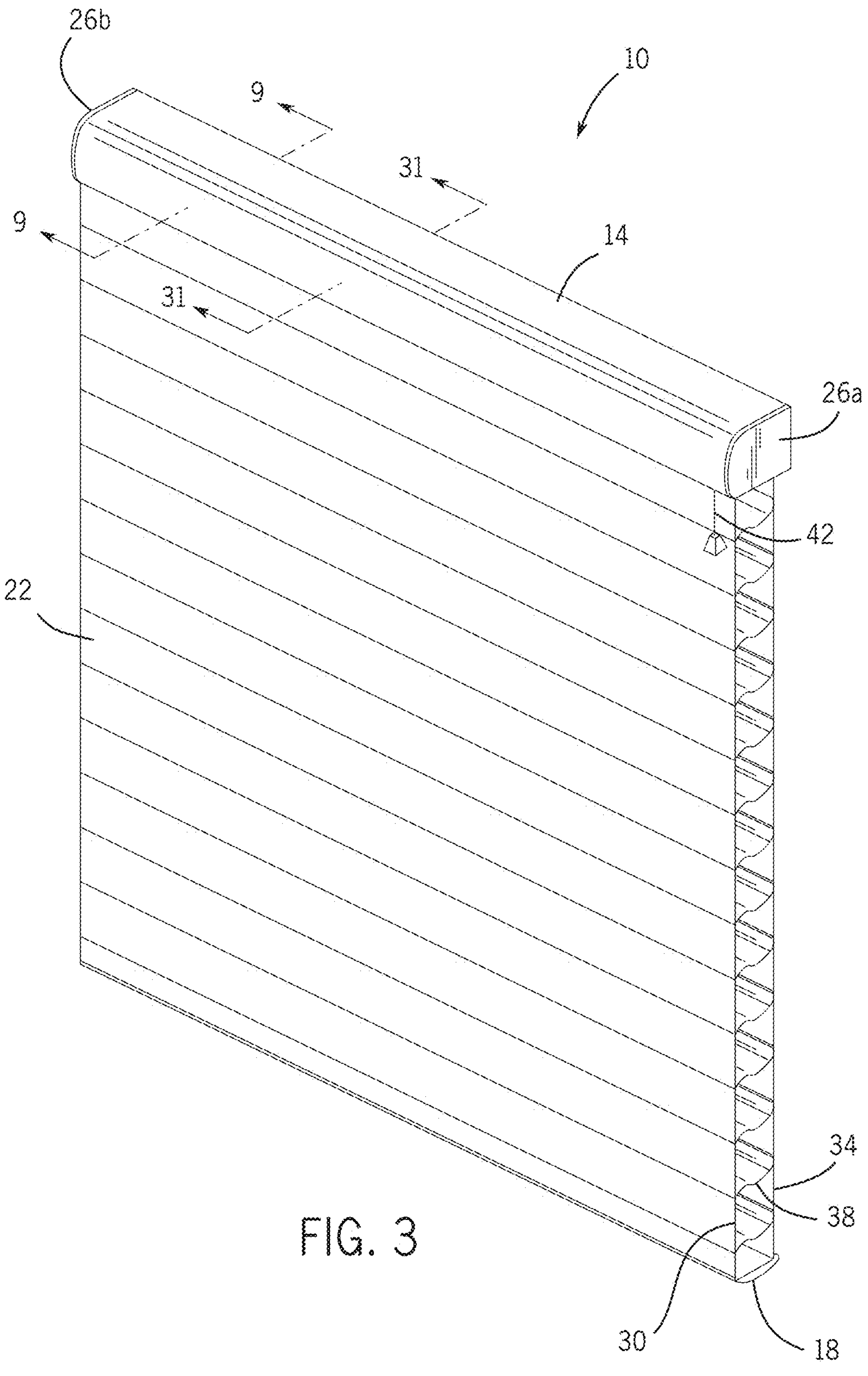
FIG. 3 is an isometric view of the covering of FIG. 1 with a first shade in a fully-extended position and a second shade in a fully-retracted position in accordance with some examples of the present disclosure.
Figure 4:
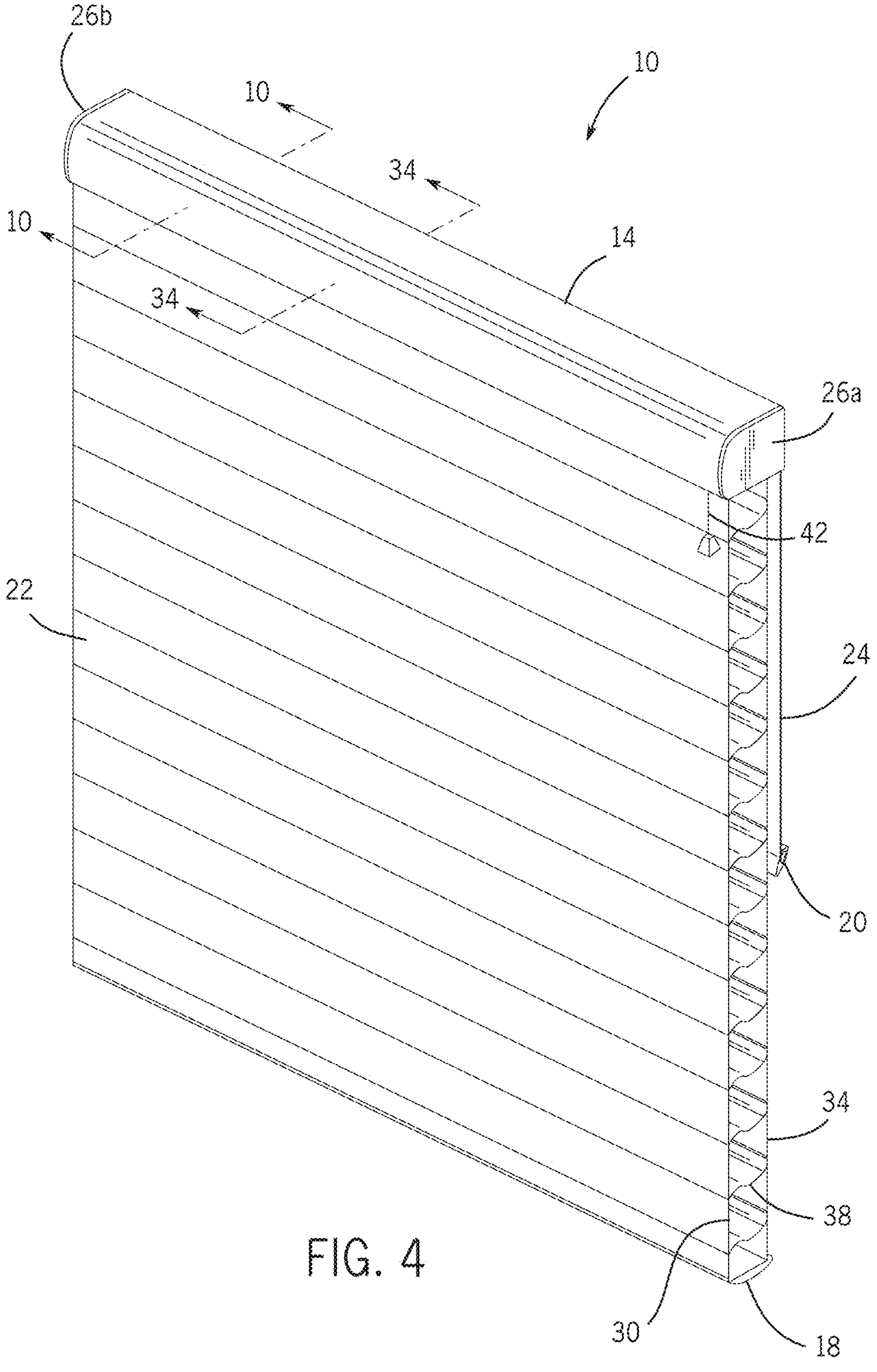
FIG. 4 is an isometric view of the covering of FIG. 1 with a first shade in a fully-extended position and a second shade in a partially-extended position in accordance with some examples of the present disclosure.
Figure 8:
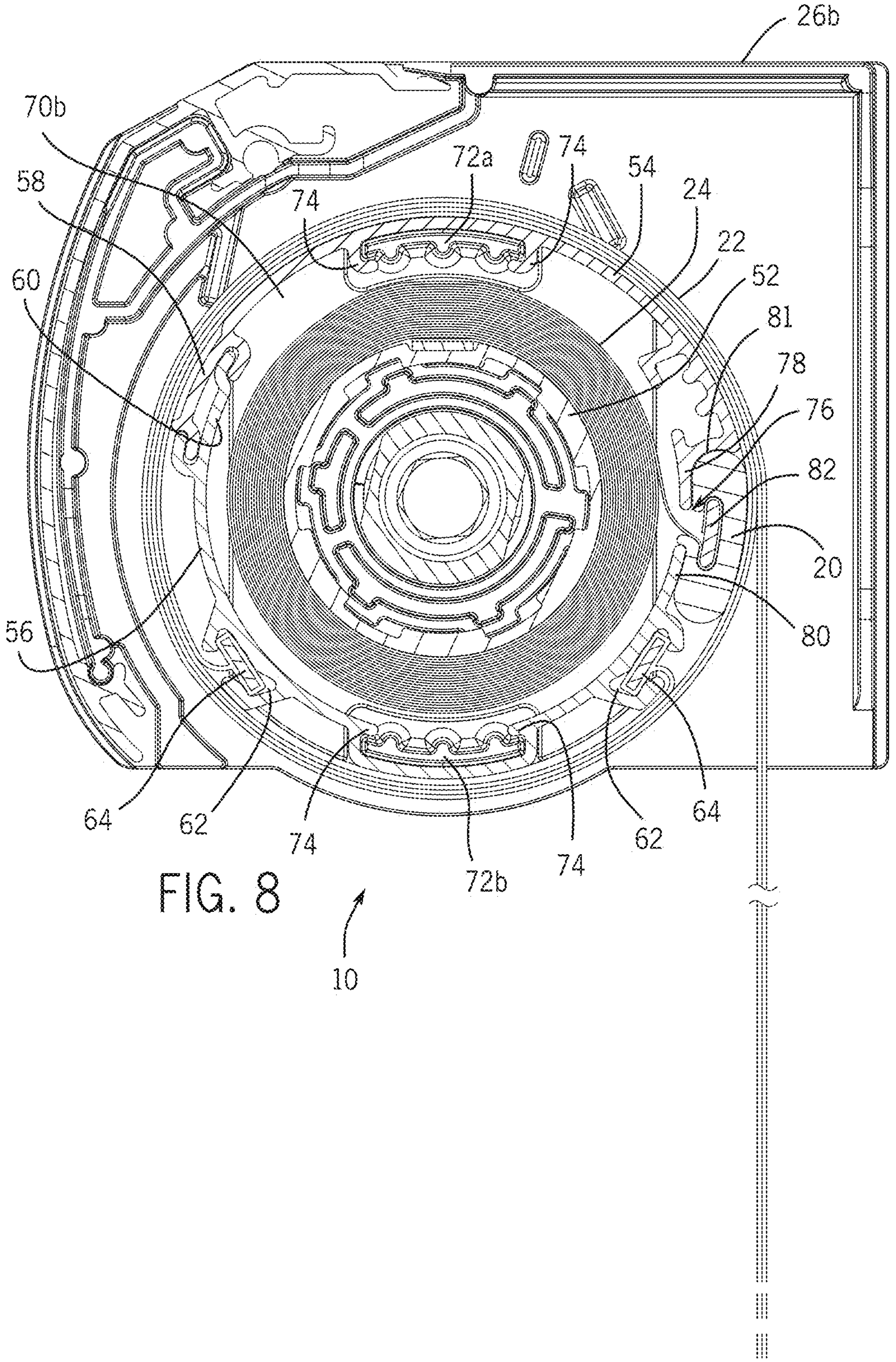
FIG. 8 is a transverse cross-sectional view of a covering taken along line 8-8 of FIG. 2 with the head rail components of FIG. 6 in accordance with some examples of the present disclosure.
Figure 9:
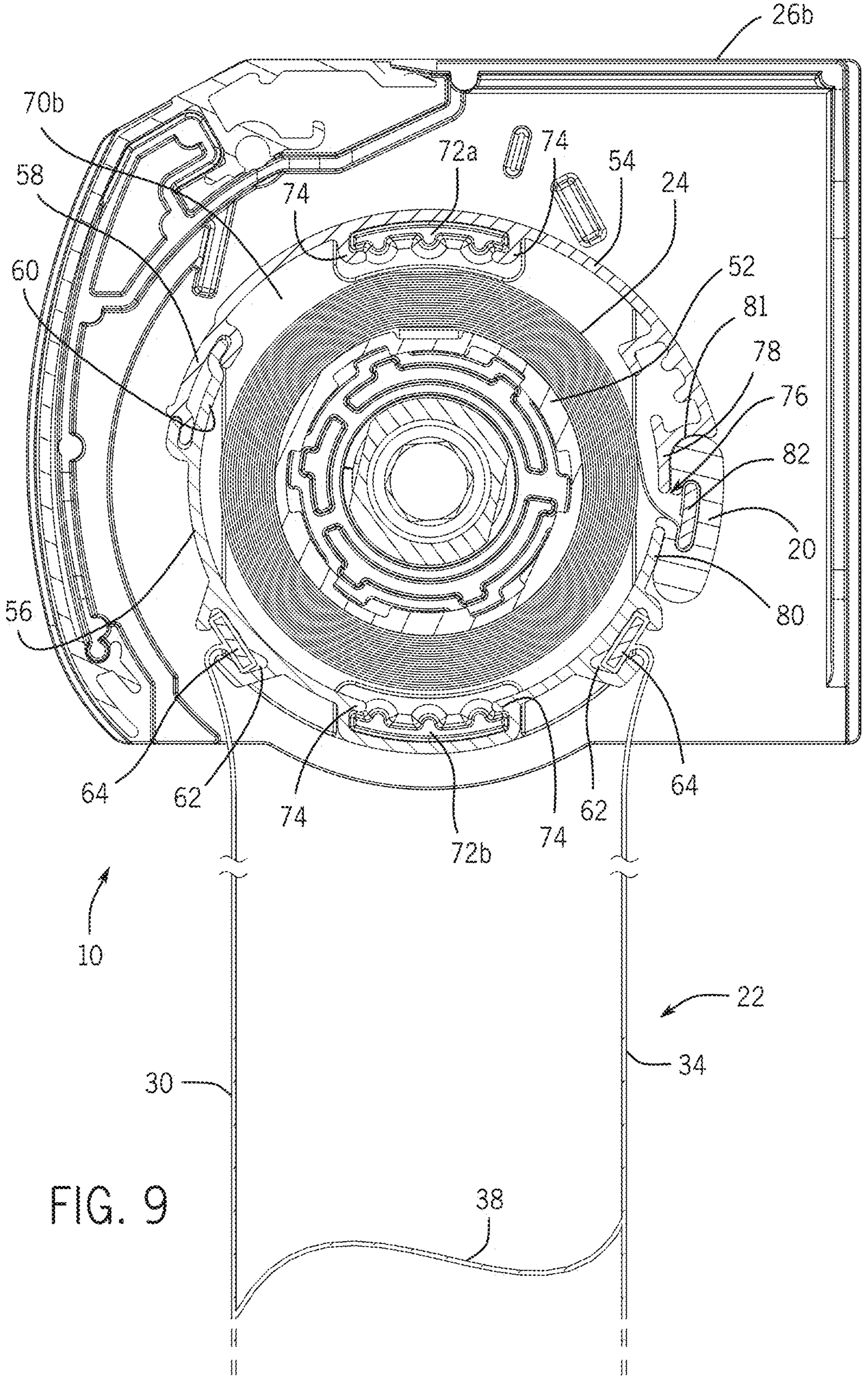
FIG. 9 is a transverse cross-sectional view of a covering taken along line 9-9 of FIG. 3 with the head rail components of FIG. 6 in accordance with some examples of the present disclosure.

Referring to FIGS. 2 and 8, the first shade 22 extends off of the rear of the outer roller 50 in a closed or collapsed configuration in which the front and rear sheets 30, 34 are relatively close together and the vanes 38 extend vertically in an approximately coplanar, contiguous relationship with the front and rear sheets 30, 34. Once the first shade 22 is substantially unwrapped from the outer roller 50, continued rotation of the outer roller 50 in the extension direction moves the front and rear sheets 30, 34 generally vertically relative to each other to shift the vanes 38 from a closed position (FIGS. 2 and 8) to an open position (FIGS. 3 and 9). A rear portion of the first bottom rail 18 may be weighted more than a front portion of the bottom rail 18 to facilitate the full opening of the vanes 38.

Referring to FIGS. 3 and 9, the covering 10 is shown with the first shade 24 in a fully extended position with the vanes 38 in an open or expanded configuration. In this position, the front and rear sheets 30, 34 are horizontally spaced with the vanes 38 extending substantially horizontally therebetween, and the attachment points 62 of the front and rear sheets 30, 34 with the outer roller 50 may be disposed at the same height. In FIG. 9, for instance, the positions of the attachment points 62 may be referred to as being at 4 o'clock and 8 o'clock, and are disposed at substantially the same level with each other. Rotation of the outer roller 50 in either direction from that shown in FIG. 9 causes the front and rear sheets 30, 34 to move toward one another and the vanes 38 to re-orient into more vertical alignment.

When the first shade 22 is fully unwrapped from the outer roller 50, the slot 76 in the outer roller 50 is rotationally oriented within the head rail 14 such that the bottom rail 20 of the second shade 24 may drop vertically out of the seat 81 upon further rotation of the inner roller 48 in the extension direction. The generally tangential orientation and generally vertical positioning of the seat 81, with a relatively vertical base wall 84 (see FIGS. 10 and 11), allows the weight of the second bottom rail 20 to unseat the bottom rail 20 from the outer roller 50 when the tension in the second shade 24 is decreased due to continued rotation of the inner roller 48 in the extension direction. The operating mechanism 40 may include a brake system operably coupled to the inner roller 48 to restrict unwanted downward movement of the second shade 24, and thus of the first shade 22.

Figure 10:
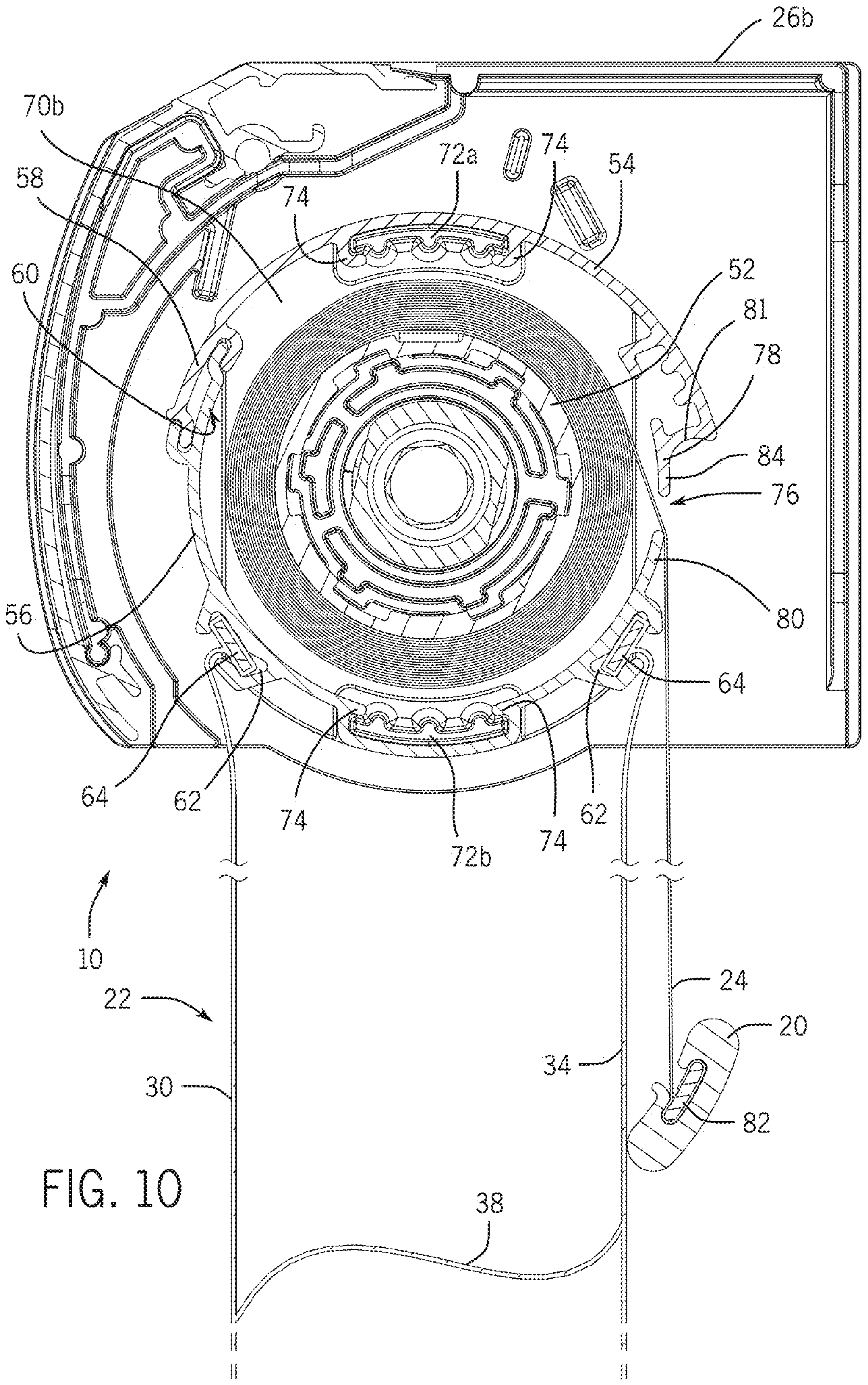
FIG. 10 is a transverse cross-sectional view of a covering taken along line 10-10 of FIG. 4 with the head rail components of FIG. 6 in accordance with some examples of the present disclosure.
Figure 11:
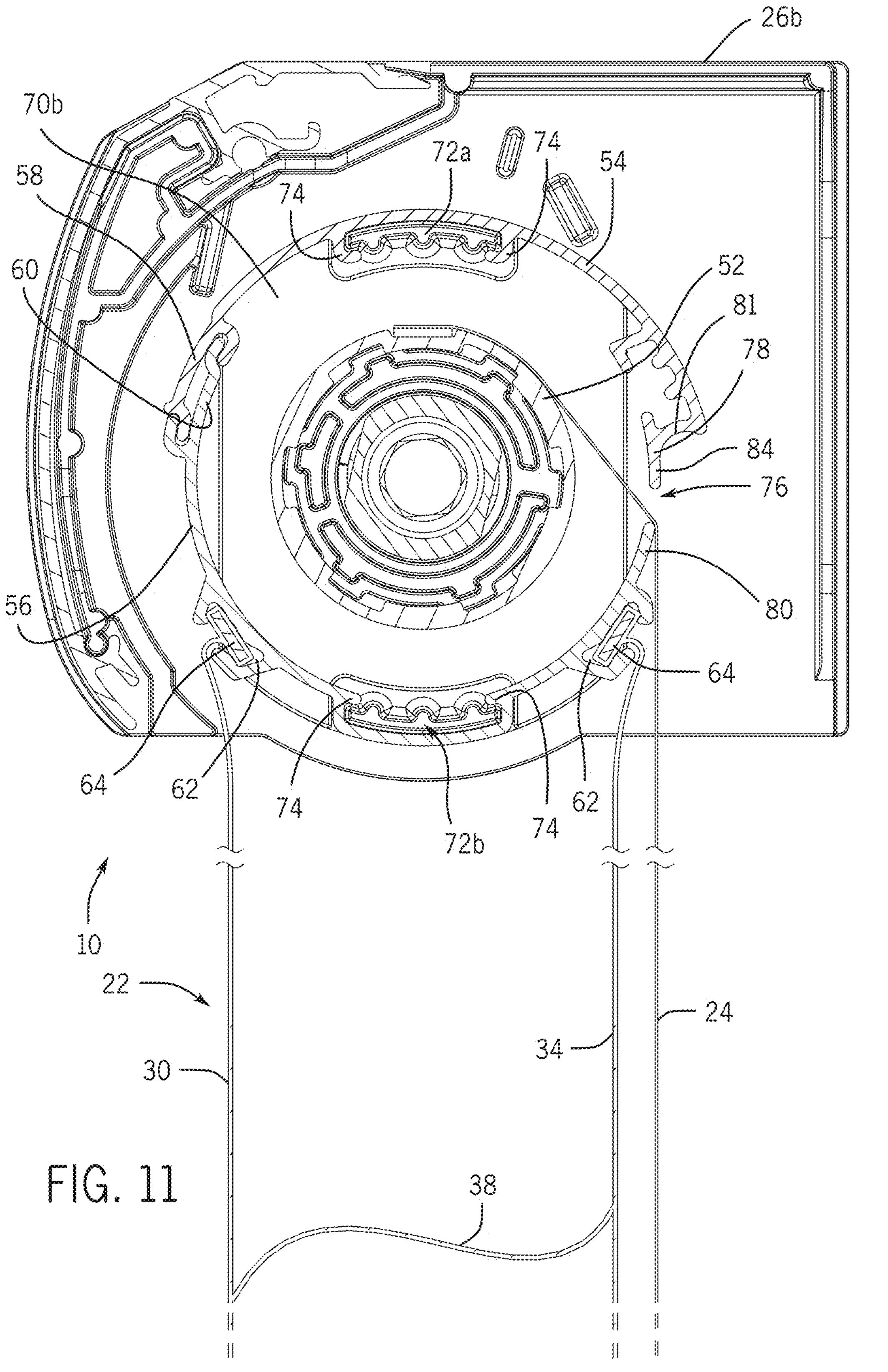
FIG. 11 is a transverse cross-sectional view of a covering taken along line 11-11 of FIG. 5 with the head rail components of FIG. 6 in accordance with some examples of the present disclosure.

In order to extend the second shade 24, the operating mechanism 40 is further actuated by the user to rotate the inner roller 48 in the extension direction. During extension of the second shade 24 (see FIGS. 4 and 10), the outer roller 50 and the first shade 22 may remain stationary due to the weight of the first shade 22 and the weight of the first bottom rail 18 maintaining the rotational position of the outer roller 50, without a positive lock. In some examples, as discussed below, a positive lock may be used to prevent rotation of the outer roller 50 upon full extension of the first shade 22. As shown in FIGS. 10 and 11, during extension of the second shade 24, the slot 76 defined in the outer roller 50 may be directed rearwardly and may be substantially horizontally aligned with the rotational axis 52 (see FIG. 6) of the inner and outer rollers 48, 50. In other words, the second shade 24 may deploy off of the rear side of the inner and outer rollers 48, 50.

During extension of the second shade 24, the inner roller 48 rotates relative to the outer roller 50, with the fitting 64 and the limit nut 68 supporting the respective ends of the inner roller 48. As the inner roller 48 rotates in the extension direction, the second shade 48 is unwound from the inner roller 48 as it is extended through the slot 76 formed in the outer roller 50. The rotation of the inner roller 48 in the extension direction moves the limit nut 68 along the limit screw 66 towards the bottom limit stop.

Figure 5:
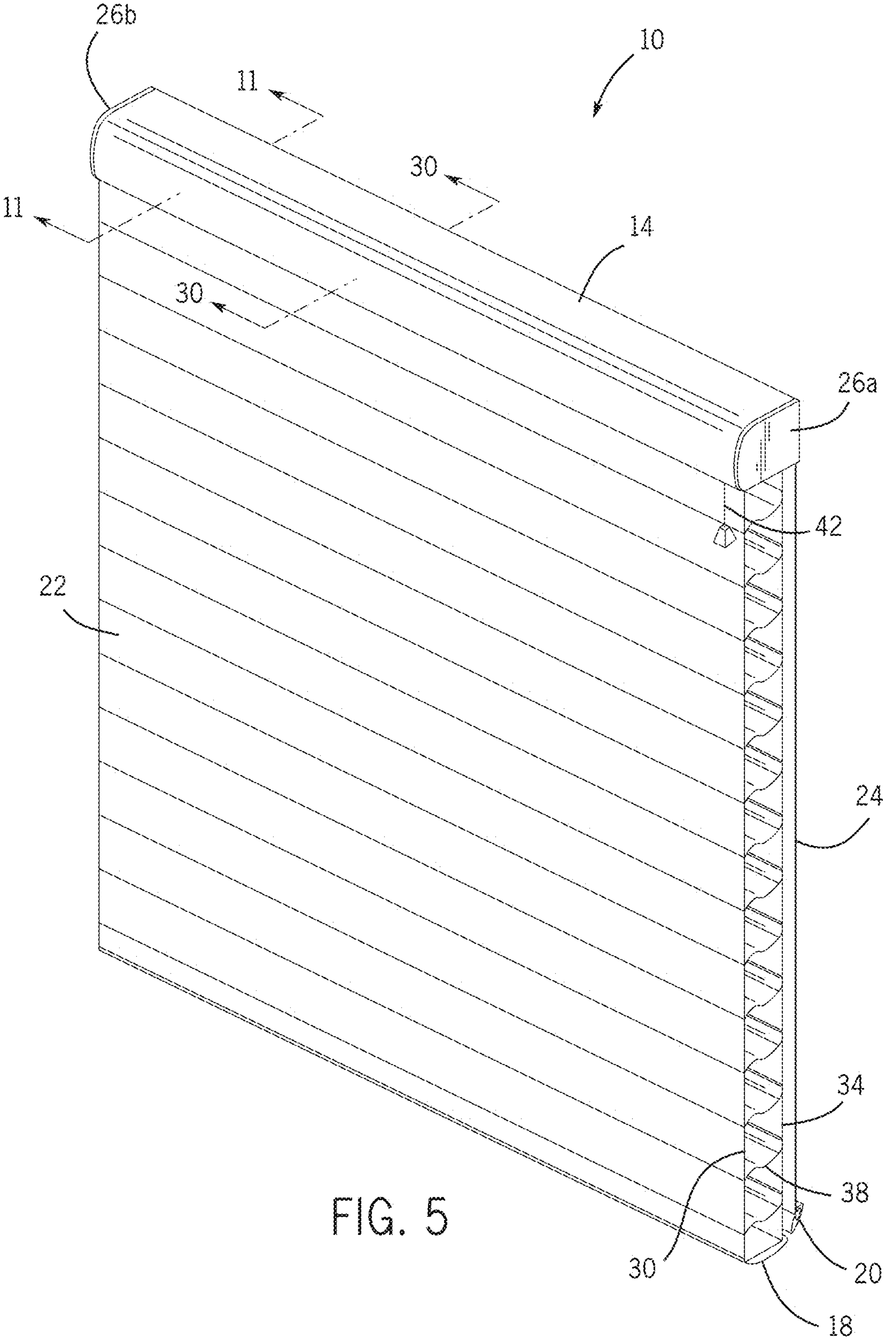
FIG. 5 is an isometric view of the covering of FIG. 1 with first and second shades in fully-extended positions in accordance with some examples of the present disclosure.

Referring to FIGS. 5 and 11, the covering 10 is shown with the first and second shades 22, 24 both in the fully extended positions with the vanes 38 in an open or expanded configuration. In this position, the front and rear sheets 30, 34 are horizontally spaced with the vanes 38 extending substantially horizontally therebetween. The second shade 24 may be a blackout shade and inhibit light from passing through the second shade 24, and thus through the first shade 22. When the second shade 24 is fully extended (see FIGS. 5 and 11), the second shade 24 may be offset rearwardly from the first shade 22, but may extend coextensively in length and width with the first shade 22. To control the amount of light passing through the first shade 22, the second shade 24 may be withdrawn into the head rail 14 and wrapped about the inner roller 48 of the dual roller unit 46.

When the second shade 24 is in the fully extended position (lowermost extension), the limit nut 68 may be positioned on the limit screw 66 (see FIG. 6) in engagement with a lower limit stop formed on the limit screw 66 to prevent further rotation of the inner roller 48. The limit screw 66 also may include an upper limit stop to define the upper limit of the covering 10. Alternatively, the bottom rail 18 of the first shade 22 may engage a portion of the head rail 14 when the first shade 22 is fully retracted to serve as the upper limit stop of the covering 10.

At any point during the extension process, the user may stop the operating mechanism 40 or reverse the direction of the operating mechanism 40 to move the first and second shades 22, 24 into a desired position. In examples including a motorized covering 10, pre-programmed commands may be used to control the motor 44 and thus control the position of the first and second shades 22, 24. The commands may instruct the motor 44 to move the first and second shades 22, 24 into predetermined shade positions, such as a first position in which the first and second shades 22, 24 are fully retracted, a second position in which the first shade 22 is fully extended and the second shade 24 is fully retracted, and a third position in which the first and second shades 22, 24 are fully extended. The commands may be transmitted to the motor 44 by the remote control unit 46.

Retraction of the first and second shades 22, 24 may be accomplished in reverse order as compared to the extension sequence described above, such as generally following FIG. 11 to FIG. 8. In FIGS. 5 and 11, the first and second shades 22, 24 are disposed in fully extended positions. When both the first and second shades 22, 24 are in the fully extended position, the limit nut 68 (see FIG. 6) may be engaged with a lower limit stop, which may be formed on the limit screw 66. Actuation of the operating mechanism 40, such as by the operating element 42 and/or the motor 44, from this position moves the limit nut 68 axially away from the lower limit stop and begins the retraction process of the covering 10. The retraction process generally involves actuation of the operating mechanism 40 to first rotate the inner roller 48 in a retraction direction (counterclockwise in FIG. 11) to retract the second shade 24, and when the second shade 24 is fully retracted, the outer roller 50 is then rotated in a retraction direction (counterclockwise in FIG. 11) to retract the first shade 22 onto the outer roller 50. This sequence is described further below.

To retract the second shade 24 from the fully extended position of FIGS. 5 and 11, the user actuates the operating mechanism 40 to cause the inner roller 48 to rotate in a retraction direction (counterclockwise in FIGS. 8-11), which in turn wraps the second shade 24 about the inner roller 48 and raises the second bottom rail 20 upwardly along a rear face of the rear sheet 34 of the first shade 22. During retraction of the second shade 24, the inner roller 48 rotates relative to the outer roller 50, with the fitting 64 and the limit nut 68 supporting the respective ends of the inner roller 48. As the inner roller 48 rotates in the retraction direction, the second shade 24 is wound onto the inner roller 48 as it is pulled through the slot 76 formed in the outer roller 50. The rotation of the inner roller 48 in the retraction direction moves the limit nut 68 along the limit screw 66 towards the opposite end of the limit screw 66. Also during the retraction of the second shade 24, the first shade 22 remains in the fully extended, open position due to the weight of the first bottom rail 18 and the weight of the portion of the first shade 22 suspended from the outer roller 50 acting upon the outer roller 50 to inhibit rotation of the outer roller 50. This allows the user to move the second shade 24 between fully extended and fully retracted positions without affecting the position or orientation of the first shade 22.

Referring to FIGS. 9 and 10 in reverse order, as the second shade 24 is further withdrawn into the outer roller 50, the second bottom rail 20 becomes securely positioned in the seat 81. Upon the bottom rail 20 engaging the seat 81 of the outer roller 50, the driving force of the operating mechanism 40 may be transferred through the second shade 24 to the outer roller 50. That is, the operating mechanism 40 may apply a rotational force to the inner roller 48, which in turn may be applied to the outer roller 50 through the engagement of the bottom rail 20 in the seat 81 under the tension of the second shade 24. Referring to FIGS. 8 and 9, when the second shade 24 is fully wrapped onto the inner roller 48 and the second bottom rail 20 is received in the seat 81 of the outer roller 50, the outer roller 50 may be driven in a retraction direction (counterclockwise in FIGS. 8 and 9) by the operating mechanism 40, through rotation of the inner roller 48 in the same retraction direction. As such, when the bottom rail 20 is received in the seat 81 and a retraction force (counterclockwise in FIGS. 8 and 9) is applied to the inner roller 48 by the operating mechanism 40, the outer roller 50 generally rotates in conjunction with the inner roller 48.

Referring to FIG. 8, as the outer roller 50 continues to rotate in the retraction direction, the first shade 22 wraps around the outer roller 50. The first shade 22 is under tension as it is wrapped around the outer roller 50 due to the suspended portion of the first shade 22 and the weight of the bottom rail 18.

When the first shade 22 is fully retracted, the first bottom rail 18 may engage a portion of the head rail 14, such as an abutment, to serve as a top limit stop for the dual roller unit 46. It is contemplated that other mechanisms may be utilized to define the top retraction position, including a top limit stop positioned on the limit screw 66 opposite the bottom limit stop. For example, a top limit stop may be formed on the limit screw 66 and positioned along the screw 66 such that the nut 68 engages the top limit stop upon full retraction of the first shade 22.

As explained above, the retraction of the second shade 24 and then the first shade 22 from the fully extended position occurs with the user actuating a single operating element 42 or a motor 44 for the retraction of both shades 22, 24. The limit screw 66 includes a sufficient length to allow the limit nut 68 to move along the screw 66 from the bottom limit stop until the top retracted position is attained. It is contemplated that the first shade 22 may be wrapped about or unwrapped from the front side of the outer roller 42. Accompanying modifications to the structure described herein would be necessary to facilitate the implementation of the dual roller shade technology as applied to a front-descending shade structure.

The covering may include a lock mechanism that restricts rotation of the outer roller 50 when the first shade 22 is in the fully extended position, thereby ensuring the first shade 22 remains in the fully extended position and is substantially unaffected by rotation of the inner roller 48 during extension of the second shade 24. The lock mechanism may be movable (such as pivotable, translatable, or other suitable movements) between a first position that restricts rotation of the outer roller 50 and a second position that permits rotation of the outer roller 50. In one example, the lock mechanism includes a locking member positioned external to the outer roller 50 that translates longitudinally along an outer periphery of the outer roller 50 and engages a stop to restrict rotation of the outer roller 50. In another example, the lock mechanism includes a locking member positioned external to the outer roller 50 that pivots into engagement with the outer roller 50 to restrict rotation of the outer roller 50.

Referring to FIGS. 12-27, a covering for an architectural opening is provided that uses a lock mechanism to positively lock rotation of the outer roller upon full extension of the first shade 22. With the exception of a lock mechanism and retaining clips, the covering depicted in FIGS. 12-27 generally has the same features and operation as the covering depicted in FIGS. 1-11. Accordingly, the preceding discussion of the features and operation of the covering depicted in FIGS. 1-11 should be considered generally applicable to the covering depicted in FIGS. 12-27, except as noted in the following discussion. The reference numerals used in FIGS. 12-27 generally correspond to the reference numerals used in FIGS. 1-11 to reflect the similar parts and components, except the reference numerals are incremented by one hundred.

Figure 12:
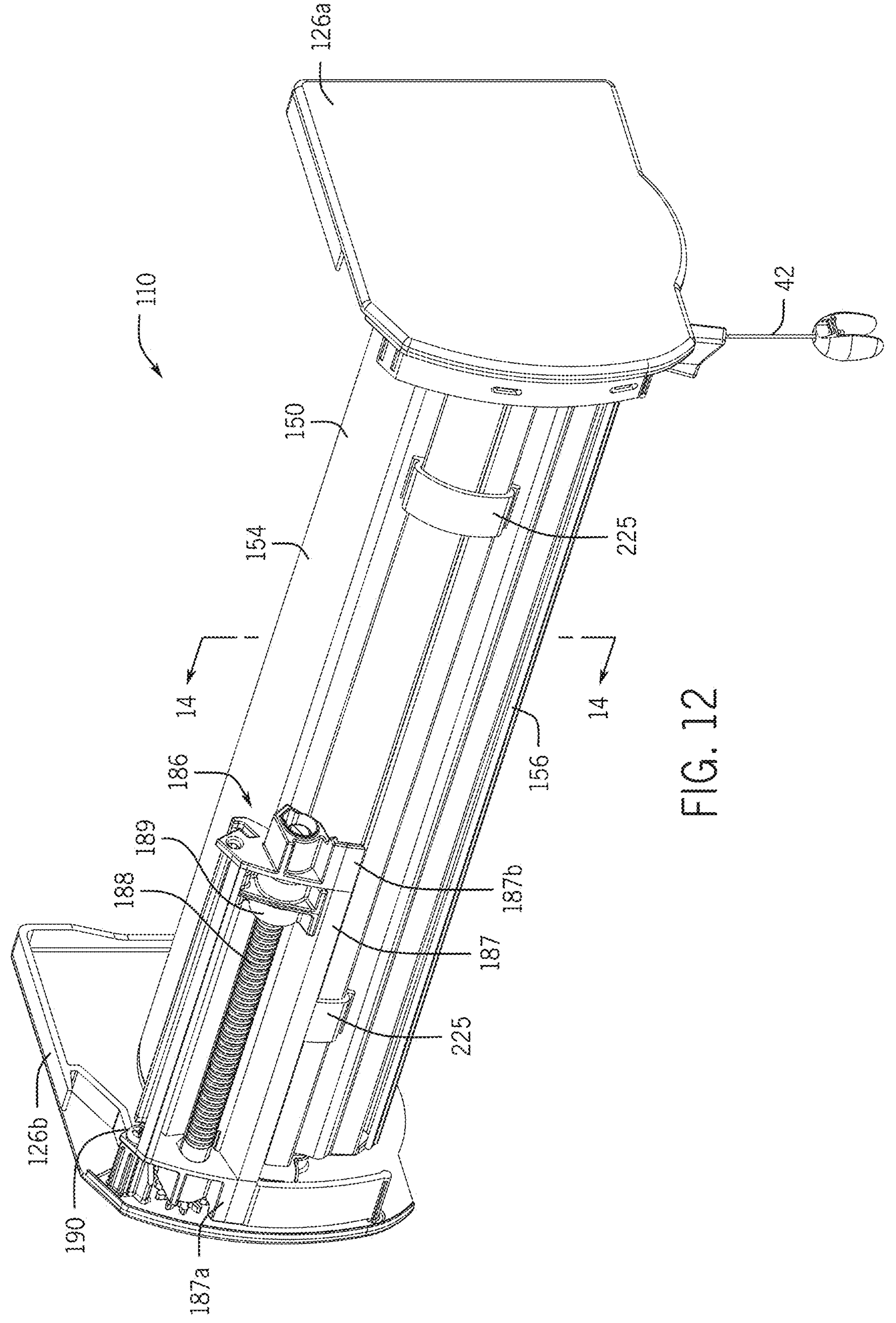
FIG. 12 is an isometric view of head rail components of a covering in accordance with some examples of the present disclosure. The head rail cover is not shown for clarity.

Referring to FIG. 12, the covering 110 includes an axially movable lock mechanism 186 that, similar to the pivotally movable lock mechanism discussed below in connection with FIGS. 28-47, restricts rotation of the outer roller 50 when the first shade 22 is in the fully extended position. The axially movable lock mechanism 186 may include a housing 187, a rotatable shaft 188 journaled to the housing 187, and a nut 189 threadedly engaged with and travelable axially along the shaft 188. Although the axially movable lock mechanism 186 is depicted in conjunction with the left end cap 126*b*, the lock mechanism 186 may be used in conjunction with the right end cap 126*a*.

Figure 16:
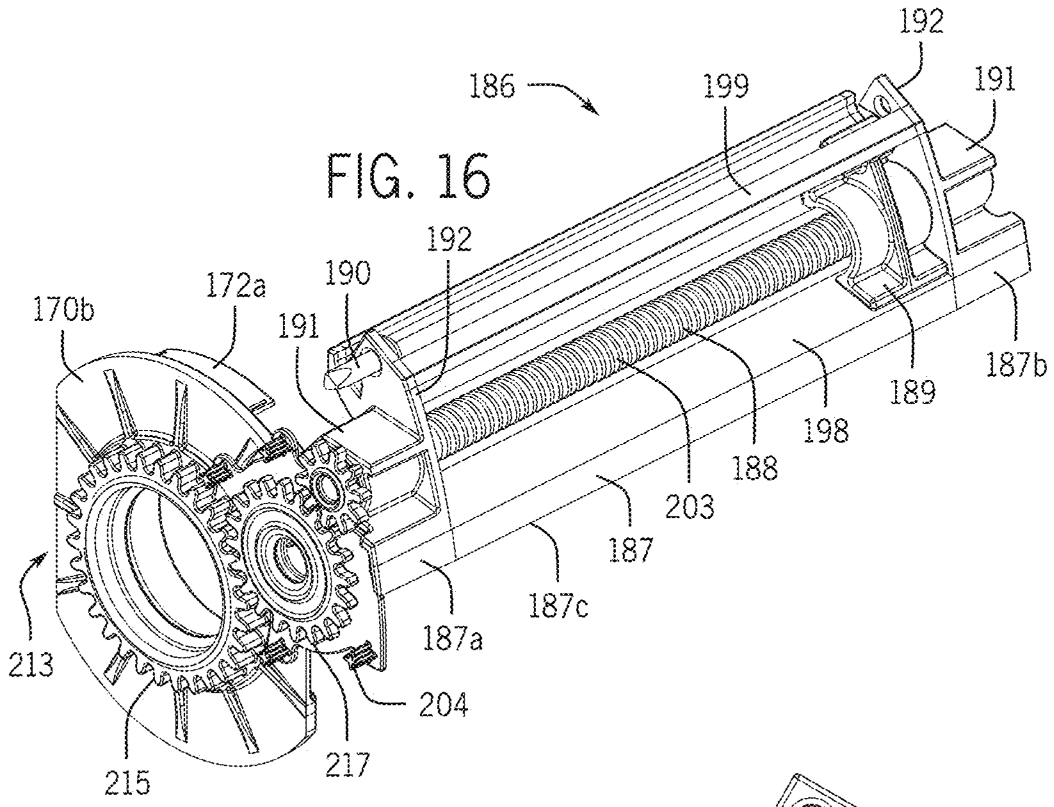
FIG. 16 is an isometric view of a lock mechanism of the head rail components of FIG. 12 in accordance with some examples of the present disclosure.
Figure 18:
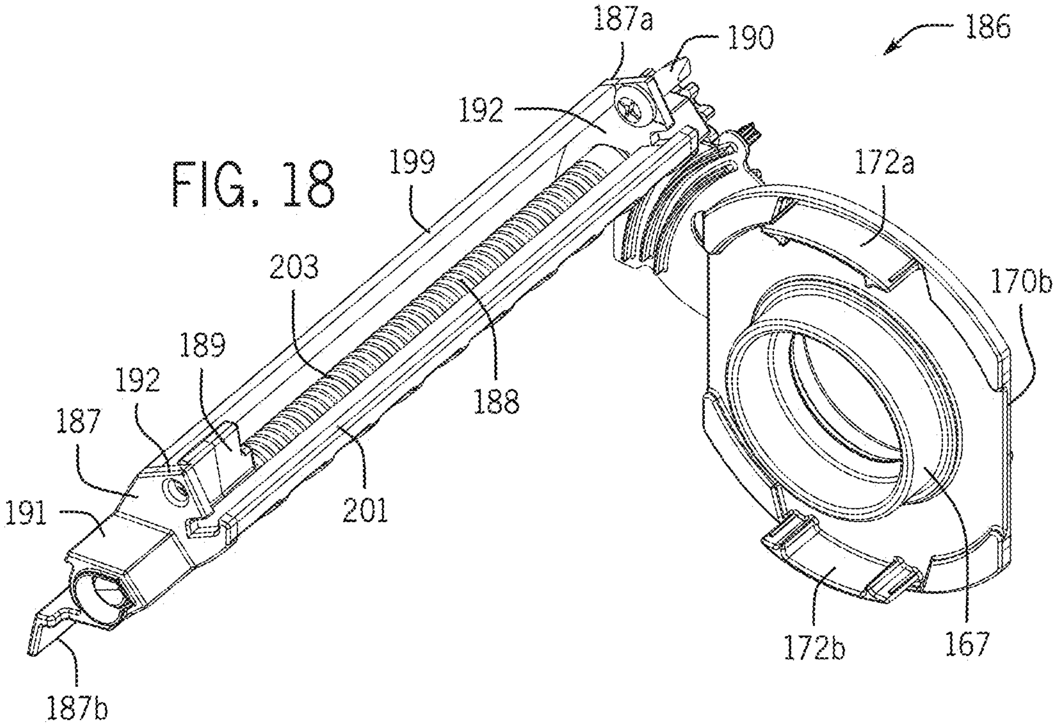
FIG. 18 is another isometric view of the lock mechanism of FIG. 16 in accordance with some examples of the present disclosure.

Referring to FIGS. 12, 16, and 18, the housing 187 may be cantilevered from the left end cap 126*b* and extend axially away from the left end cap 126*b* along an outer periphery of the outer roller 150 towards the right end cap 126*a*. One end 187*a* of the housing 187 may be removably connected to the left end cap 126*b* with a fastener 190, and an opposing, free end 187*b* of the housing 187 may be positioned laterally outward of the outer roller 150. The housing 187 may be laterally separated from the periphery of the outer roller 150 by a sufficient distance so as to not interfere with the wrapping or unwrapping of the first shade (not shown) about or from the outer roller 150. The housing 187 may be laterally separated from the periphery of the outer roller 150 by a uniform distance.

With reference to FIGS. 16, 18, 21, and 26, the opposing end portions 187*a*, 187*b* of the housing 187 may include axially-extending collars 191 and abutment flanges 192 extending outward from the collars 191. The collars 191 may include an internal wall 193 (see FIGS. 22 and 26) that defines a shaft aperture 194 that receives a journal portion 195 of the rotatable shaft 188, which rotatably bears against the internal wall 193. The internal wall 193 of the collar 191 also may define a key hole 196 that permits passage of the rotatable shaft 188 (particularly the stops 197 formed on the rotatable shaft 188) during axial insertion or removal of the shaft 188 into or out of the housing 187. The abutment flanges 192 each may define a fastener aperture configured to receive a fastener 190 that connects the housing 187 to a respective end cap 126*a*, 126*b* (see FIGS. 12, 14, 16, 18, and 22). The end portions 187*a*, 187*b* of the housing 187 may be mirror images of one another to facilitate interconnection of the housing 187 to either the left or right end caps 126*a*, 126*b*.

Figure 27:
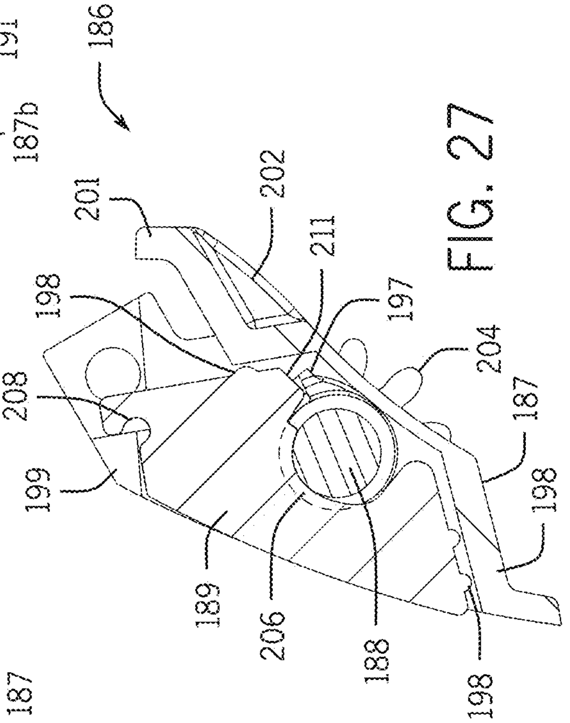
FIG. 27 is a transverse cross-sectional view of the housing, the nut, and the shaft of FIG. 26 taken along line 27-27 of FIG. 26 in accordance with some examples of the present disclosure.

With continued reference to FIGS. 12, 16, 18, 21, and 26, the housing 187 may include an intermediate portion 187*c* that interconnects the end portions 187*a*, 187*b*. The intermediate portion 187*c* may extend longitudinally along an outer periphery of the outer roller 150 in a laterally spaced relationship. The intermediate portion 187*c* of the housing 187 may include a base 198 and a guide rail 199 each spanning the distance between the opposing end portions 187*a*, 187*b* of the housing 187. The base 198 of the housing 187 may define stop receiving apertures 200 proximate to the end portions 187*a*, 187*b* to permit passage of the shaft 188 stops during rotation of the shaft 188 relative to the housing 187, thereby reducing the transverse profile of the housing 187. The base 198 of the housing 187 also may include a stiffening rib 201 extending longitudinally between the end portions 187*a*, 187*b* that stiffens the housing 187 and reduces lateral displacement or buckling of the intermediate portion 187*c* of the housing 187. As shown in FIG. 27, the stiffening rib 201 may include at least one transversely-extending buttress 202 that further increases the stiffness of the longitudinally-extending rib 201.

Referring to FIGS. 12, 16-19, 23, and 26, the shaft 188 of the axially movable lock mechanism 186 may be offset from, but parallel or substantially parallel to, a rotation axis 152 of the inner roller 148. The shaft 188 may be positioned external to the outer roller 150 and extend longitudinally along an outer periphery of the outer roller 150 in a spaced relationship. The shaft 188 may include journal portions 195 rotatably received within the collars 191 of the housing 187. The journal portions 195 of the shaft 188 may include recessed circumferential areas that reduce the contact areas (and thus the friction) between the bearing surface 193 of the collars 191 and the journal portions 195 of the shaft 188. The shaft 188 may include a threaded portion 203 extending between the journal portions 195 of the shaft 188 and between the collars 191 of the housing 187. Stops 197 may be formed on the shaft 188 near the terminal ends of the threaded portion 203 of the shaft 188. The stops 197 may extend radially outward from the shaft 188 and may be axially aligned with the apertures 200 formed in the base 198 of the housing 187 (see FIG. 21) so that during rotation of the shaft 188 relative to the housing 187 the stops 197 rotationally pass in and out of the apertures 200. A gear 204 may be non-rotatably attached to one end of the shaft 188 and may define a central cavity for laterally locating the gear (and thus the shaft 188) relative to the end cap 126*b*.

Referring to FIGS. 12, 16, 18, and 24-27, the nut 189 of the axially movable lock mechanism 186 is positioned at least partially within the housing 187 and travels axially along the shaft 188 within the intermediate portion 187*c* of the housing 187. The nut 189 is keyed to the housing 187 so that as the shaft 188 rotates the nut 189 translates along, rather than rotates about, the shaft 188. The nut 189 includes a body 205 that extends only partially around the shaft 188 and may be referred to as a half-nut 189. In an alternative design, the nut 189 may extend around the entire circumference of the shaft 188.

Referring to FIGS. 24 and 25, the nut 189 includes an internal thread 206 that projects inward from the body 205 and threadedly engages the external thread of the threaded portion 203 of the shaft 188. To maintain engagement of the threads and restrict rotation of the nut 189 about the shaft 188, the nut 189 may include two longitudinally-extending wings 207 that project radially outward from the body of the nut 189. The wings 207 may include axially-extending fins 208 that slidably contact confronting faces of the base 198 of the housing 187 (see FIG. 27) and guide the nut 189 axially along the intermediate portion 187*c* of the housing 187 while reducing the contact area (and thus the friction) between the nut 189 and the housing 187.

One of the wings 207 may define a longitudinally-extending slot 208 that at least partially receives the guide rail 199. As shown in FIG. 27, portions of the wing 207 defining the slot 208 may slidably abut different sides of the guide rail 199. As such, the wings 207 of the nut 189 may substantially prevent the nut 189 from rotating about the shaft 188, thereby facilitating translation of the nut 189 along the shaft 188 during rotation of the shaft 188 relative to the housing 187. To laterally stiffen the wings 207, the nut 189 may include a transversely-extending rib 209 positioned outwardly of the internal thread 206 and extending between the wings 207. In an alternative design, the nut 189 and the housing 187 may include various other corresponding keying structures so that the nut 189 travels axially along the shaft 188 upon rotation of the shaft 188 relative to the housing 187.

As described, rotation of the shaft 188 relative to the housing 187 generally moves or translates the nut 189 axially along the shaft 188. To limit the axial range of the nut 189, the shaft 188 may include stops 197 extending outward from a periphery of the shaft 188. Upon contact with the nut 189, the stops 197 generally restrict or limit translation of the nut 189 relative to the shaft 188, thereby restricting or limiting further rotation of the shaft 188 relative to the housing 187. To ensure a solid engagement between the nut 189 and a respective stop 197, the nut 189 may include a longitudinally-extending abutment wall 211 that interacts with the shaft 188 stop upon the nut 189 reaching a desired stopping position corresponding to a full extension of the first shade 22. As shown in FIG. 24, the abutment wall 211 may be formed at a terminal end of the internal thread 206 of the nut 189.

Additionally or alternatively, the body 205 of the nut 189 (which may resemble an axially-extending sleeve) may abut the abutment flange 192 of the housing 187 to stop translation of the nut 189 along the shaft 188. The body 205 of the nut 189 may be radially spaced from an outer periphery of the shaft 188 by a sufficient distance to permit passage of the shaft stop 197 in an annular space defined between the shaft 188 and the body 205. The shaft 188 and the nut 189 may include two stops 197 and abutment walls 211, respectively, to facilitate interoperability of the lock mechanism 186 with the right or left end caps 126*a*, 126*b*, thereby providing a robust design capable of accommodating left and right hand assemblies.

Figure 15:
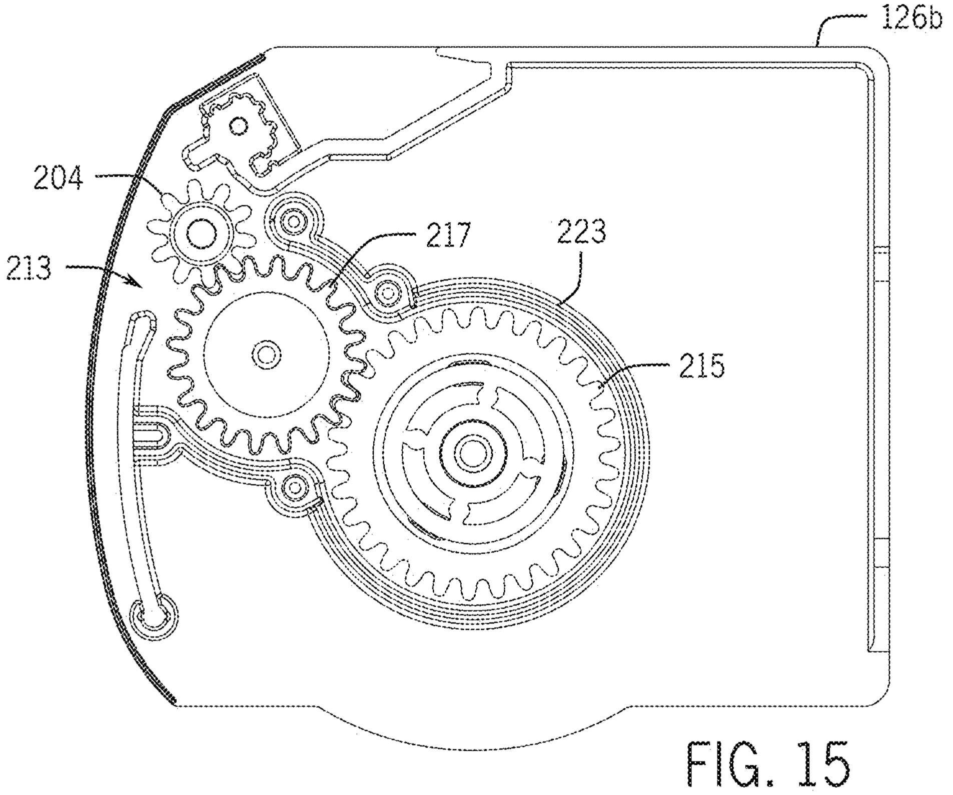
FIG. 15 is a side elevation view of some of the head rail components of FIG. 12 depicting three intermeshed gears rotatably supported on an end cap of a covering in accordance with some examples of the present disclosure.
Figure 17:
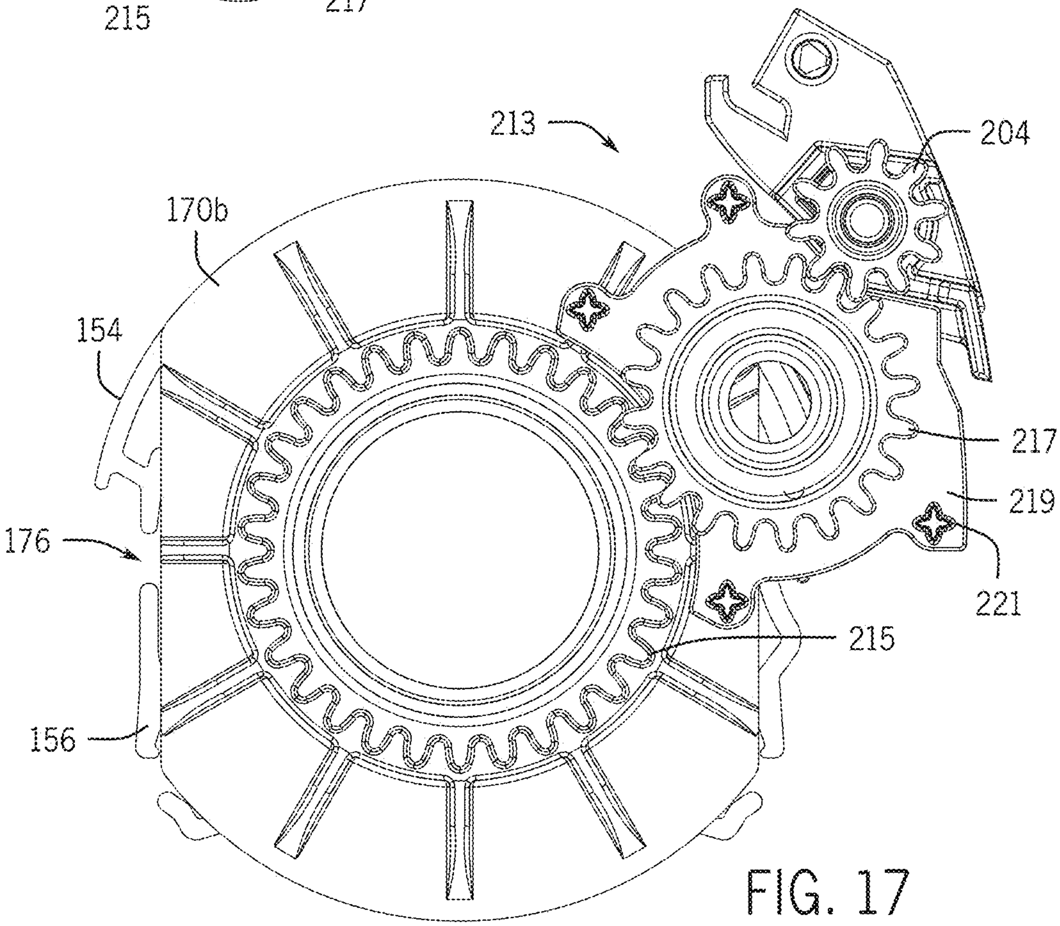
FIG. 17 is a side elevation view of the lock mechanism of FIG. 16 in accordance with some examples of the present disclosure.

Referring to FIGS. 15-17, the axially movable lock mechanism 186 may include a gear mechanism or train 213 positioned external to the inner and outer rollers 148, 150. The gear mechanism or train 213 may include a first gear 215 non-rotatably coupled to the outer roller 150, a second gear 204 non-rotatably coupled to the shaft 188, and an idler gear 217 intermeshed with the first and second gears 215, 204. The idler gear 217 may be rotatably supported on a mounting plate 219 that includes locator pins 221 projecting axially from the mounting plate 219 (see FIG. 17) toward the associated end cap 126. The locator pins 221 may be receivable within the end cap 126 to restrict rotation of the mounting plate 219 relative to the end cap 126.

The gear mechanism 213 may be altered depending on the size, weight, or other characteristics of the shade members. In one example, the gear mechanism 213 provides a three-to-one gear ratio between the first and second gears 215, 204. That is, for every revolution of the outer roller 150, the shaft 188 completes three revolutions. In one example, the external thread of the shaft 188 has sixteen threads per inch (or a pitch of 1/16 of an inch). Generally, the length of the threaded portion 203 of the shaft 188 may be oversized relative to the operative range of the nut 189 so that the shaft 188 may accommodate many different shade lengths. Thus, in some examples, the nut 189 only interacts with one of the stops 197 on the rotatable shaft 188 during operation and the other stop is provided so that the lock mechanism 186 may be used with either of the right or left end caps 126*a*, 126*b*.

Referring to FIG. 15, the gear mechanism 213 is depicted in association with the left end cap 126*b*. The external gears 204, 215, 217 are rotatably supported by stub shafts projecting axially from the left end cap 126*b*. The idler gear 217 is positioned forwardly of the first gear 215, and the second gear 204 is positioned forwardly of the idler gear 217, with all three gears 215, 204, 217 disposed in the same plane adjacent to the end cap. The idler gear 217 is positioned upwardly of the first gear 215, and the second gear 204 is positioned upwardly of the idler gear 217. The first gear 215 and the idler gear 217 may be received within a rim 223 projecting axially from the end cap 126*b*.

Figure 13:
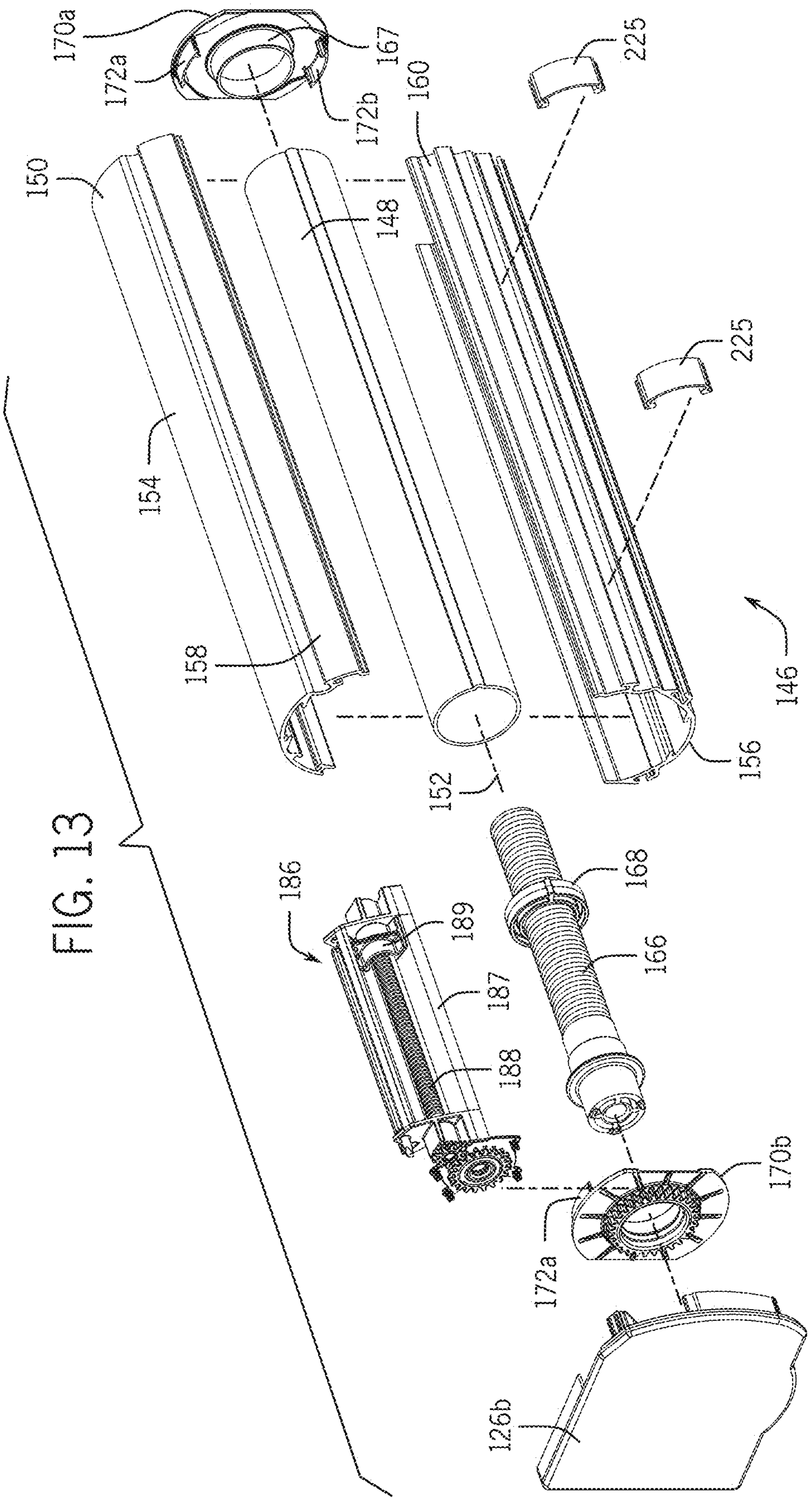
FIG. 13 is an isometric, partially-exploded view of the head rail components of FIG. 12 in accordance with some examples of the present disclosure.

Referring to FIG. 13, a partially exploded view of the head rail components (with the exception of the right side components which are generally the same as those shown and discussed in relation to FIGS. 6-11) is provided. The components include a left end cap 126*b*, a non-rotatable limit screw 166 that attaches to the left end cap 126*b*, a left bushing 170*b* that mounts onto and rotates relative to a bearing surface of the limit screw 166, an inner roller 148 that internally receives a portion of the limit screw 166 (including the limit nut 168) and mounts onto a boss 167 of the left and right bushings 170*a*, 170*b*, an outer roller 150 that internally receives the inner roller 148, and the axially movable lock mechanism 186 that attaches to the left end cap 126*b*.

Figure 19:
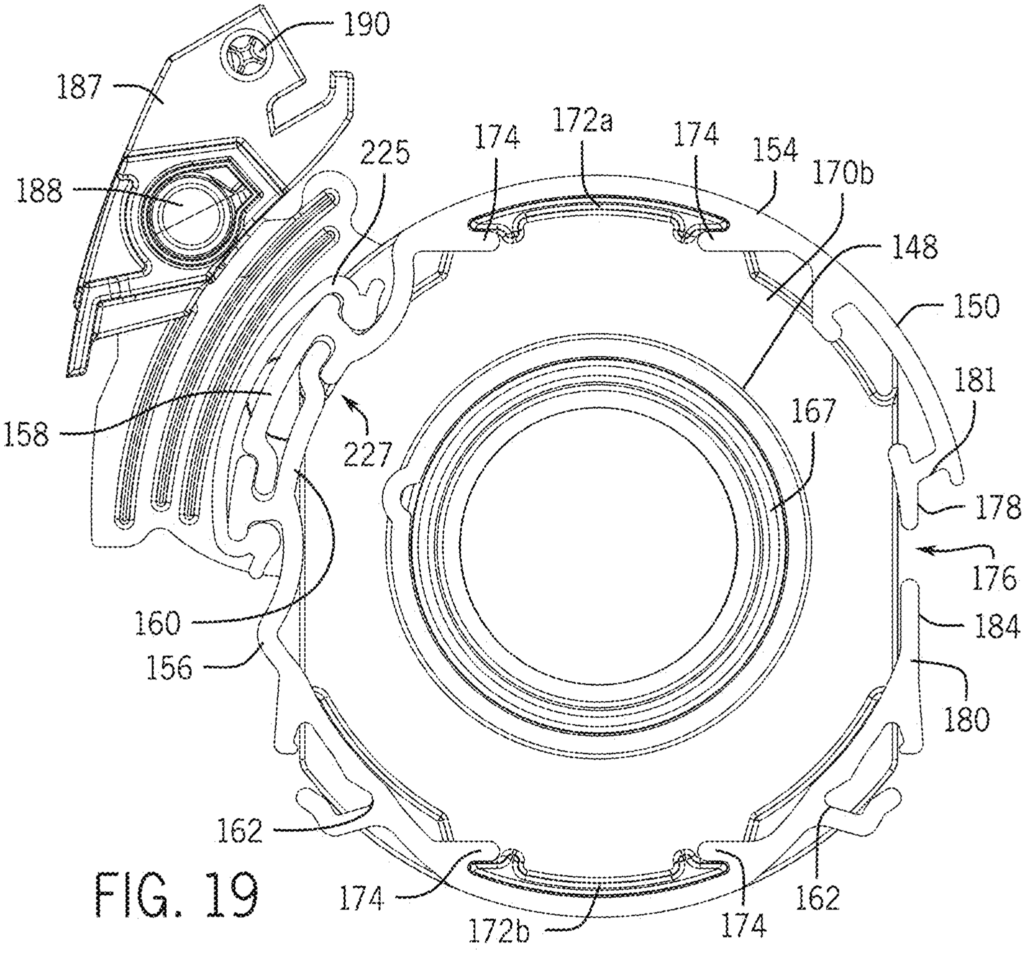
FIG. 19 is a side elevation view of a dual roller unit attached to the lock mechanism of FIG. 16 in accordance with some examples of the present disclosure.
Figure 20:
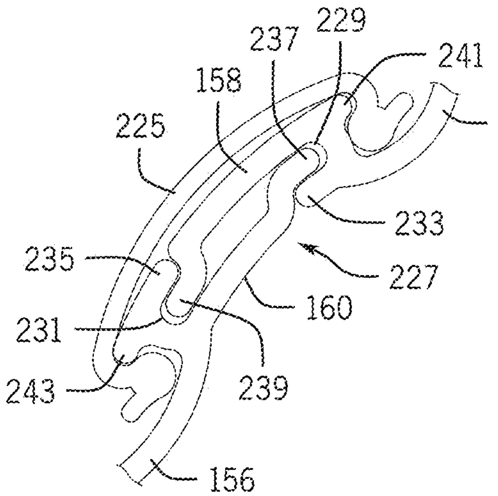
FIG. 20 is a detail view of a locking interface between first and second shells of an outer roller of the dual roller unit of FIG. 19 in accordance with some examples of the present disclosure.
Figure 21:
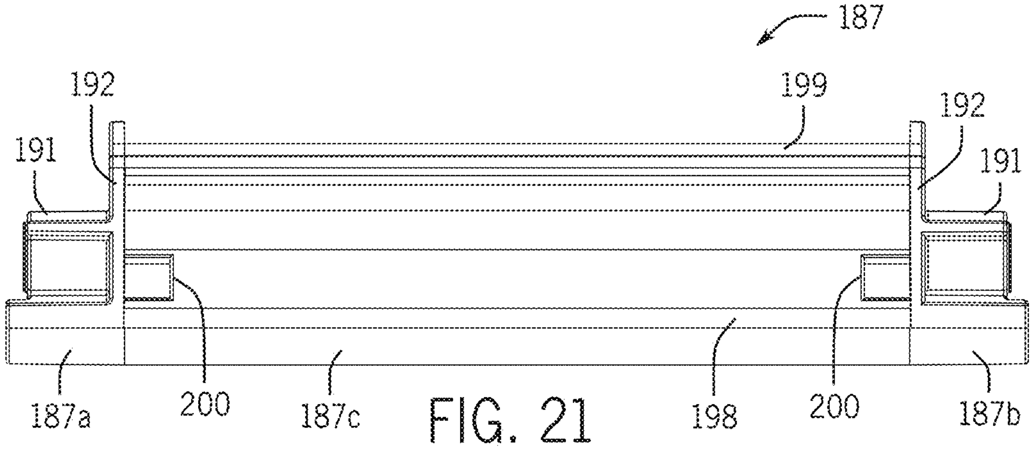
FIG. 21 is a front elevation view of a housing of the lock mechanism of FIG. 16 in accordance with some examples of the present disclosure.
Figure 22:
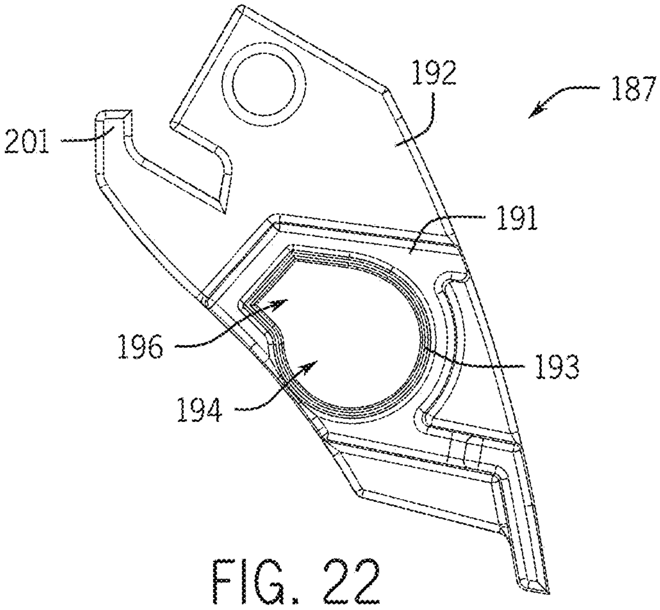
FIG. 22 is a side elevation view of the housing of FIG. 21 in accordance with some examples of the present disclosure.
Figure 26:
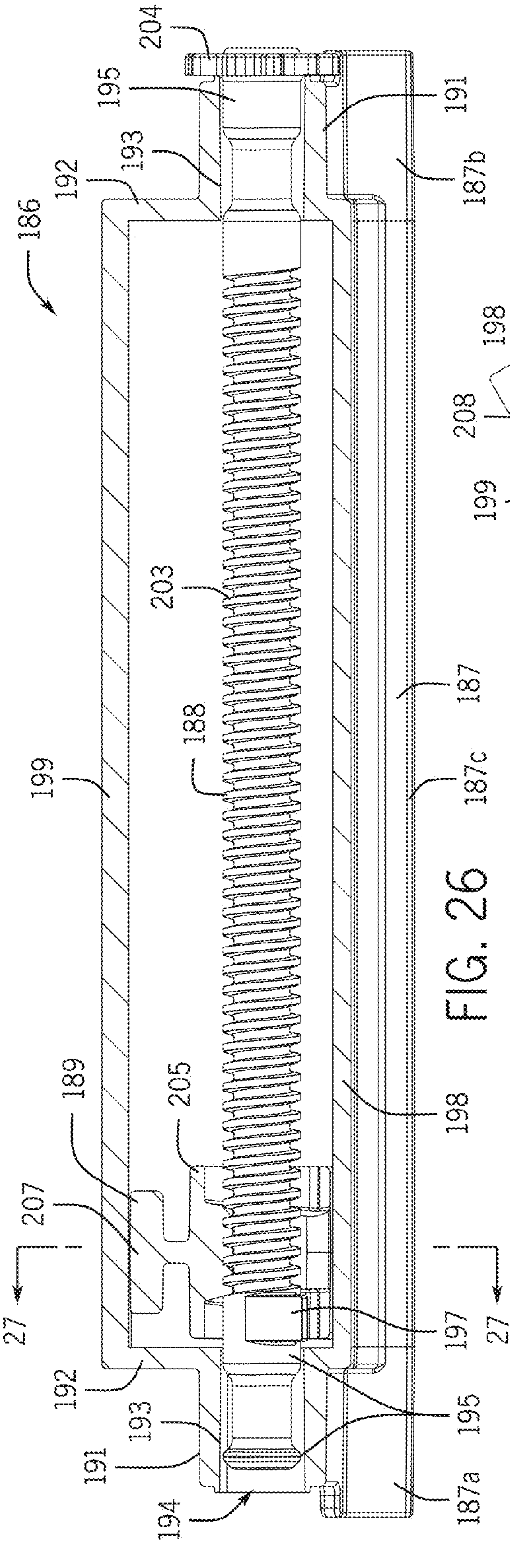
FIG. 26 is a front elevation view of the shaft of FIG. 23 rotatably supported in the housing of FIG. 21 and the nut of FIG. 24 threadedly mounted onto the shaft, with the housing and nut shown in lengthwise cross-section, in accordance with some examples of the present disclosure.

Referring to FIGS. 13, 14, 19, and 20, the outer roller 150 may include a split shell design. In particular, the outer roller 150 may include first and second shells 154, 156. To secure the first and second shells 154, 156 together and maintain a desired spatial relationship relative to one another, the first and second shells 154, 156 of the outer roller 150 each may snugly receive an axial projection 172*a*, 172*b* of the left and right bushings 170*a*, 170*b* (see FIGS. 14, 18, and 19). The axial projections 172*a*, 172*b* may couple the outer roller 150 to the bushings 170*a*, 170*b* so that the outer roller 150 and bushings 170*a*, 170*b* rotate in unison about a rotation axis 152 of the outer roller 150. The first gear 215 may be non-rotatably secured to an opposing face of the left bushing 170*b* relative to the axial projections 172*a*, 172*b*, thereby ensuring the first gear 215 rotates in unison with the outer roller 150. To further secure the first and second shells 154, 156 together, the shells 154, 156 may be clamped together by at least one retaining clip 225 (FIGS. 12-13 depict two retaining clips, although more or less clips may be used as desired to securely fasten the shells together). As shown in FIG. 20, the retaining clip 225 may be resiliently snapped around an interlocked region 227 of the first and second shells 154, 156.

Referring to FIG. 20, the end portions 158, 160 of the first and second shells 154, 156 may overlap one another and extend into corresponding longitudinally-extending receiving channels 229, 231 defined at least partially by longitudinally-extending lips 233, 235. The lip 233 of the first shell 158 may be positioned internal to a terminal, longitudinally-extending edge 237 of the second shell 160, while the lip 235 of the second shell 160 may be positioned external to a terminal, longitudinally-extending edge 239 of the first shell 158 (although this arrangement may be flipped). The retaining clip 225 may resiliently snap around external detents 241, 243 formed in the interlocked region of the first and second shells 154, 156, respectively, to clamp the first and second shells 154, 156 together.

Figure 14:
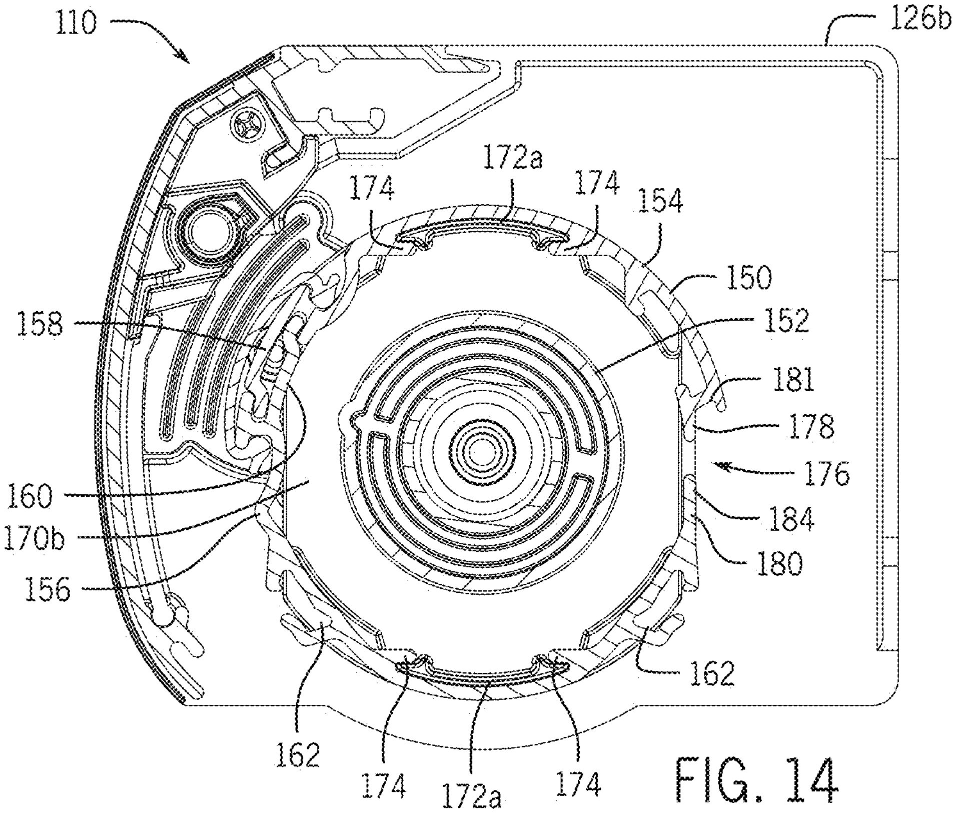
FIG. 14 is a transverse cross-sectional view of the head rail components of FIG. 12 taken along line 14-14 of FIG. 12 in accordance with some examples of the present disclosure.

Referring to FIGS. 14 and 19, the split-shell design of the outer roller 150 defines a longitudinally-extending slot 176 that permits passage of the second shade 24 during extension and retraction of the second shade 24. When the edge portions 158, 160 of the first and second shells 154, 156 are interlocked together, opposing or second longitudinally-extending terminal edge portions 178, 180 of the first and second shells 154, 156 are peripherally spaced apart from one another and define the longitudinally-extending slot 176. The confronting second terminal edge portions 158, 160 of the first and second shells 154, 156 may be spaced a sufficient distance from one another to permit passage of the second shade 24 yet prevent passage of the bottom rail 20 of the second shade 24. The function of the outer roller 150 is generally the same as that discussed in relation to FIGS. 6-11 and thus will not be repeated here for the sake of brevity.

During operation of the covering, as the outer roller 150 extends the first shade 22 across the architectural opening, the first gear 215 drives the idler gear 217, which in turn drives the second gear 204, which traverses the nut 189 axially along the shaft 188 toward a bottom end position. Once the nut 189 reaches the bottom end position (which may be defined by a stop 197 on the shaft 188), the nut 189 restricts further rotation of the shaft 188 in the extension direction of the first shade 22, which in turn inhibits further rotation of the outer roller 150 in the extension direction. With the outer roller 150 restricted from further rotation in the extension direction and the first shade 22 unwrapped from the periphery of the outer roller 150, the second shade 24 may be unwrapped from the inner roller 148, passed through the slot 176 in the outer roller 150, and extended across the architectural opening. As the inner roller 148 rotates during extension of the second shade 24, the internal limit nut 168 rotates in unison with the inner roller 148 and travels axially along the limit screw 166 toward a bottom end stop formed on the non-rotatable limit screw 166. The internal limit nut 166 generally contacts the bottom end stop upon the second shade 24 being fully extended across the architectural opening to define a bottom stop of the dual roller unit 146.

During retraction of the covering from a fully extended position, the inner roller 148 pulls the second shade 24 through the slot 176 defined between the opposing longitudinally-extending edge portions 178, 180 of the shells 154, 156 of the outer roller 150 and wraps the second shade 24 about a periphery of the inner roller 148 until the bottom rail 20 of the second shade 24 seats against an outer periphery of the outer roller 150. During retraction of the second shade 24, the weight of bottom rail 18 of the first shade 22 maintains the bushings 170*a*, 170*b* in a stationary condition and thus the inner roller 148 rotates relative to the bushings 170*a*, 170*b* and the outer roller 150.

Once seated, the bottom rail 20 of the second shade 24 transfers the rotational torque from the inner roller 148 to the outer roller 150, thereby rotating the outer roller 150 in a retraction direction and wrapping the first shade 22 about a periphery of the outer roller 150. The inner and outer rollers 148, 150 continue to rotate in a retraction direction until the bottom rail 18 of the first shade 22 contacts a top limit stop, which may be associated with one or both of the end caps 126, at which point the covering is retracted into a fully retracted position. During rotation of the inner roller 148 in the retraction direction, the internal limit nut 168 traverses along the non-rotatable limit screw 166 within the inner roller 148 away from the bottom stop of the second shade 24. During rotation of the outer roller 150 in the retraction direction, the external nut 189 traverses along the rotatable shaft 188 away from the bottom stop of the first shade 22.

Referring to FIGS. 28-47, a covering for an architectural opening is provided that includes a pivotable lock mechanism. With the exception of the pivotable lock mechanism and the multiple-piece outer roller, the covering depicted in FIGS. 28-47 generally has the same features and operation as the covering depicted in FIGS. 6-27. Accordingly, the preceding discussion of the features and operation of the covering depicted in FIGS. 6-27 should be considered generally applicable to the covering depicted in FIGS. 28-47, except as noted in the following discussion. The reference numerals used in FIGS. 28-47 generally correspond to the reference numerals used in FIGS. 12-27 to reflect the similar parts and components, except the reference numerals are incremented by one hundred.

Referring to FIGS. 28-34, the inner roller 248 is generally cylindrical in shape, and forms a retaining member for securing the top edge of the second shade 24 thereto. As noted above, the inner roller 248 is positioned inside the outer roller 250 to define the dual roller unit, and in this example both rollers 248, 250 are coextensive about the same rotational axis 252. An upper edge of the second shade 24 is attached to the inner roller 248, and a lower edge of the second shade 24 is received in a slot formed in the second bottom rail 220, and held in the slot by an insert 282 positioned in a hem formed on the bottom edge of the second shade 24. Other attachment structures may be used to attach the bottom rail 220 to the second shade 24.

Continuing with FIGS. 28-34, the second bottom rail 220 is an elongated member, having relatively high mass, and defining a slot running along its length to receive and retain, as noted above, the bottom edge of the second shade 24. The second bottom rail 220 has a generally triangular cross section, a portion of which generally matches the shape of the seat 281 formed on the outer roller 250 to conform thereto when the second shade 24 is in the retracted position. An actuator rim 247 is defined at one end of the second rail 220, and engages the lock mechanism 286 to disengage the lock mechanism 286 from the outer roller 250, as is described in more detail below.

The outer roller 250 in this example is generally cylindrical, and defines several features in its circumferential wall. The outer roller 250 defines a longitudinal central axis 252 about which it rotates, and about which the inner roller 248 is coextensively positioned also. A pair of channels 262 is formed to receive and secure the top edges of the first shade 22, with the inserts 264 each being positioned in a hem formed on each of the top edges, the inserts 264 acting to retain the top edge in the respective channel 262. An anchor groove 245 is formed along the length of the outer roller 250 for receipt of a roller lock bearing, as is described below. A slot 276 is formed along the length of the outer roller 250 and is in communication with the interior of the outer roller 250, which may be formed as a tube. A recessed seat 281 is formed on either side of the slot 276. The second shade 24 is extended and retracted through the slot 276, and when in the fully retracted position, the second bottom rail 220 is received in the seat 281 and nests therein for at least one of many purposes, as is described below. The slot 276 is positioned on the outer roller 250 so as to be located above and adjacent to the rearward most of the two channels 262 when the first shade 22 is in its extended position and vane-open configuration.

Referring to FIGS. 28, 29, 46, and 47, the dual roller unit is rotatably supported between the right end cap 226*a* and the left end cap 226*b*, and the operating mechanism 240 is operably associated with the inner roller tube 248 to cause it to rotate. The operating mechanism 240 is anchored to the right end cap 226*a* and is actuated by, in one example, the operating element 242 as noted above. The operating mechanism 240 may, in one example, include a planetary gear drive often utilized in window covering applications. The operating mechanism 240 may include an internal fitting 264 which is rotated by the operating mechanism 240. The fitting 264 is sized to be received within the inner roller 248, and tightly engages the inner wall of the inner roller 248. The inner roller 248 is driven in rotation by the internal fitting 264 as the fitting is driven by the operating mechanism 240. The open right end of the outer roller 250 receives a right end roller cap 270*a*, which includes a central aperture having an axially extending collar rotatably receiving an axial bearing surface formed on the housing of the operating mechanism 240. The bearing surface supports the right end roller cap 270*a* as it rotates when the outer roller 250 rotates. The inner roller 248 is rotatably received on the collar. The collar rotatably supports the right end of the inner tube 248 as it is driven by the operating mechanism 240 to rotate.

Figure 46:
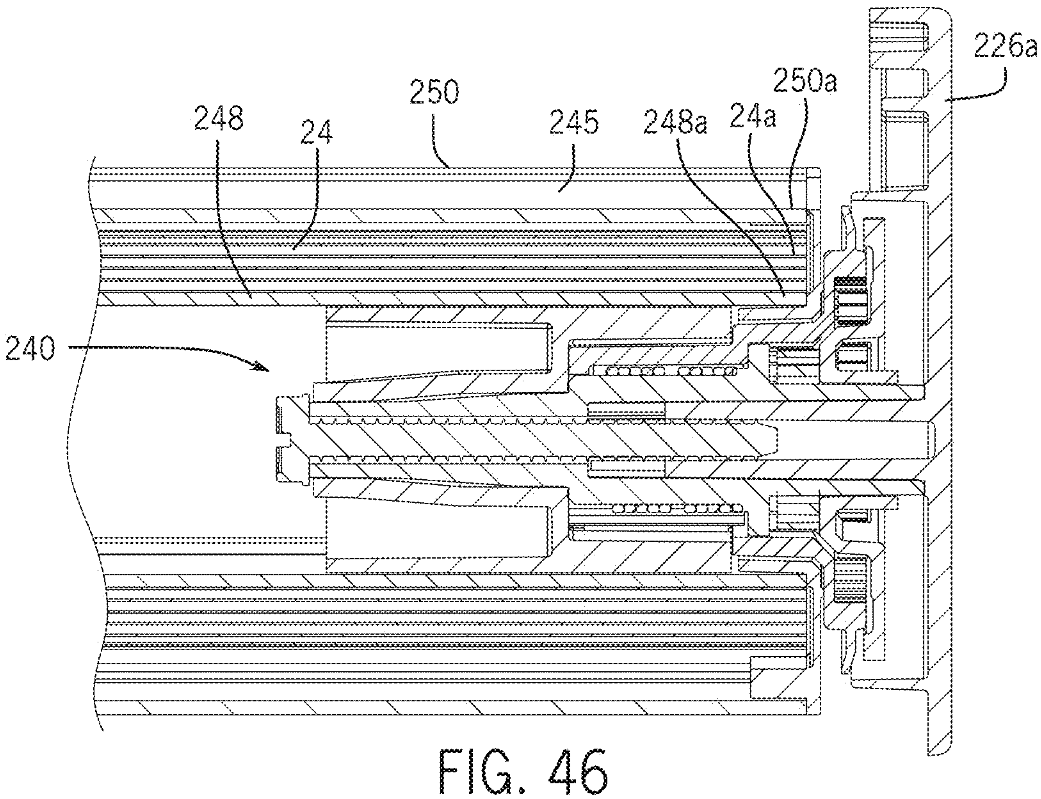
FIG. 46 is a lengthwise cross-sectional view of one end of a covering taken along line 7-7 of FIG. 1 with the head rail components of FIG. 28 in accordance with some examples of the present disclosure.
Figure 47:
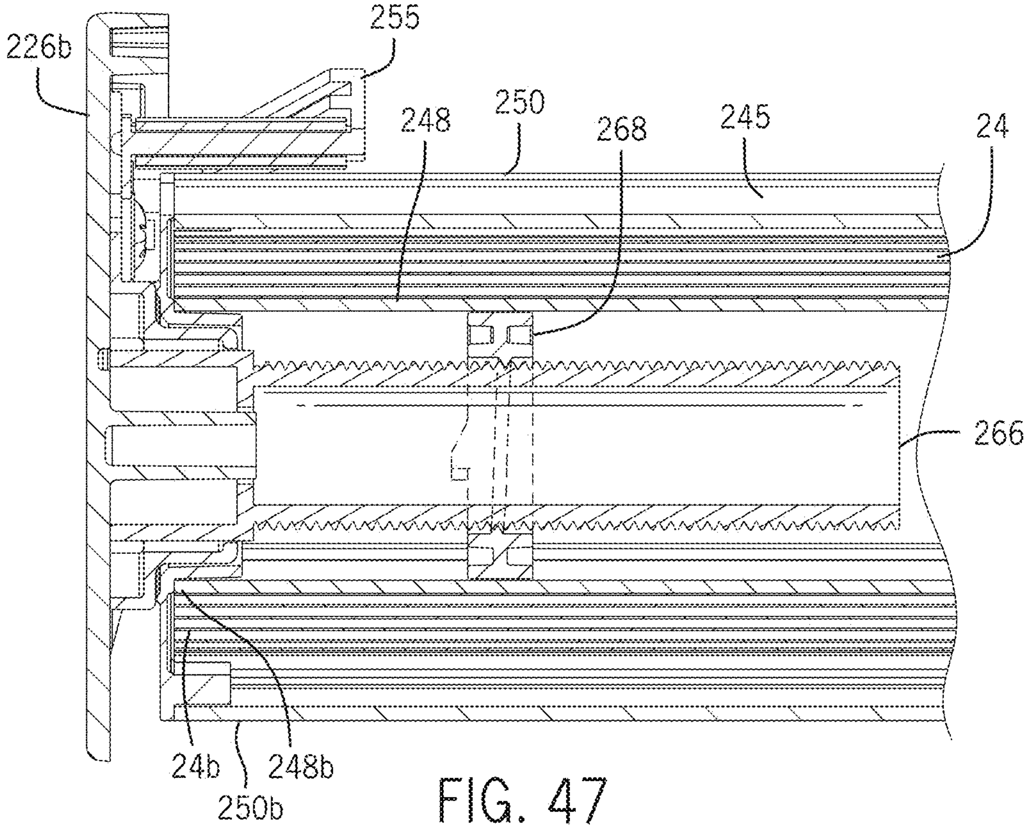
FIG. 47 is a lengthwise cross-sectional view of another end of a covering taken along line 7-7 of FIG. 1 with the head rail components of FIG. 28 in accordance with some examples of the present disclosure.

As shown in FIG. 46, right ends 248*a*, 250*a* of the inner and outer rollers 248, 250, respectively, may be aligned with one another, and a right side edge 24*a* of the second shade 24 may be aligned with the right ends 248*a*, 250*a* of the rollers 248, 250. As shown in FIG. 47, left ends 248*b*, 250*b* of the inner and outer rollers 248, 250, respectively, may be aligned with one another, and a left side edge 24*b* of the second shade 24 may be aligned with the left ends 248*b*, 250*b* of the rollers 248, 250. The first shade 22 may be wrapped about the outer roller 250, and the edges of the first shade 22 may be aligned with the ends of the rollers 248, 250 and the edges of the second shade 24. The alignment of the ends of the rollers 248, 250 and the edges of the shades 22, 24 may reduce or eliminate light gaps between the edges of the shades and corresponding sides of the architectural opening.

The outer roller 250 is driven in rotation by the inner roller 248 when the second shade 24 is fully retracted onto the inner roller 248 and the second end rail 220 is received in the seat 281 of the outer tube 250. In this condition, as the inner roller 248 rotates, the second shade 24 tensions the second end rail 220, which in turn applies a force to the outer roller 250 at the interface between the second end rail 220 and the seat 281. Thus the outer roller 250 is caused to rotate in conjunction with the inner roller 248. The outer roller 250 does not rotate along with the inner roller 248 unless the second shade 24 is fully retracted about the inner roller 248. As noted above, the operating mechanism 240 may be actuated by an operating element 242 to extend or retract the first and second shades 22, 24 as desired by the user. Many types of mechanisms for causing the rotation of the inner roller tube 248 upon actuation of the operating element 242 are acceptable.

Figure 28:
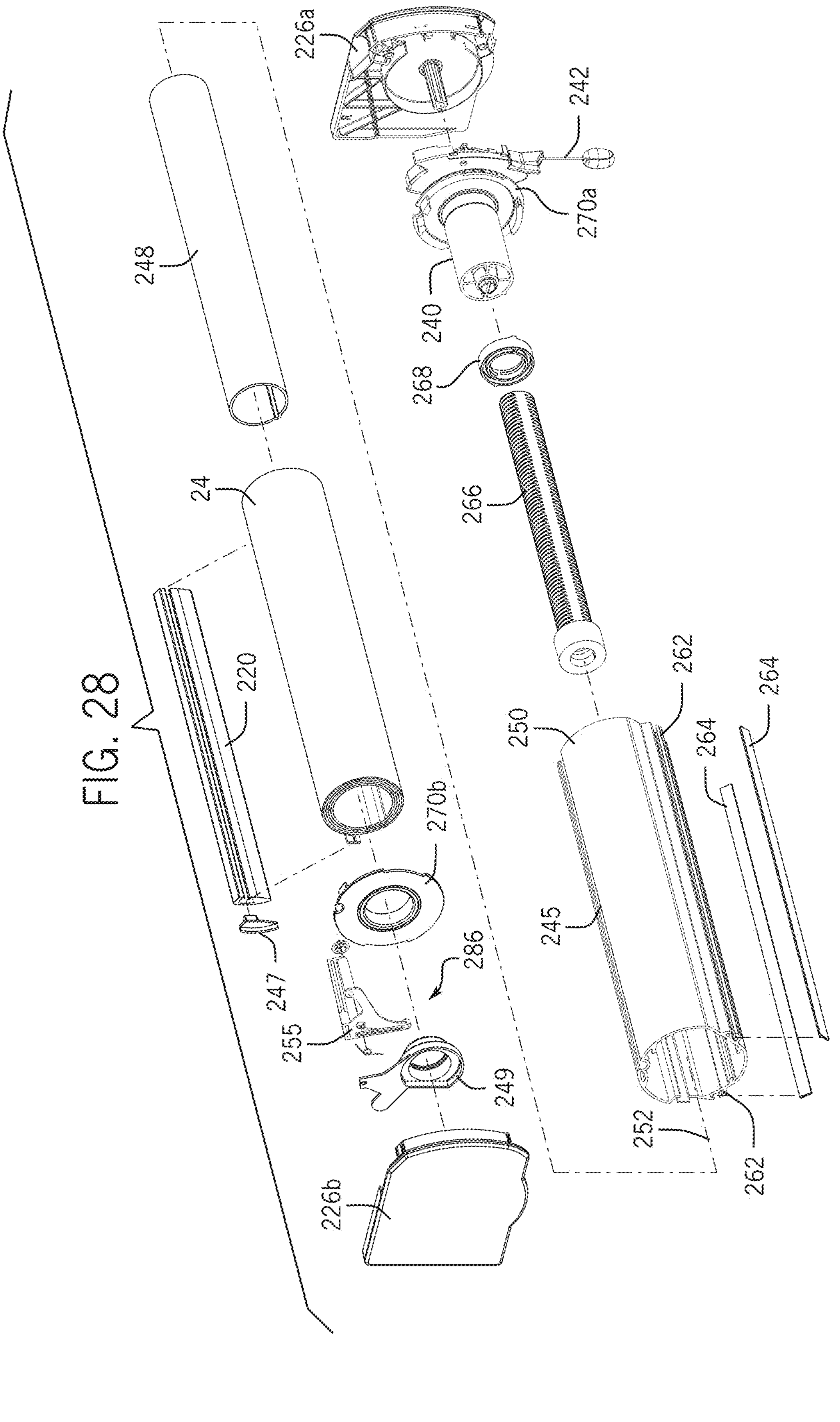
FIG. 28 is an isometric, partially-exploded view of head rail components of a covering in accordance with some examples of the present disclosure. The head rail cover and the second shade are not shown for clarity.
Figure 29:
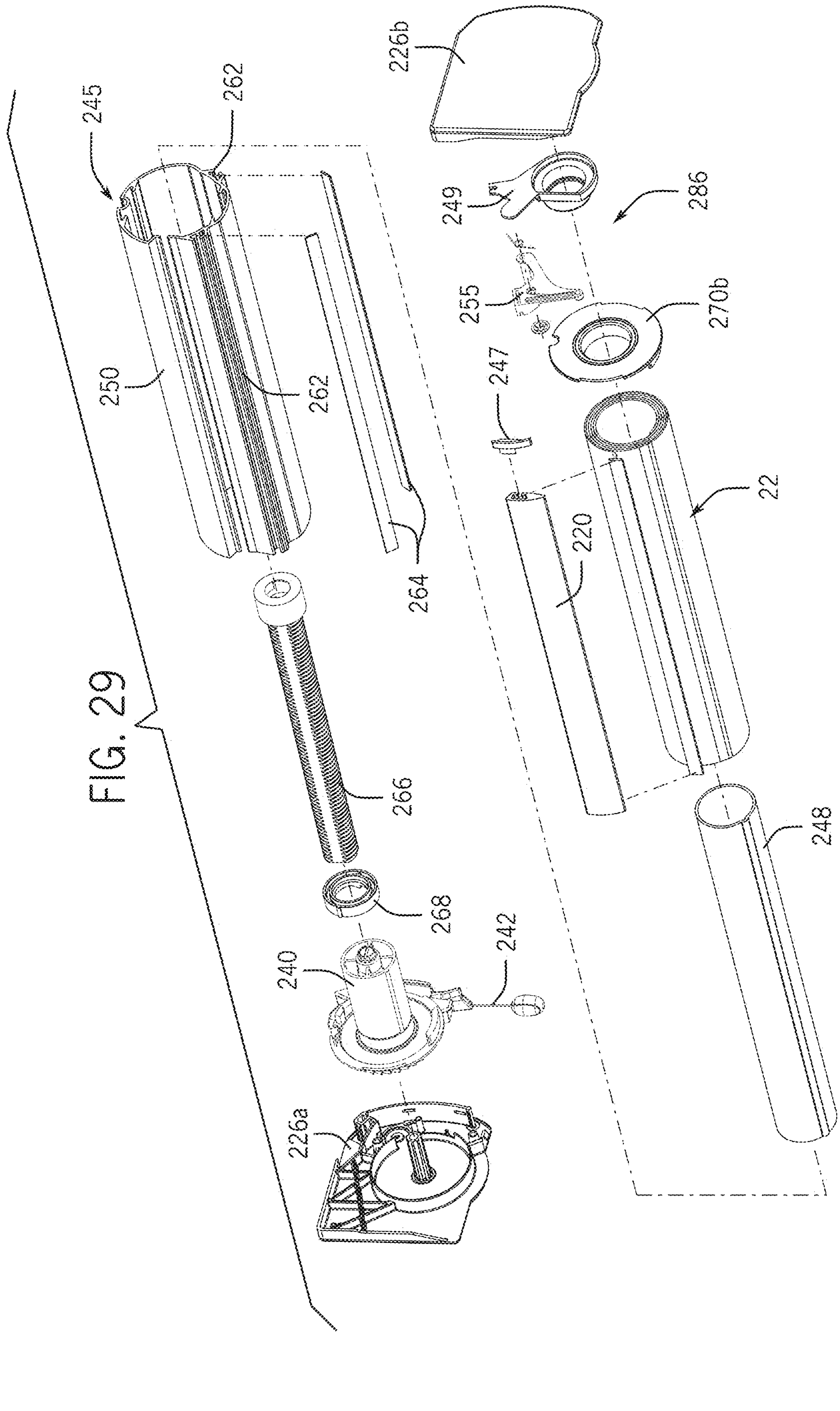
FIG. 29 is another isometric, partially-exploded view of the head rail components of FIG. 28 in accordance with some examples of the present disclosure.

Continuing with FIGS. 28 and 29, a limit screw 266 is positioned inside the inner roller 248, and is operably fixed to the left end cap 226*b* by a screw. The limit screw 266 does not rotate. A limit nut 268 is threadedly engaged with the limit screw 266, and is rotationally keyed to the inside of the inner roller 248, the key structure allowing movement of the limit nut 268 along the length of the inner roller 248. As the inner roller 248 rotates, the limit nut 268 moves along the threaded limit shaft 266, and engages a limit stop defining the bottom most extended position of the second shade 24 (see FIG. 5). The retracted position of the first shade 22 is defined by the first shade 22, in this example, being wrapped entirely around the outer roller 250. In some examples, the first bottom rail 18 engages a portion of the head rail 14 to define this position. Alternatively or additionally, while a top limit stop on the limit screw 266 is not used in this example, one may be employed on the limit screw 266 if desired. The left end cap 226*b*, as best seen in FIGS. 28, 29, and 47, rotatably supports the inner roller 248 and the outer roller 250.

Figure 40:
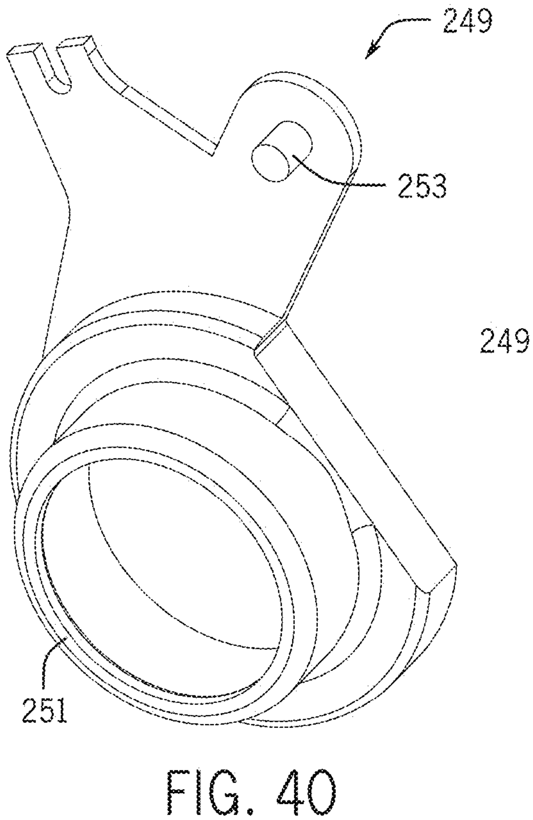
FIG. 40 is an isometric view of a bracket of the head rail components of FIG. 28 in accordance with some examples of the present disclosure.

Referring to FIGS. 28, 29, and 40, a pivot bracket 249 is attached to the inside surface of the left end cap 226*b* and defines a centrally positioned annular boss 251 and a post 253 extending toward the right end cap 226*a* that serves as an axle on which the roller lock 255 is pivotally mounted. The annular boss 251 on the pivot bracket 249 is rotatably received in the central aperture of the left outer roller cap 270*b*, which is itself received in the open left end of the outer roller 250. A collar extends axially from around the central aperture of the cap 270*b*, and serves as a bearing surface for the relative rotation between the outer roller 250 and the left end bracket. The open left end of the inner roller 248 is rotatably received upon the outer surface of the collar, which acts as a bearing surface for the rotation of the roller 248 relative to the collar, which rotation is under the selective control through the operating mechanism 240.

Figure 41:
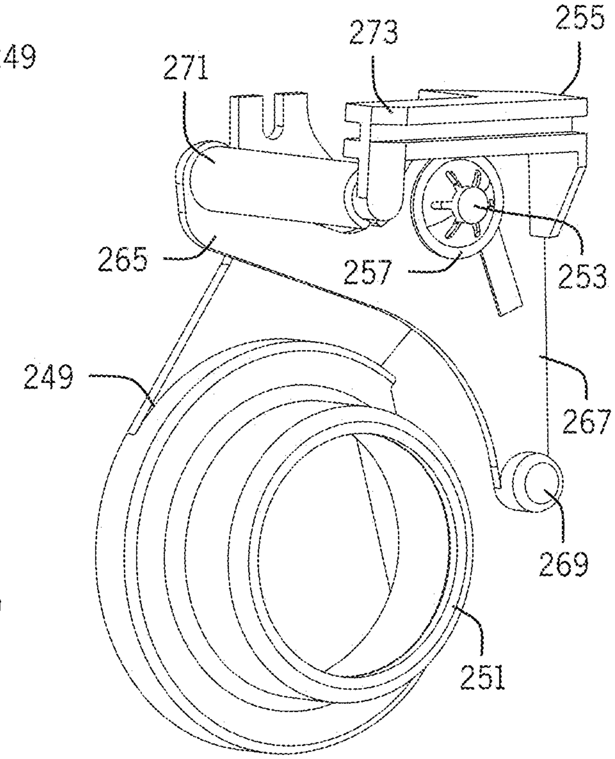
FIG. 41 is an isometric view of the lock mechanism of FIG. 38 rotatably mounted onto the bracket of FIG. 40 in accordance with some examples of the present disclosure.

The roller lock 255, as shown in FIGS. 28, 29, 38, and 39, is pivotally attached to the post 253 on the pivot bracket 249 (see FIGS. 40 and 41), and secured thereto by a fastener 257 (see FIG. 41). The roller lock 255 is pivotable relative to the pivot bracket 249 about the axis defined by the post 253. A spring member 259 (see FIG. 43) is positioned around the post 253 of the pivot bracket 249, the spring 259 having two legs, one of which engages the roller lock 255 to bias the roller lock 255 into engagement with the outer surface of the outer roller 250, and the other leg operably engages a portion of the left end cap 226*b*.

Figure 38:
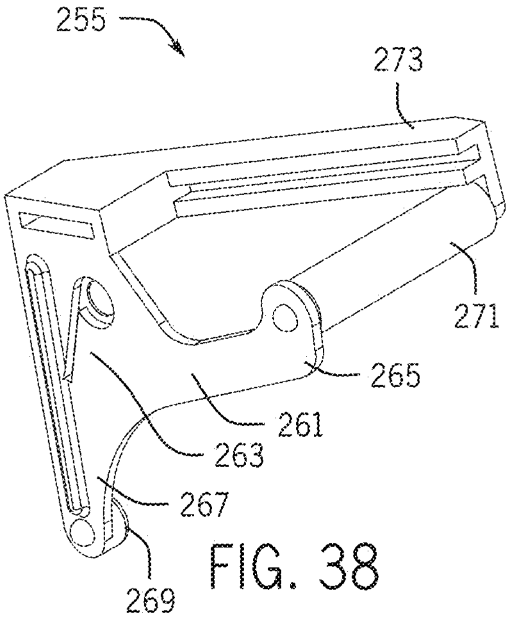
FIG. 38 is an isometric view of a lock mechanism of the head rail components of FIG. 28 in accordance with some examples of the present disclosure.
Figure 39:
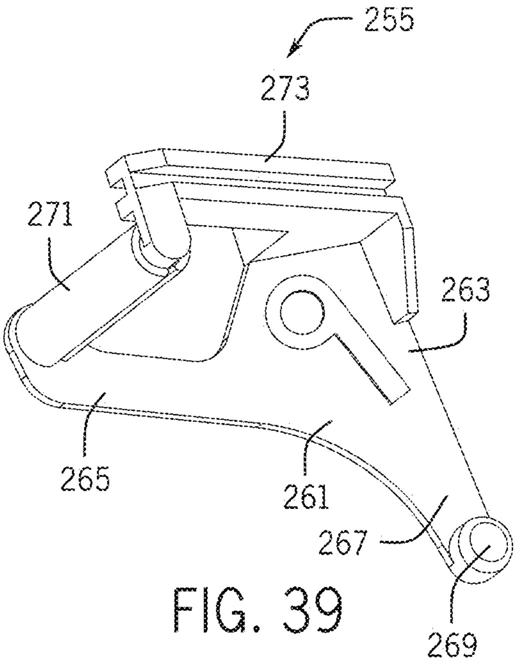
FIG. 39 is another isometric view of the lock mechanism of FIG. 38 in accordance with some examples of the present disclosure.

Referring to FIGS. 38 and 39, the roller lock 255 includes a frame plate 261 having a central body 263 from which extend an upper leg 265 and a lower leg 267, each leg 265, 267 lying in the same plane as the central body 263. The upper and lower legs 265, 267 extend at near right angles to one another, and it is contemplated that this relative positioning may be adjusted as needed given the geometry of the particular usage. The end of the lower leg 267 includes a pin 269 extending orthogonally from the plate 261 toward the opposite end cap, the pin 269 having a cylindrical shape and being relatively short. For instance, the pin 269 does not extend far enough to interfere with the rotation of the roller 250. The length and shape of the pin 269 facilitate the moving engagement between the pin 269 and the actuator rim 247 on the second end rail 220 as described below.

Continuing to refer to FIGS. 38 and 39, the end of the upper leg 265 rotatably supports a relatively long cylindrical bearing 271 which extends orthogonally from the upper leg 265 towards the opposite end cap 226*a*. The bearing 271 is rotatably supported at its opposite end by an arm 273 extending at an angle from the central plate 261. The arm 273 supports the distal end of the bearing 271 from a top side only, and does not extend much beyond the center of the bearing 271. This configuration leaves the lower portion of the bearing 271, along its length, unencumbered and able to be received in the anchor groove 245 formed in the outer roller 250, as well as to engage the outer surface of the outer roller 250 and ride along its surface, as described further below.

Figure 30:
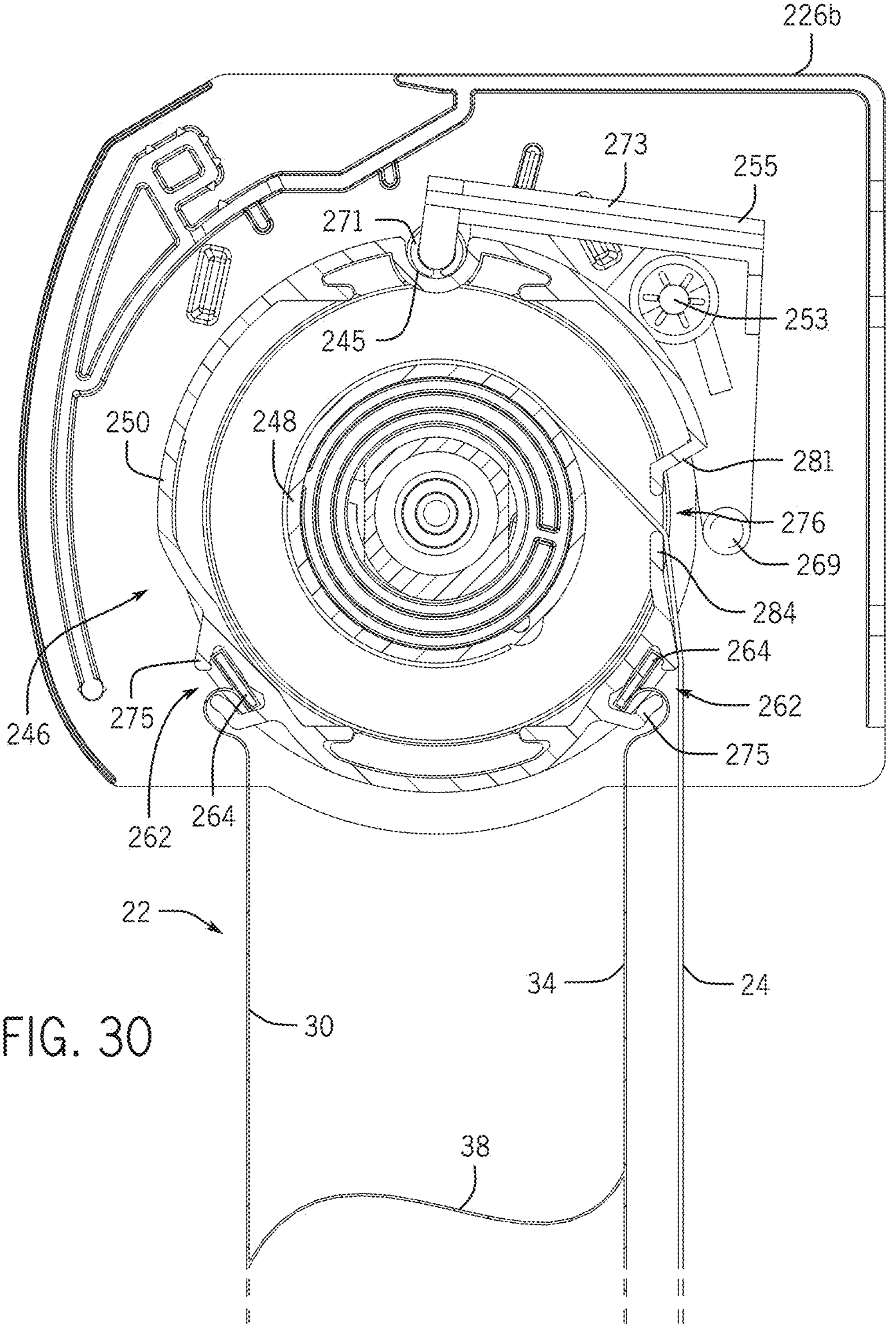
FIG. 30 is a transverse cross-sectional view of a covering taken along line 30-30 of FIG. 5 with the head rail components of FIG. 28 in accordance with some examples of the present disclosure.

The operation of one example of the covering is described below with primary reference to FIGS. 30-34. As shown in FIG. 30, both the first and second shades 22, 24 are in the extended position, and the vanes 38 are in an open configuration. With brief reference to FIG. 30, the first shade 22 may be coupled to and wrappable about the outer roller 42. An upper edge of each of the front and rear sheets 30, 34 may be coupled to an inwardly-directed, longitudinally extending gland or rib 275. The gland 275 may define an internal cavity 262 that opens through a periphery of the outer roller 250. The shade 22 may be wrapped about or unwrapped from a rear side of the roller 250, with the rear side of the roller 250 positioned between a front side of the roller 250 and a street side of an associated architectural opening (in FIG. 30, the rear side of the roller is to the right). Generally, rotation of the roller 250 in a first direction (counterclockwise in FIG. 30) retracts the shade 22 by winding it about the outer roller 250 to a position adjacent one or more sides (such as the top side) of an associated architectural opening and rotation of the roller 250 in a second, opposite direction may extend the shade 22 across the opening (such as to the bottom side).

The first shade 22 is maintained in this open position by positioning the engagement points 262 of the rear and front sheets 30, 34 of the first shade 22 with the outer roller 250 at the same height. In FIG. 30, for instance, the positions of these attachment points 262 may be referred to as being at 4 o'clock and 8 o'clock, which puts them at close to the same level with each other. If the outer roller 250 is rotated either direction from that shown in FIG. 30, the front and rear sheets 30, 34 would move toward one another and the vanes 38 would re-orient into more vertical alignment.

At this position with both the first and second shades 22, 24 at the fully extended position, the limit nut 268 (see generally FIGS. 28 and 29) is engaged with the lower limit. Actuation of the operating mechanism 240, such as by the operating element 242, from this position begins the retraction of the second shade 24 into the head rail 14. The operating mechanism 240 first rotates the inner roller 248 in a counterclockwise direction in FIG. 30 to retract the second shade 24, and when the second shade 24 is fully retracted, the outer roller 250 is then actuated to retract the first shade 22 onto the outer roller 250. This sequence is described further herein and below.

As noted above, and referring still to FIG. 30, the inner roller 248 is positioned within the outer roller 250 to define the dual roller unit 246. The outer roller 250 defines an axis of rotation 252 defined by the portion of the outer roller 250 having a circular shape (such as from 9 o'clock to 2 o'clock). The inner roller 248 is positioned so as to be coextensive with or concentric about the same axis 252 as the outer roller 250.

During retraction of the second shade 24, the inner roller 248 rotates relative to the outer roller 250, with the opposing collars in the left and right roller end caps 270*a*, 270*b* supporting the respective ends of the inner roller 248. The outer roller 250 is held in fixed rotational position relative to the inner roller 248 by the roller lock 255. The roller lock 255 is oriented such that the bearing 271 is biased by the spring 259 to be received in the anchor groove 245 (See FIGS. 28-30). This position of the bearing 271 inhibits the rotation of the outer roller 250. As the inner roller 248 rotates in the retraction direction, the second shade 24 is wound onto the inner roller 248 as it is pulled through the slot 276 formed in the outer roller 250. This retraction rotation moves the limit nut 268 along the limit screw 266 towards the opposite end of the limit screw 266.

The slot 276 through which the second shade 24 extends, and the seat 281 for receiving the second end rail 220 is positioned on the circumference of the outer roller 250 above the attachment point 262 of the rear sheet 34 of the first shade 22. This may be referred to in FIG. 30 as 3 o'clock. The slot 276 is defined by opposing free edges formed in the seat 281. The seat 281 is a recess formed along the length of the slot 276, and includes two outer edges that define the boundaries of the seat 281 on the circumference of the outer roller 250. The shape of the recess, as oriented in FIG. 30, is somewhat angular overall, with a generally vertically oriented base wall 284 allowing a relatively vertical-tangential engagement and disengagement between the second bottom rail 220 and the outer roller 250. The location of the seat 281 and slot 276 near the furthest rearward position on the circumference of the outer roller 250, along with the shape of the seat 281, allows for secure receipt of the second bottom rail 220 as it is pulled vertically up and into the seat 281 during retraction (see FIGS. 31 and 32).

Figure 32:
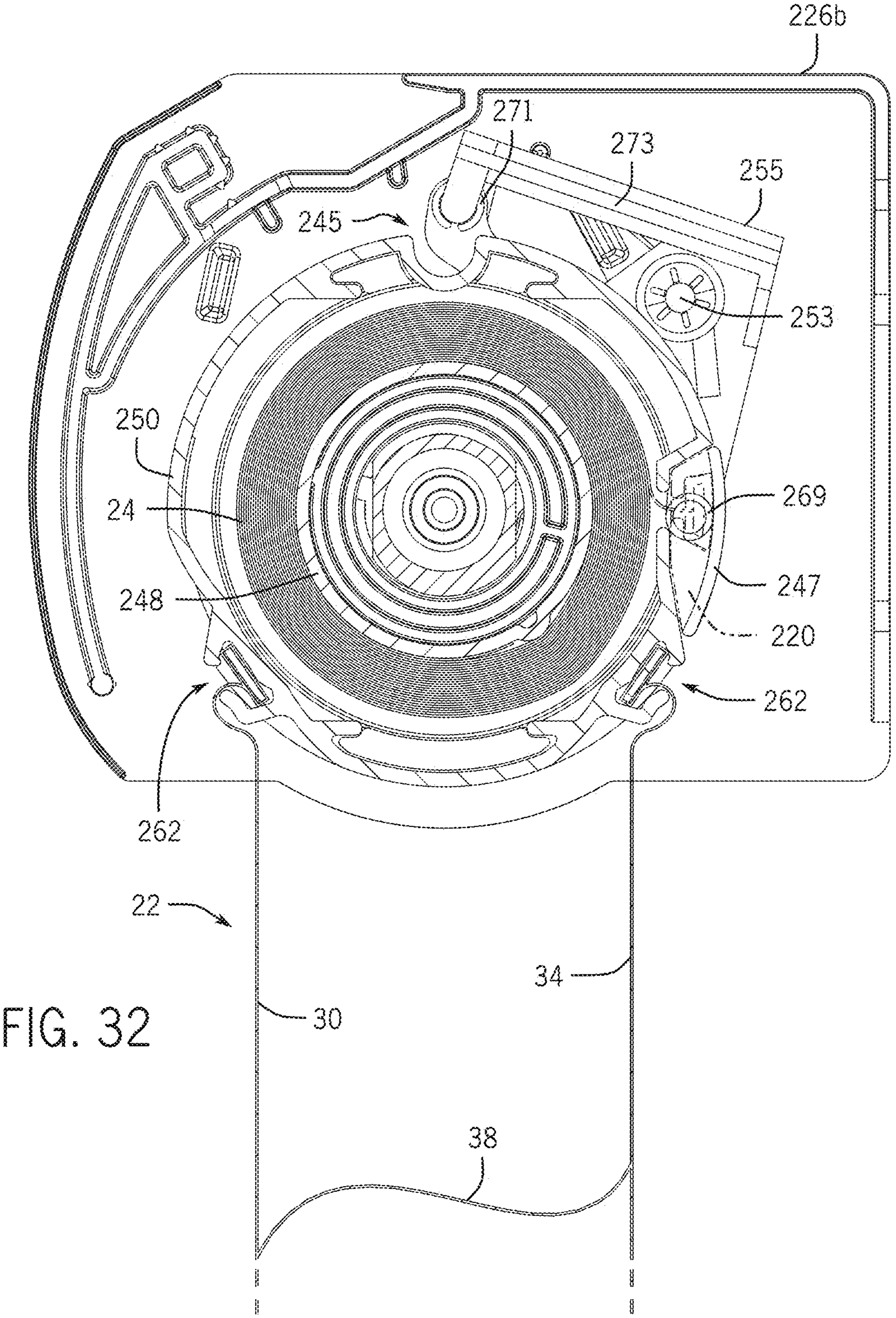
FIG. 32 is a transverse cross-sectional view of the covering of FIG. 31 with a bottom rail seated against the outer roller and a lock mechanism unseated from the outer roller in accordance with some examples of the present disclosure.
Figure 35:
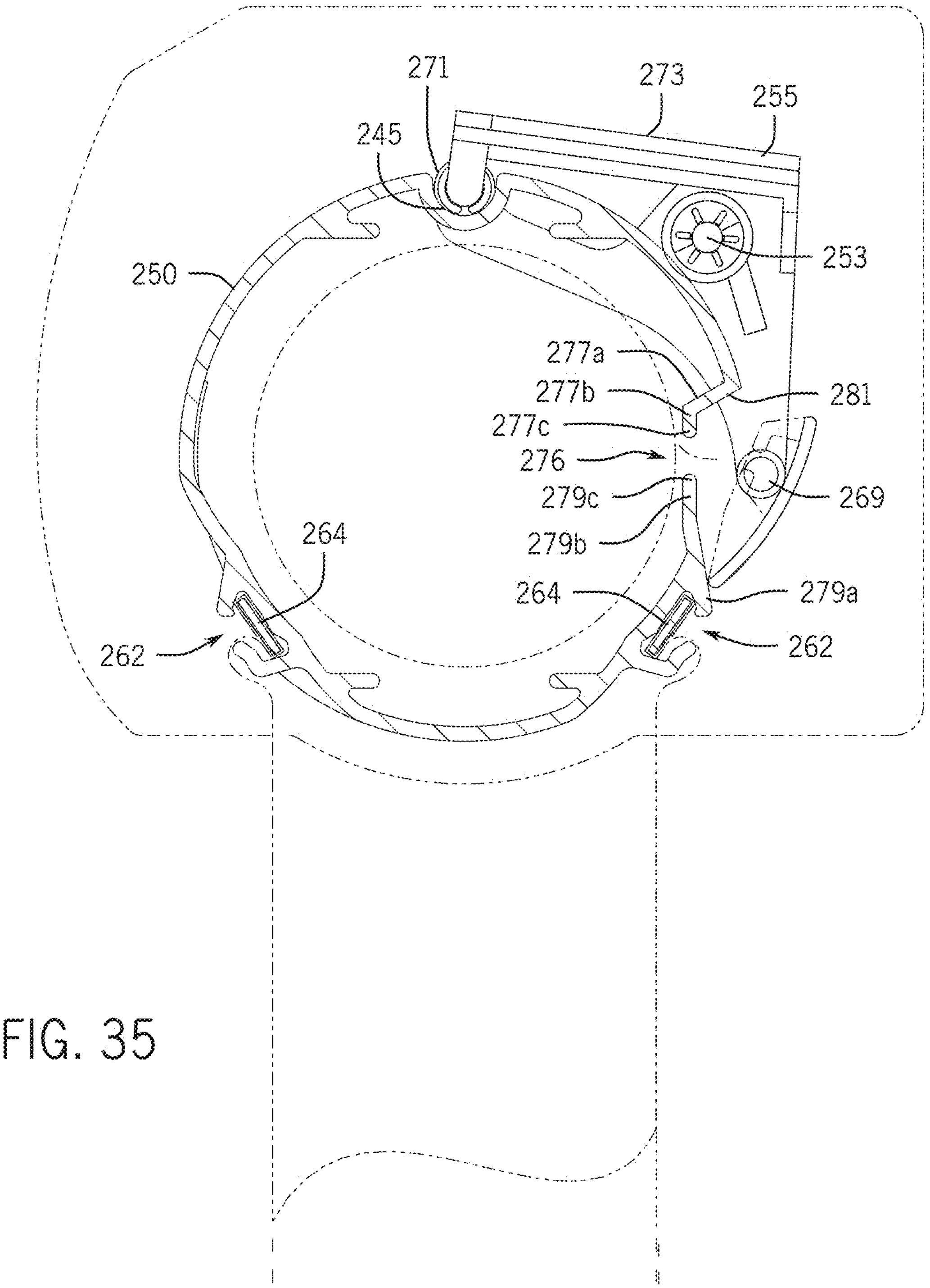
FIG. 35 is a transverse cross-sectional view of the covering of FIG. 31 with the inner roller and second shade removed for clarity in accordance with some examples of the present disclosure.

The shape of the seat 281 and its orientation on the outer roller 250 encourages smooth and predictable disengagement of the second bottom rail 220 from the seat 281 to begin the extension of the second shade 24 (from the position shown in FIG. 32). The shape and orientation of the seat 281 allows the bottom rail 220 to drop vertically out of the seat 281, which takes advantage of the force of gravity on the relatively heavy bottom rail 220. The generally tangential orientation of the seat 281 on the outer roller 250 assists in this regard. Referring to FIG. 35, the upper wall 277*a* extends from the top edge of the recess downwardly and radially inwardly to a lip 277*b*, which extends directly downwardly to an upper free edge 277*c*. This portion of the seat 281 is the deepest (as measured from the circumference toward the center of the outer roller). The lower wall 279*a* extends from the bottom edge of the recess upwardly and inwardly at a shallow angle, and transitions to a lip 279*b* which defines the lower free edge 279*c* of the slot 276. The lower wall 279*a* is relatively vertical, and remains so even in combination with the upper lip 277*b*. The lower free edge 279*c* of the slot 276 is curved or rounded to allow for the smooth travel of the second shade 24 over this feature as it is retracted onto the inner roller 248.

Figure 31:
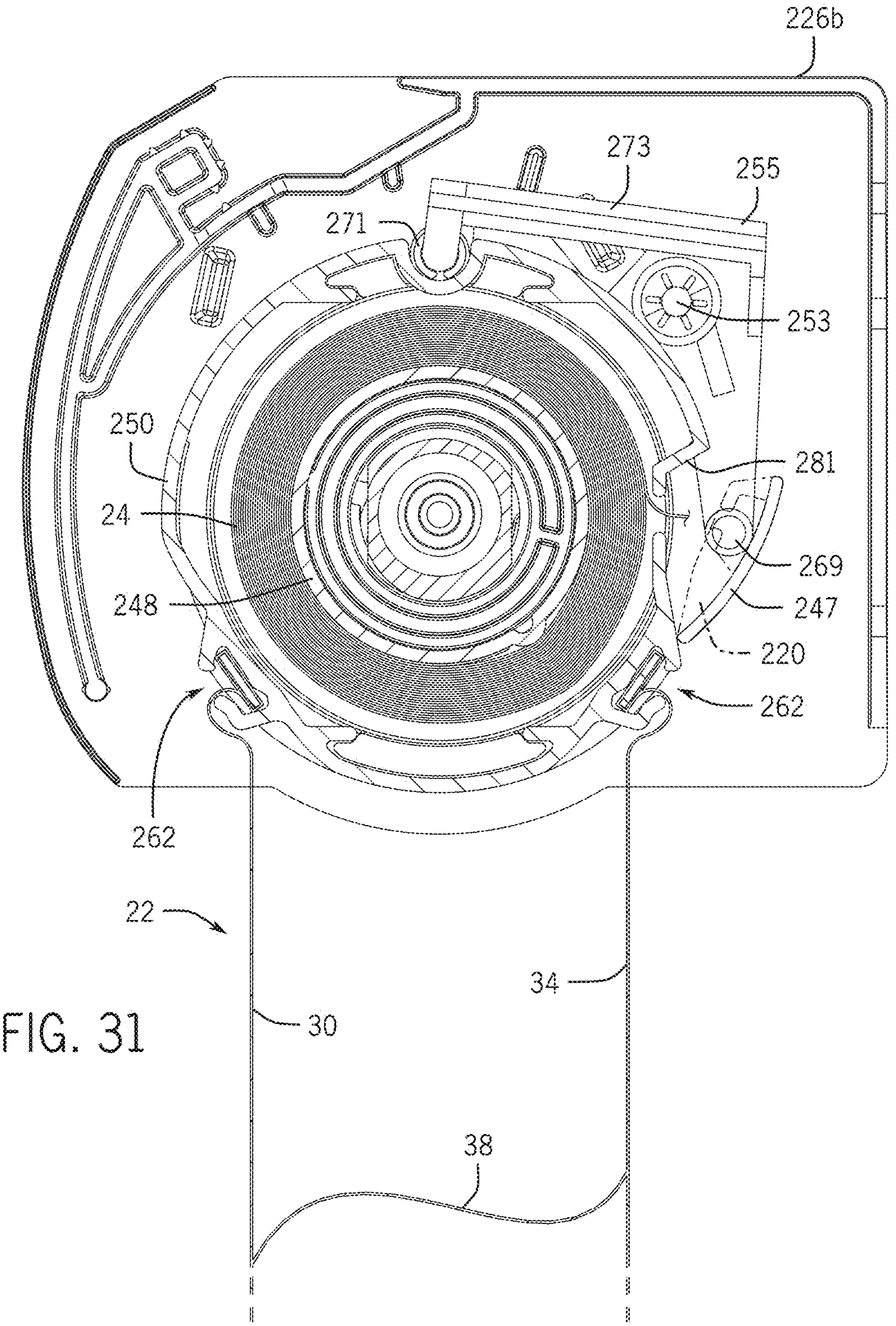
FIG. 31 is a transverse cross-sectional view of a covering taken along line 31-31 of FIG. 3 with the head rail components of FIG. 28 in accordance with some examples of the present disclosure.

The secure engagement of the second bottom rail 220 in the seat 281 aids in consistent actuation of the roller lock 255 to disengage the bearing 271 from the anchor groove 245. Referring to FIG. 31, when the second shade 24 is near fully wound around the inner roller 248, the bottom rail 220 of the second shade 24 engages the roller lock 255 to disengage the roller lock 255 from the outside of the outer roller 250. The second bottom rail 220 is shown in dash in FIGS. 31 and 35. At this position, the actuator rim 247, which extends axially from the end of the second bottom rail 220, contacts the pin 269 formed on the lower leg 267 of the roller lock 255. As the second bottom rail 220 is pulled into the seat 281 by the second shade 24 being retracted, the actuator rim 247 moves the pin 269 relative to the pivot axis of the post 253. The pin 269 is moved radially inwardly relative to the inner roller 248, and is moved circumferentially relative to the pivot axis of the roller lock 255. The movement of the roller lock 255 about the post 253 moves the upper arm 265, which begins the movement of the bearing 271 upwardly and out of engagement with the anchor groove 245, which frees the outer roller 250 to rotate (see FIGS. 32, 36, and 43).

Figure 42:
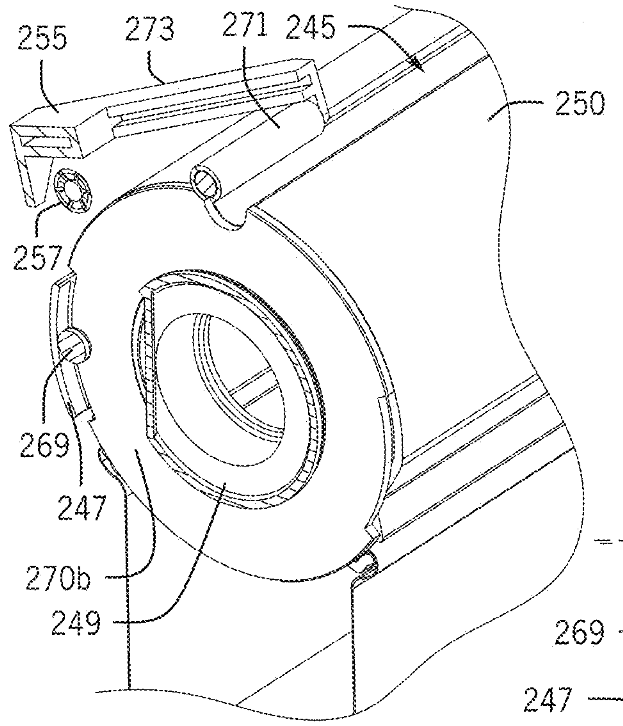
FIG. 42 is a fragmentary isometric view of some of the head rail components of FIG. 28 and depicts the interface of the lock mechanism of FIG. 38 with a bottom rail of the covering in accordance with some examples of the present disclosure.
Figure 43:
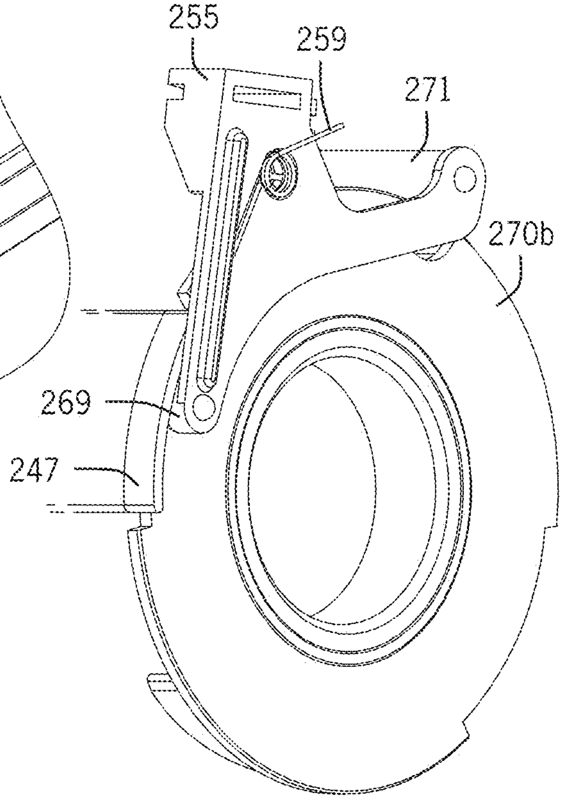
FIG. 43 is a fragmentary isometric view of some of the head rail components of FIG. 28 and depicts the interface of the lock mechanism of FIG. 38 with a bottom rail of the covering in accordance with some examples of the present disclosure.
Figure 44:
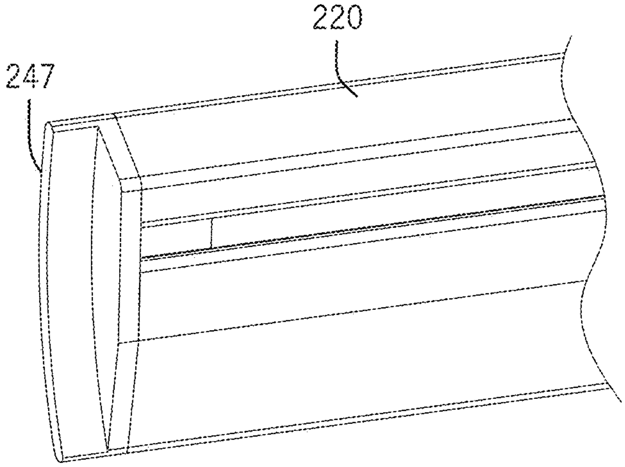
FIG. 44 is a fragmentary view of an end of the bottom rail of FIGS. 42 and 43 in accordance with some examples of the present disclosure.
Figure 45:
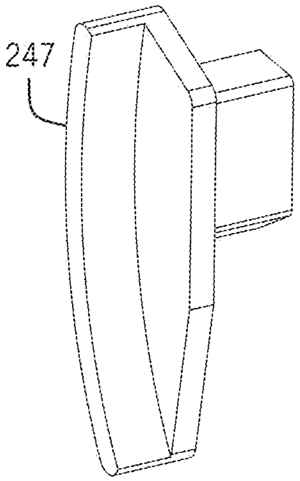
FIG. 45 is an isometric view of an actuator rim of the bottom rail of FIG. 44 in accordance with some examples of the present disclosure.

As shown in FIGS. 42 and 43, the actuator rim 247 extends off of the end of the second bottom rail 220 adjacent the roller lock 255. With reference to FIGS. 44 and 45, the rim 247 is a thin, curved element that in this example conforms to the curved shape of the bottom side of the second bottom rail 220. The rim 247 is curved along a dimension consistent with the bottom side of the second bottom rail 220, and extends axially away from the second bottom rail 220. As best seen in FIG. 43, the rim 247 extends a distance sufficient to engage the pin 269 on the roller lock 255 but not contact the central plate 261 of the roller lock 255. The inside, concave surface of the fin 247 engages the round outer surface of the pin 269. As the second bottom rail 220 is further retracted, the pin 269 and fin 247 maintain a sliding engagement. This further movement of the second end rail 220 causes the roller lock 255 to pivot further about the pivot axis of the post 253 and thus moves the roller lock bearing 271 out of the anchor groove 245.

Figure 33:
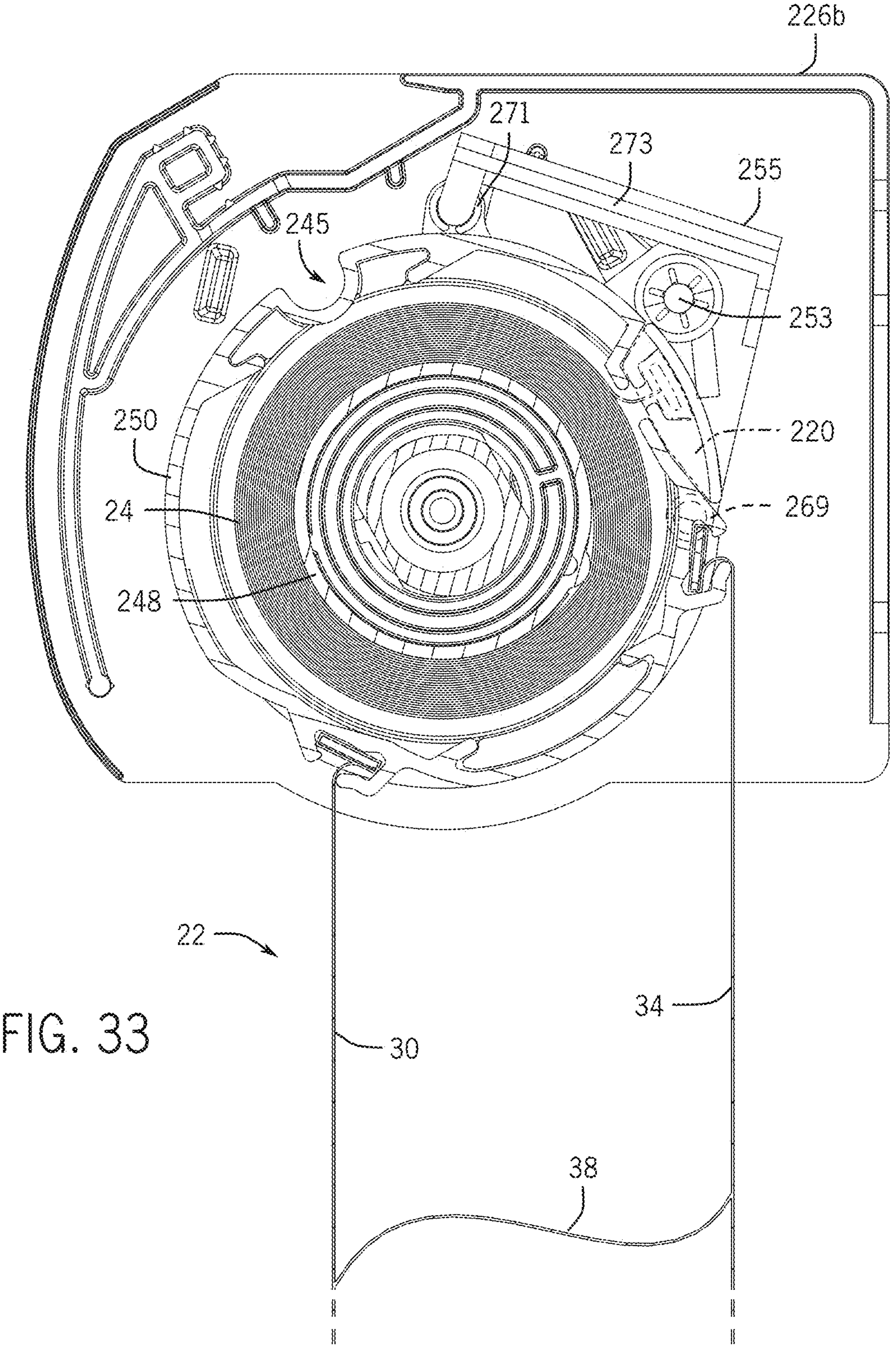
FIG. 33 is a transverse cross-sectional view of the covering of FIG. 32 with the outer roller rotated counterclockwise relative to the position of the outer roller in FIG. 32 in accordance with some examples of the present disclosure.
Figure 36:
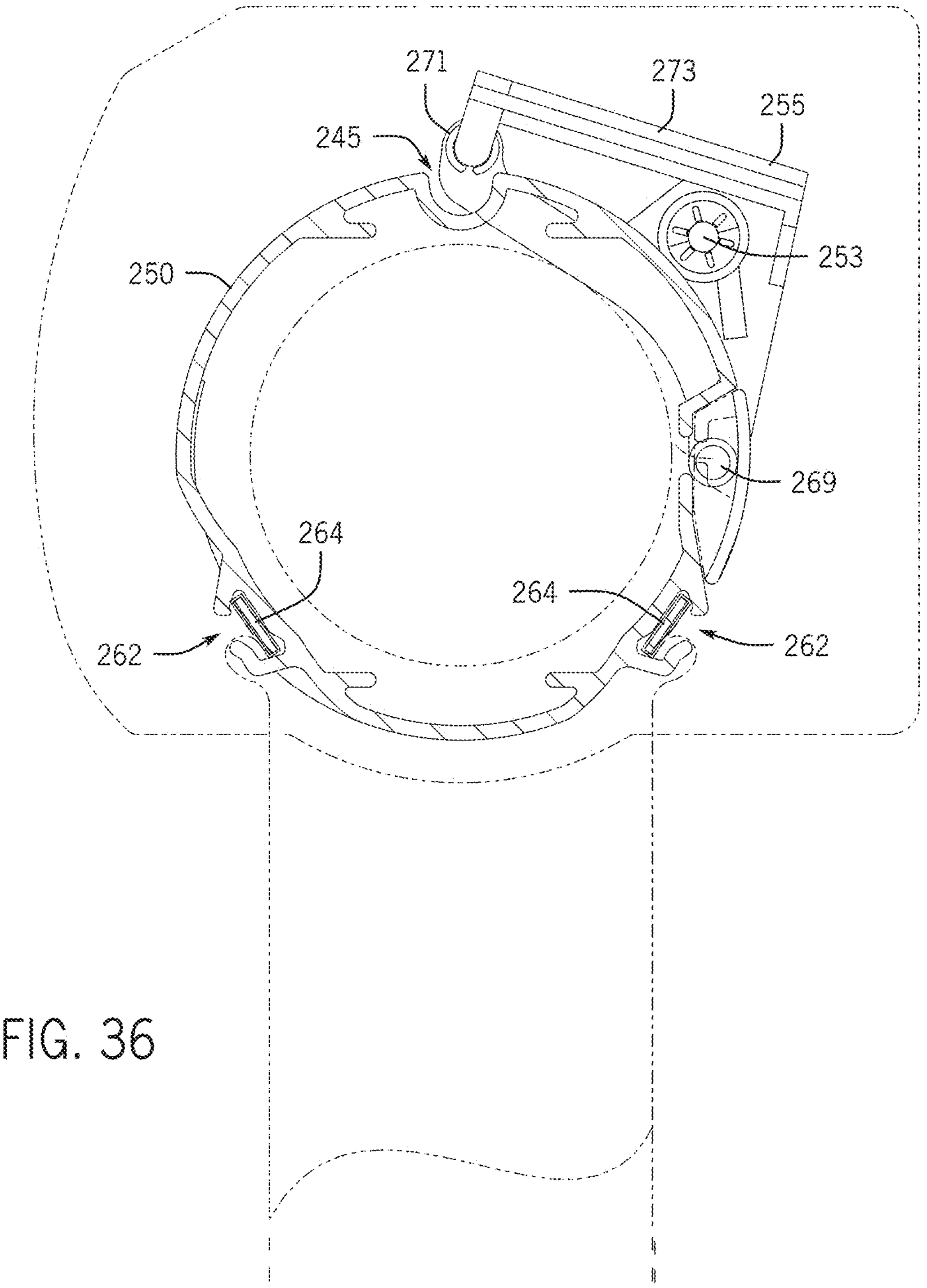
FIG. 36 is a transverse cross-sectional view of the covering of FIG. 32 with the inner roller and second shade removed for clarity in accordance with some examples of the present disclosure.
Figure 37:
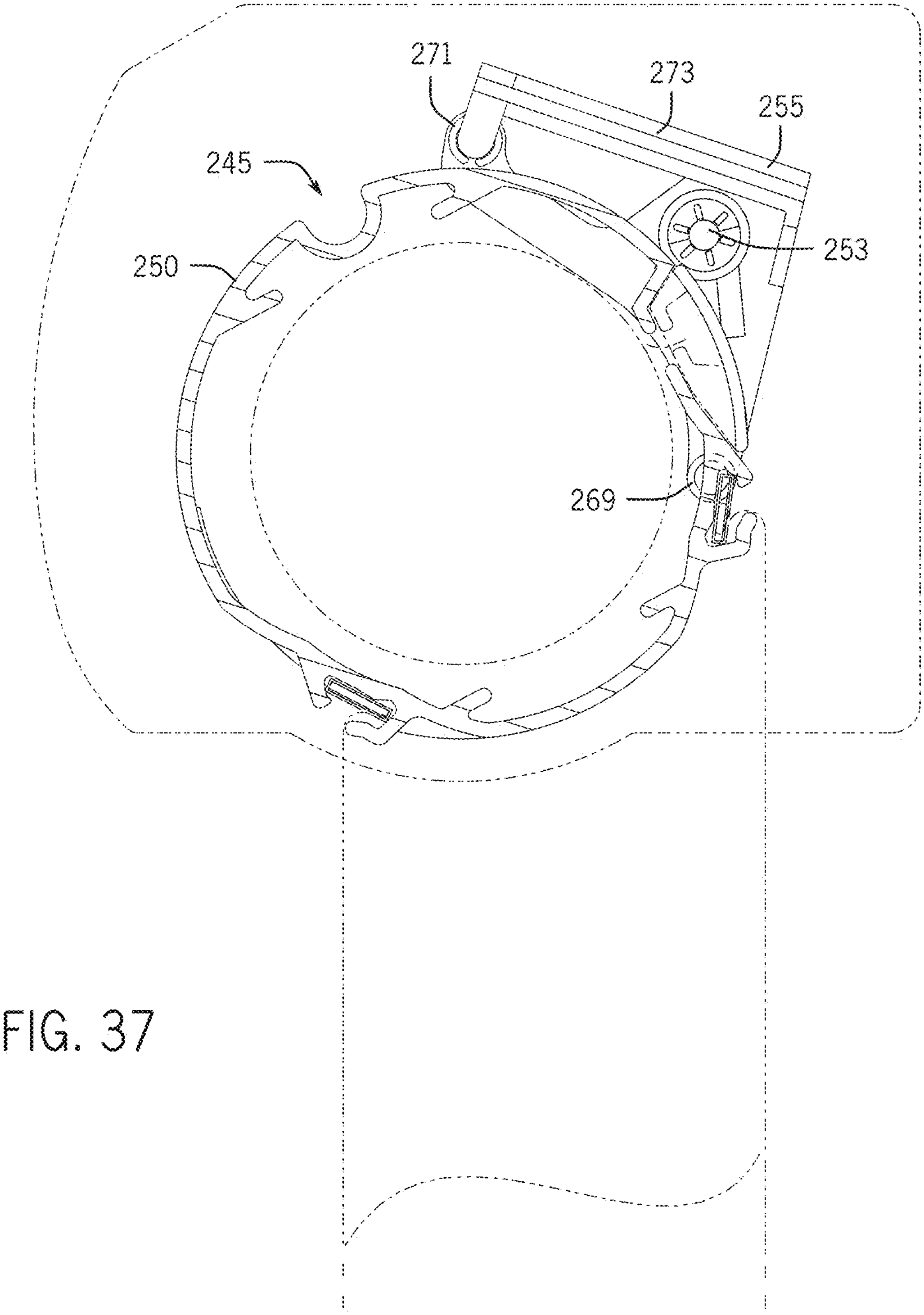
FIG. 37 is a transverse cross-sectional view of the covering of FIG. 33 with the inner roller and second shade removed for clarity in accordance with some examples of the present disclosure.

Referring to FIGS. 32 and 36, as the second shade 24 is further withdrawn into the outer roller 250, the bottom rail 220 becomes securely positioned in the seat 281 and the fin 247 moves the pin 269 a sufficient amount inwardly to fully remove the bearing 271 from the anchor groove 245, which frees the outer roller 250 to rotate. Further actuation of the operating mechanism 240 applies the rotational motion of the inner roller 248 to the outer roller 250, through the engagement of the bottom rail 220 in the seat 281 under the tension of the second shade 24. This engagement causes the outer roller 250 to rotate in conjunction with the rotation of the inner roller 248. As the outer roller 250 begins to rotate in the retraction direction, the actuator rim 247 on the second bottom rail 220 disengages from the pin 269 on the roller lock 255. Referring to FIGS. 33 and 37, upon release the roller lock 255 is biased by the spring 259 to cause the bearing 271 to contact the outer surface of the outer roller 250 at a circumferential location spaced away from the anchor groove 245.

Figure 34:
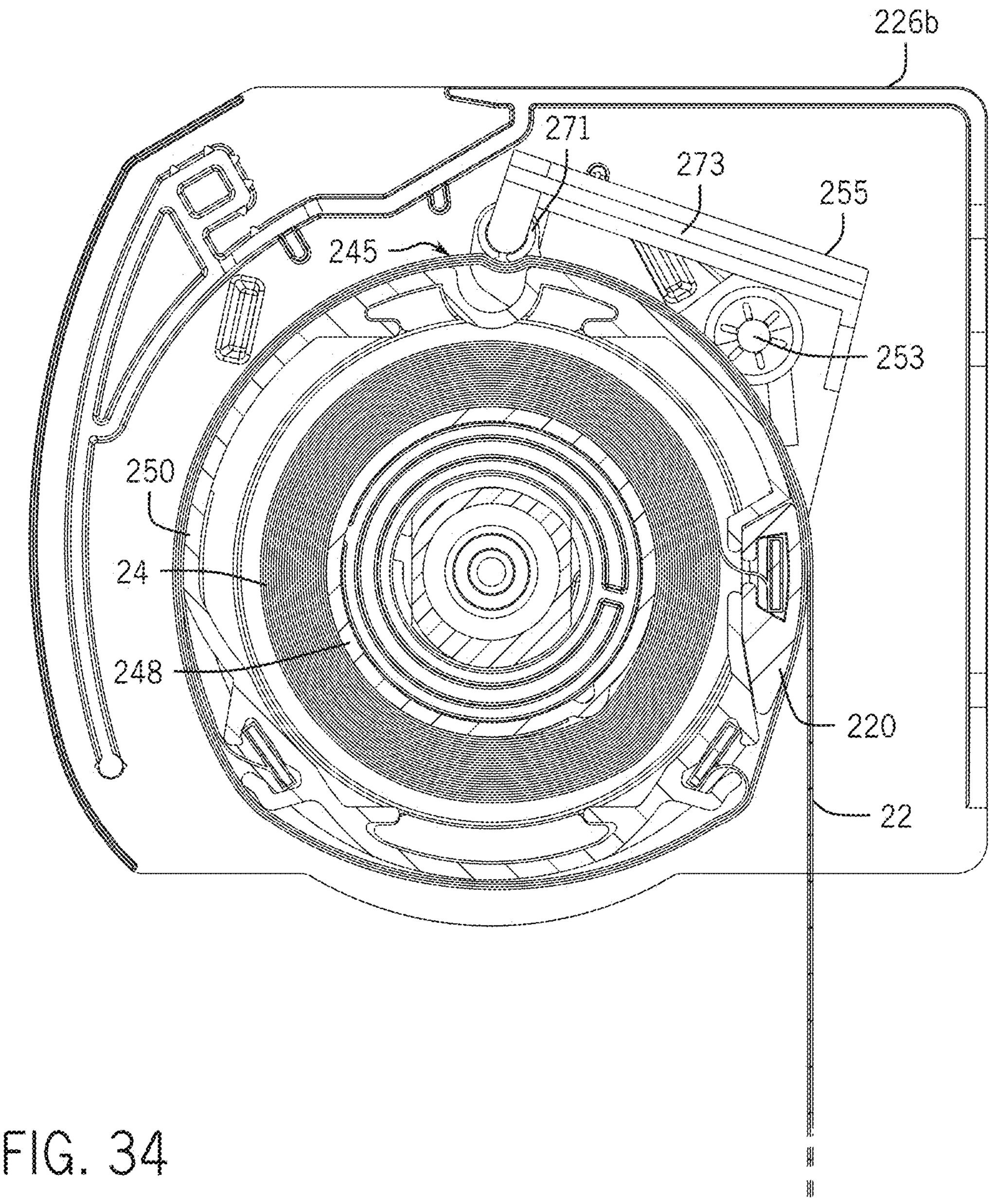
FIG. 34 is a transverse cross-sectional view of a covering taken along line 34-34 of FIG. 4 with the head rail components of FIG. 28 in accordance with some examples of the present disclosure.

Referring to FIG. 34, as the outer roller 250 continues to rotate in the retraction direction, the first shade 22 wraps around the outer roller 250, covering the anchor groove 245. When the roller lock bearing 271 nears the anchor groove 245 as the outer roller 250 continues to rotate, the roller lock bearing 271 passes over the groove 245 by riding on the first shade 22 which spans the groove 245. The first shade 22 is under tension as it is wrapped around the outer roller 250, thus making the span of the shade 22 extending over the groove 245 relatively taut. The bearing 271 may depress somewhat into the anchor groove 245 when only a single wrap of the first shade 22 is positioned over the anchor groove 245, but after another full rotation the bearing 271 rides over the surface of the first shade 22 wrapped around the outer roller 250 without interference from the anchor groove 245.

As the first shade 22 continues to retract, it wraps around the outer roller 250 many times, and the roller lock bearing 271 continues to ride on the outer surface of the shade 22. The dual roller unit 246 reaches the top retraction position when the first bottom rail 18 contacts an abutment on the head rail housing, for example. It is contemplated that other mechanisms may be utilized to define the top retraction position, including a top limit stop positioned on the limit screw 266 opposite the bottom limit stop. As explained above, the retraction of the second shade 24 and first shade 22 from the fully extended position may occur with the user actuating one operating element (manually or automatically) for the retraction of both shades 22, 24. The limit screw 266 is of sufficient length to allow the limit nut 268 to move from the bottom limit stop until the top retracted position is attained.

Extension of the first shade 22 and the second shade 24, if desired, is accomplished in reverse order as described above, such as generally following FIGS. 34 to 30. This allows the user to select whether to have just the first shade 22 extended or to also have the second shade 24 extended (between fully retracted and fully extended). During extension of the first shade 22, the user actuates the operating mechanism 240 to cause the inner roller 248 to rotate in an extension direction (clockwise in FIGS. 34-30), which in turn causes the outer roller 250 to rotate in an extension direction. The dual roller unit 246 rotates, in this example, in the direction the user controls the inner roller 248 to rotate. As the first shade 22 extends off of the rear of the outer roller 250, the roller lock bearing 271 rides on the outer surface of the outer roller 250 until the first shade 22 is nearly fully extended. At this point, the outer surface of the outer roller 250 is exposed.

As the outer roller 250 continues to rotate, the roller lock bearing 271 rides on the outer surface of the outer roller 250 until it meets the anchor groove 245. The bearing 271 is biased downwardly by the spring 259 to be positioned in the groove 245 and inhibit the rotation of the outer roller 250 and allow the continued rotation of the inner roller 248 (if desired by the user). Since the roller lock 255 is biased in a direction against the outer surface of the outer roller 250, the bearing 271 moves into the anchor groove 245 without further urging. At this point the first shade 22 is at its most extended position across the opening. It is contemplated that the roller lock 255 may be biased by means other than a spring 259 in these examples. For instance, the top arm 273 of the roller lock 255 may be weighted such that the roller lock 255 pivots as desired automatically under the weight of the top arm 273. Where a spring 259 is used, it may be a wire spring, coil spring, resilient material spring (such as rubber, elastic, and/or plastic) or the like.

When the bearing 271 of the roller lock 255 is seated in the anchor groove 245, the slot 276 in the outer roller 250 is rotationally oriented within the head rail 14 such that the bottom rail 220 of the second shade 24 may drop vertically out of the seat 281 when the tension in the second shade 24 is lessened by the operating system 240. The generally tangential orientation and generally vertical positioning of the seat 281, with a relatively vertical base wall 284, allows the weight of the second bottom rail 220 to be effective to extract the bottom rail 220 from the seat 281 when the tension in the second shade 24 is released in the retraction position. However, if the user does not intend to extend the second shade 24, then the second shade 24 may remain retracted. The operating mechanism 240 may include a brake system to restrict unwanted downward movement of the second or first shades 24, 22.

In order to extend the second shade 24, the operating system 240 is further actuated to the level as desired by the user. When the user extends the second shade 24 to the lowest position (most extension), the limit nut 268 is positioned on the limit screw 266 in engagement with the lower limit stop. Thus a single limit screw 266 may be utilized to define the upper limit of the retracted first shade 22 attached to the outer roller 250, and to define the lower limit of the extended second shade 24 attached to the inner roller 248.

It is contemplated that the first shade 22 of FIGS. 30-34 (which may be the same as or different than that shown in FIGS. 1-5) may be wrapped about or unwrapped from the front side of the outer roller 250. Accompanying modifications to the structure described herein would be necessary to facilitate the implementation of the dual roller shade technology as applied to a front-descending shade structure. It is also contemplated that the roller lock mechanism and accompanying elements necessary for it to operate may be employed on the right end of the head rail, in affiliation with the right end cap 226*a*, either in conjunction with a roller lock mechanism on the left end of the head rail, or by itself. Also, the second bottom rail 220 may have an actuating rim 247 on either end thereof.

The foregoing description has broad application. While the provided examples describe a silhouette-type shade and a black-out type shade, it should be appreciated that the concepts disclosed herein may equally apply to many types of shades. Accordingly, the discussion of any embodiment is meant only to be explanatory and is not intended to suggest that the scope of the disclosure, including the claims, is limited to these examples. In other words, while illustrative embodiments of the disclosure have been described in detail herein, it is to be understood that the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

The phrases “at least one”, “one or more”, and “and/or”, as used herein, are open-ended expressions that are both conjunctive and disjunctive in operation.

The term “a” or “an” entity, as used herein, refers to one or more of that entity. As such, the terms “a” (or “an”), “one or more” and “at least one” can be used interchangeably herein.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

The invention claimed is:

1. A covering for an architectural opening, the covering comprising:
- a rotatable outer roller including a first shell and a second shell;
- a rotatable inner roller positioned in the outer roller;
- a first bushing engaged with first ends of the first and second shells; and
- a second bushing engaged with second ends of the first and second shells;
- wherein the first and second bushings maintain a spatial relationship between the first and second shells to maintain a width of an elongated slot defined between the first and second shells.

2. The covering of claim 1, wherein:
- the first and second shells each have a longitudinally-extending terminal edge; and
- the longitudinally-extending terminal edges of the first and second shells are spaced apart from each other to define the elongated slot.

3. The covering of claim 1, wherein:
- the first and second bushings each include a first axial projection that engages the first shell, and a second axial projection that engages the second shell; and
- the first and second axial projections are operably received by the first and second shells, respectively, to prevent relative movement between the first and second shells.

4. The covering of claim 3, wherein:
- the first and second shells each define shelves extending inwardly from a circumferential wall; and
- the first and second axial projections are received between the shelves and the circumferential wall of the first and second shells, respectively.

5. The covering of claim 1, wherein the first and second bushings are rotatable and rotate with the outer roller.

6. The covering of claim 1, wherein the first and second bushings each include a hole, a longitudinal axis of the hole being axially aligned with a longitudinal axis of the inner roller.

7. The covering of claim 1, further comprising:
- a first shade coupled with the outer roller; and
- a second shade coupled with the inner roller, the second shade extending through the elongated slot, the second shade being positioned behind the first shade when the first and second shades are fully extended from the outer and inner rollers, respectively.

8. The covering of claim 7, further comprising a bottom rail coupled to the second shade;
- wherein the bottom rail contacts the first and second shells and covers the elongated slot when the second shade is in a fully retracted position.

9. The covering of claim 7, wherein the outer roller defines a seat, the second shade includes a bottom rail that is received within the seat formed in the outer roller when the second shade is in a fully retracted position;
- wherein, when the first shade is in a fully deployed position, the seat enables a relatively vertical-tangential engagement and disengagement between the bottom rail of the second shade and the outer roller.

10. The covering of claim 9, wherein, when the first shade is in a fully deployed position, the seat includes a generally vertically-oriented base wall spanning a portion of the elongated slot.

11. The covering of claim 9, wherein, when the first shade is in a fully deployed position, the elongated slot and the seat are positioned on a circumference of the outer roller above an attachment point of the first shade with the outer roller.

12. The covering of claim 9, wherein, when the first shade is in a fully deployed position, shape and orientation of the seat allows the bottom rail of the second shade to drop vertically out of the seat.

13. The covering of claim 9, wherein, when the first shade is in a fully deployed position, a lower edge of the elongated slot is one of curved or rounded to allow for smooth travel of the second shade over an edge portion of the outer roller as the second shade is extended and retracted through the elongated slot.

14. The covering of claim 1, wherein the first and second bushings each include a boss for coupling to the rotatable inner roller.

15. A covering for an architectural opening, comprising:
- a rotatable outer roller;
- a rotatable inner roller received within the outer roller;
- a first shade coupled to and adapted to be wrapped around the outer roller, the first shade retractable onto and extendable from the outer roller; and
- a second shade coupled to and adapted to be wrapped around the inner roller, the second shade retractable onto and extendable from the inner roller and having side edges that are aligned with the ends of the inner roller;

wherein:

the side edges of the second shade are aligned with the ends of the outer roller;

the outer roller includes a first shell and a second shell each having a first longitudinally- extending edge portion and a second longitudinally-extending edge portion;

the second longitudinally-extending edge portions of the first and second shells are peripherally spaced apart from one another to define an elongated slot extending along a length of the outer roller between the ends of the outer roller and opening to an interior of the outer roller; and the second shade extends through the elongated slot.

16. The covering of claim 15, wherein the first shade has side edges that are aligned with the ends of the inner and outer rollers.

17. The covering of claim 15, wherein the ends of the inner roller are aligned with the ends of the outer roller.

18. The covering of claim 17, wherein the elongated slot is oriented orthogonally to a direction of extension of the first shade.

19. The covering of claim 15, further comprising:

a first bushing locked into one end of the first and second shells; and a second bushing locked into an opposing end of the first and second shells; wherein the first and second bushings maintain a constant width of the elongated slot.

20. The covering of claim 15, wherein the inner roller defines a central longitudinal axis, and the inner and outer rollers are concentric about the central longitudinal axis of the inner roller.

21. The covering of claim 20, further comprising a mounting system supporting the inner and outer rollers for rotative movement about the central longitudinal axis of the inner roller.

22. The covering of claim 15, further comprising a bottom rail secured to the second shade and engaging the outer roller when the second shade is in a fully retracted position.

23. The covering of claim 22, wherein:

the outer roller defines a longitudinal seat formed along the elongated slot; and the bottom rail is received in the seat when the second shade is in the fully retracted position.

24. The covering of claim 23, wherein the seat defines a recess with an opening in a direction of extension of the first shade.

25. The covering of claim 15, wherein the first longitudinally-extending edge portions of the first and second shells are configured to overlap and interlock with one another.

26. A covering for an architectural opening, comprising:

a rotatable outer roller including a first shell and a second shell and defining an elongated slot extending along a length of the outer roller and opening to an interior of the outer roller;

a first bushing engaged with a first end of the outer roller;

a second bushing engaged with a second end of the outer roller;

a rotatable inner roller received within the outer roller and defining a central longitudinal axis;

a first shade coupled to the outer roller, the first shade retractable onto and extendable from the outer roller; and a second shade coupled to the inner roller, the second shade extending through the elongated slot and retractable onto and extendable from the inner roller;

wherein the elongated slot is substantially horizontally aligned with the central longitudinal axis of the inner roller when the first shade is in a fully extended position; and wherein the first and second bushings maintain a width of the elongated slot.

27. The covering of claim 26, further comprising a bottom rail coupled to the second shade and engaging the outer roller when the second shade is in a fully retracted position.

28. The covering of claim 27, wherein:

the outer roller defines a longitudinal seat formed along the elongated slot; and the bottom rail is received in the seat when the second shade is in the fully retracted position.

* * * * *